US010878726B2

(12) United States Patent
Atkinson et al.

(10) Patent No.: US 10,878,726 B2
(45) Date of Patent: Dec. 29, 2020

(54) INTELLIGENT CONTAINER SYSTEM

(71) Applicants: Paul Atkinson, Poway, CA (US); John Rilum, Tustin, CA (US)

(72) Inventors: Paul Atkinson, Poway, CA (US); John Rilum, Tustin, CA (US)

(73) Assignee: Chromera, Inc., Poway, CA (US)

( * ) Notice: Subject to any disclaimer, the term of this patent is extended or adjusted under 35 U.S.C. 154(b) by 234 days.

(21) Appl. No.: 16/010,485

(22) Filed: Jun. 17, 2018

(65) Prior Publication Data
US 2019/0114947 A1 Apr. 18, 2019

Related U.S. Application Data

(63) Continuation-in-part of application No. 15/958,807, filed on Apr. 20, 2018, which is a continuation-in-part of application No. 15/890,312, filed on Feb. 6, 2018.

(60) Provisional application No. 62/521,471, filed on Jun. 18, 2017, provisional application No. 62/478,216, filed on Mar. 29, 2017, provisional application No. 62/455,502, filed on Feb. 6, 2017.

(51) Int. Cl.
G09F 3/20 (2006.01)
G02F 1/155 (2006.01)
G02F 1/153 (2006.01)
G08B 21/18 (2006.01)
G02F 1/157 (2006.01)
G02F 1/167 (2019.01)
G02F 1/1516 (2019.01)
G02F 1/137 (2006.01)
G09F 3/02 (2006.01)
B65D 51/24 (2006.01)

(52) U.S. Cl.
CPC .......... *G09F 3/208* (2013.01); *G02F 1/13718* (2013.01); *G02F 1/155* (2013.01); *G02F 1/157* (2013.01); *G02F 1/1533* (2013.01); *G02F 1/15165* (2019.01); *G02F 1/167* (2013.01); *G08B 21/18* (2013.01); *B65D 51/248* (2013.01); *B65D 2203/00* (2013.01); *G02F 2201/44* (2013.01); *G09F 2003/0272* (2013.01)

(58) Field of Classification Search
CPC ................................ G06F 13/40; G06F 21/57
See application file for complete search history.

(56) References Cited

U.S. PATENT DOCUMENTS

2010/0270257 A1* 10/2010 Wachman .............. G06Q 10/10
                                                           215/228
2011/0125319 A1*  5/2011 Torres Farr ............ A61B 5/411
                                                           700/240

* cited by examiner

Primary Examiner — Tri M Tran

(57) ABSTRACT

Described herein is a polymorphic display, which is a unitary apparatus constructed such that a wide variety of electro-optic functions are enabled. The polymorphic display is used in an intelligent container system for monitoring and evaluating actions taken at the container system. In this way, relationships between displayed information and actions may be determined. The polymorphic display, even when having multiple pixels, enables sharing of selected structures among the pixels. In a multi-pixel construction, there is a set of pixels in the display that exhibit one set of operable properties, such as particular stability, sequencing, and switching properties, and another set of pixels that are different from the first set. That is, they have different stability, sequencing, or switching properties. In such a way, a highly flexible polymorphic display may be construed to satisfy a wide range of display needs, including novel applications on intelligent container systems.

59 Claims, 34 Drawing Sheets

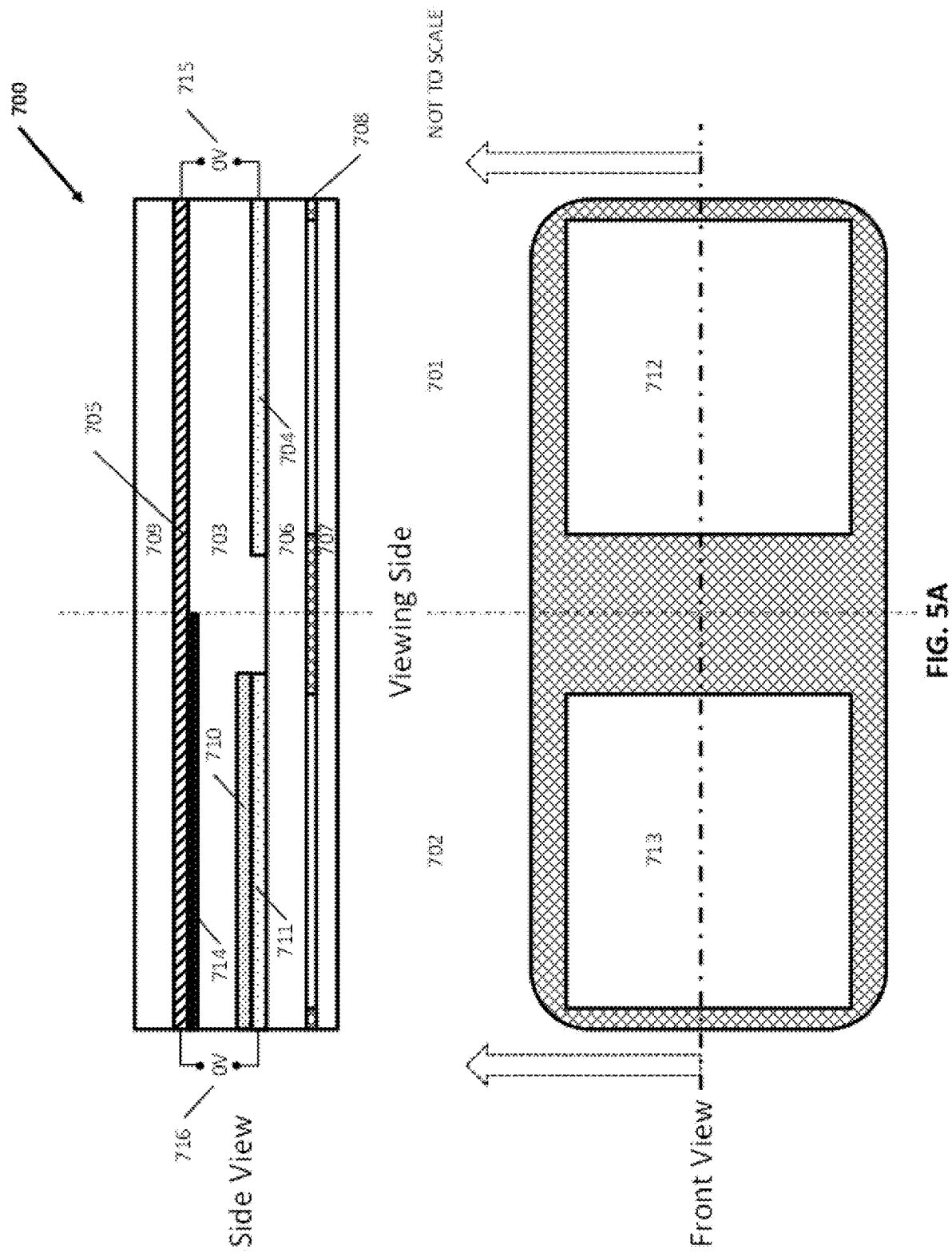

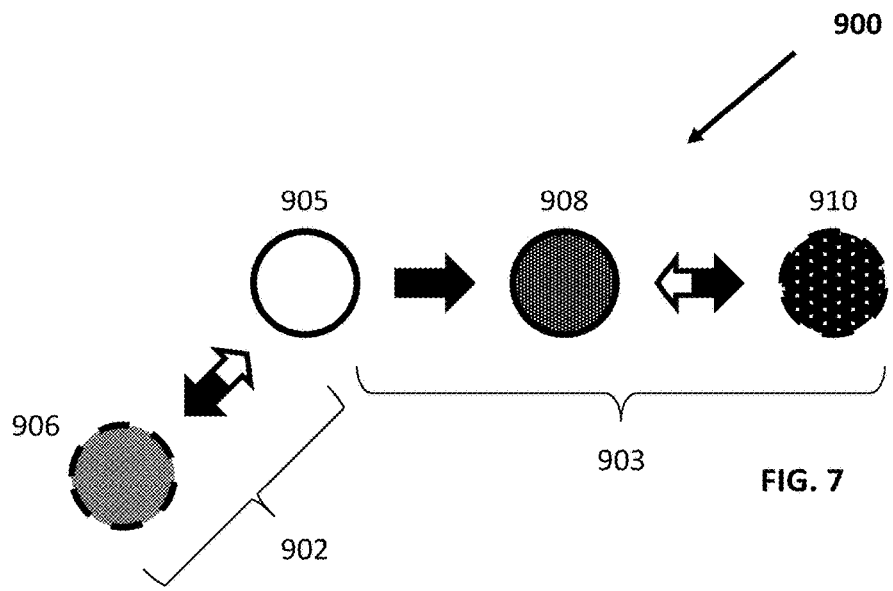
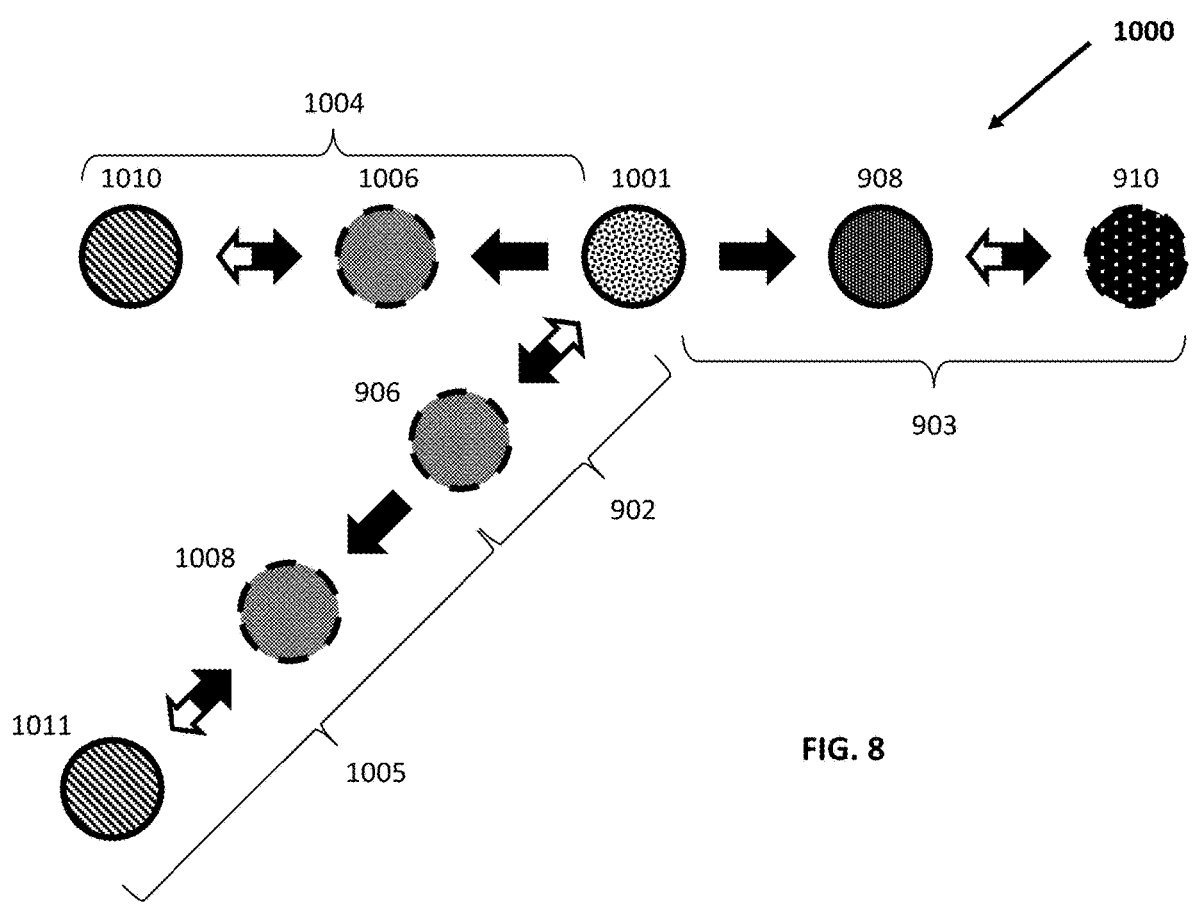

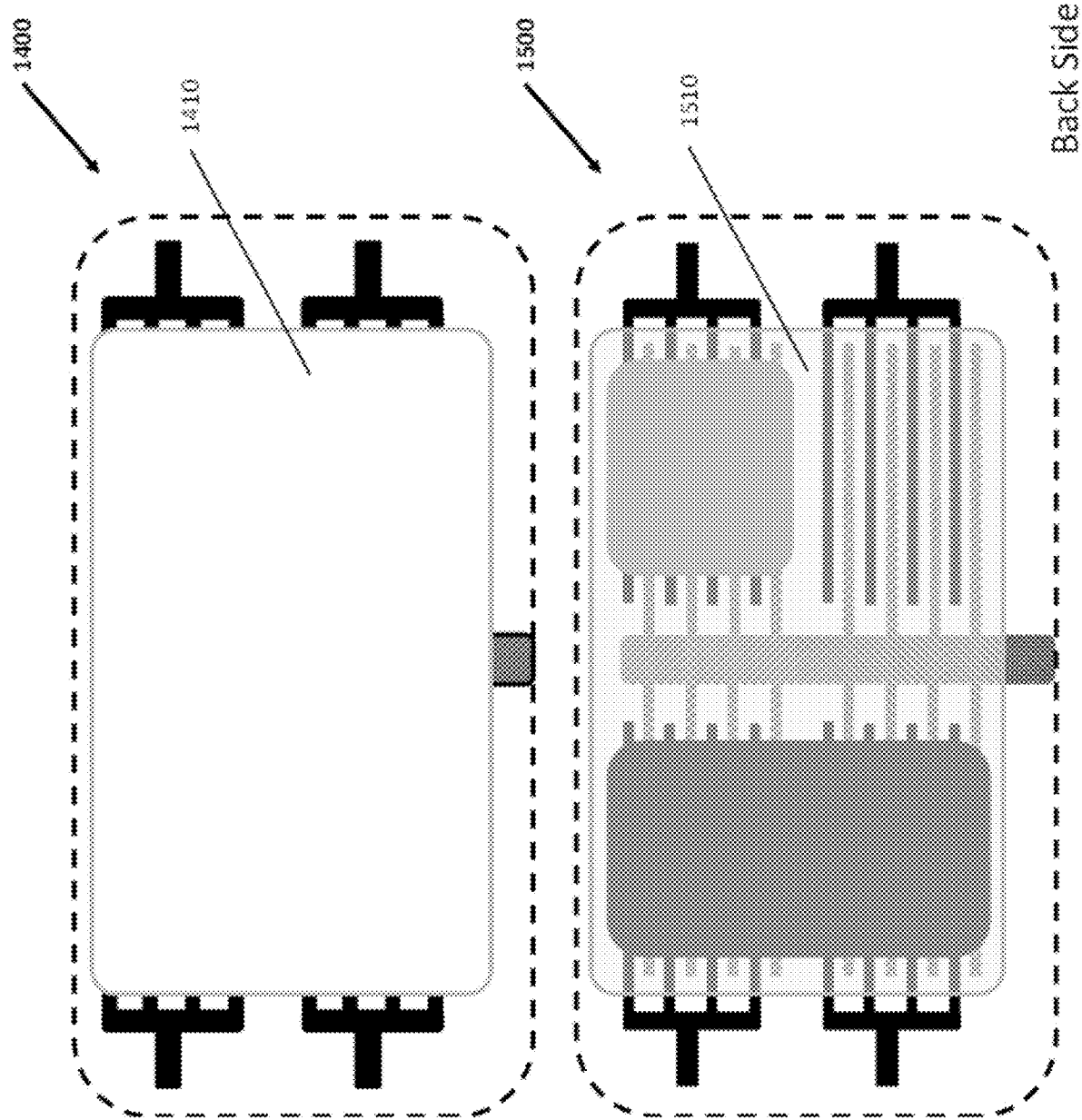

Legend
 White
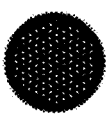 Purple
 Blue
 Dark Blue or Green
 Dark Blue
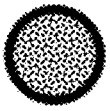 Black or Yellow
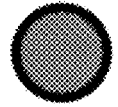 Red
 Stable State
 Switchable Transitions
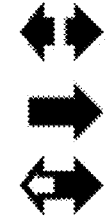 Switchable Transition
 Volatile State
 Self-Switchable Transition
FIG. 11

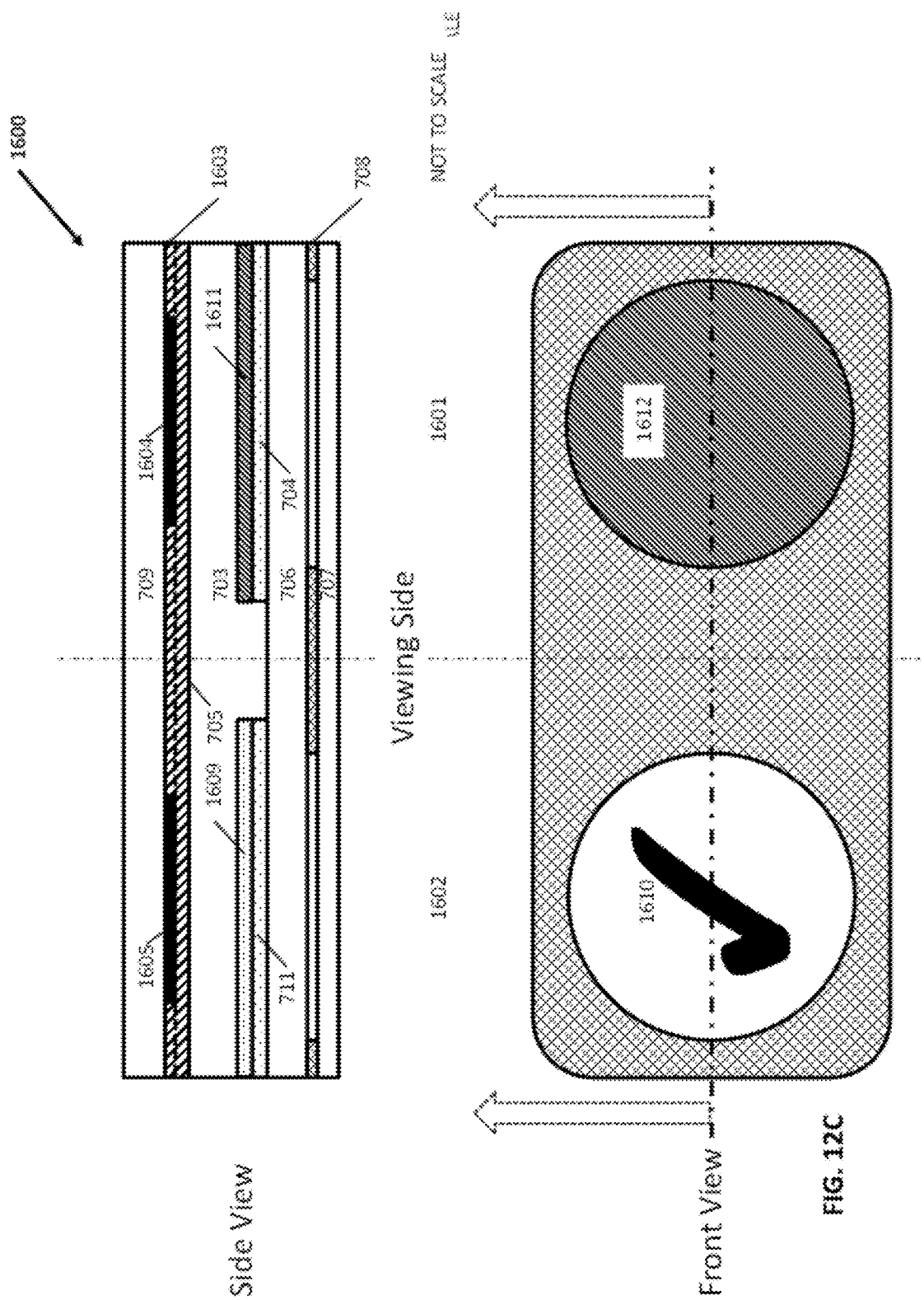

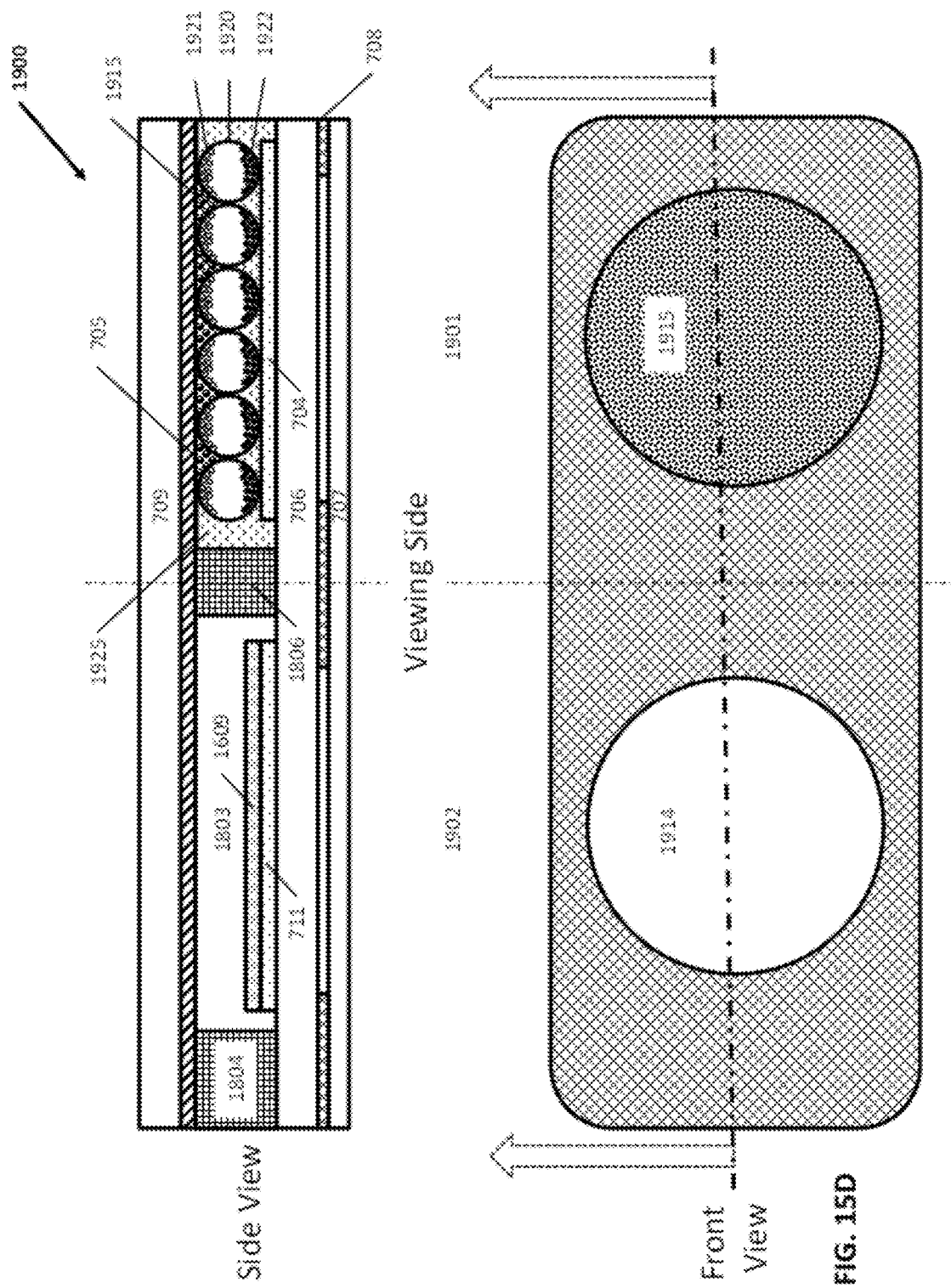

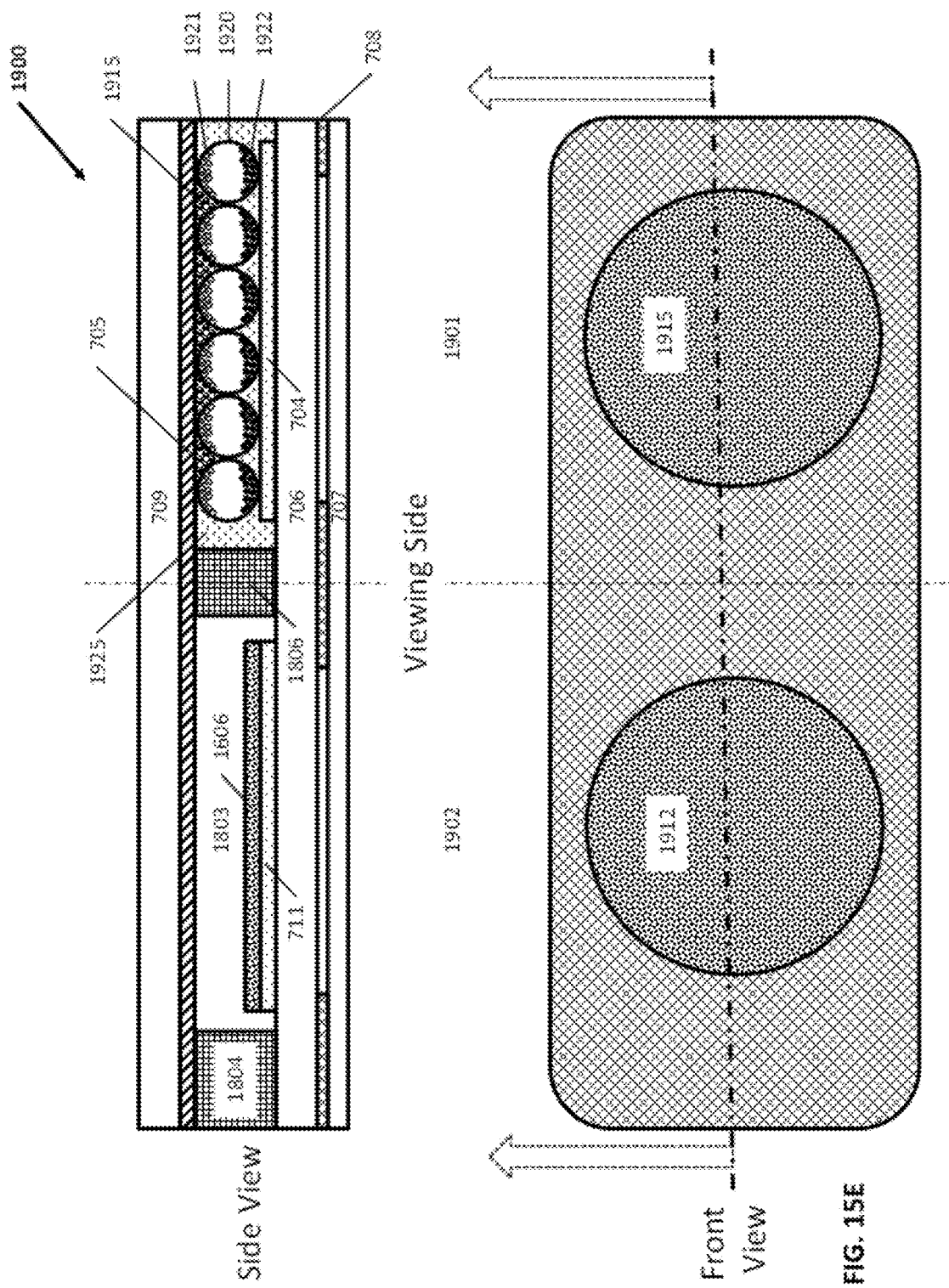

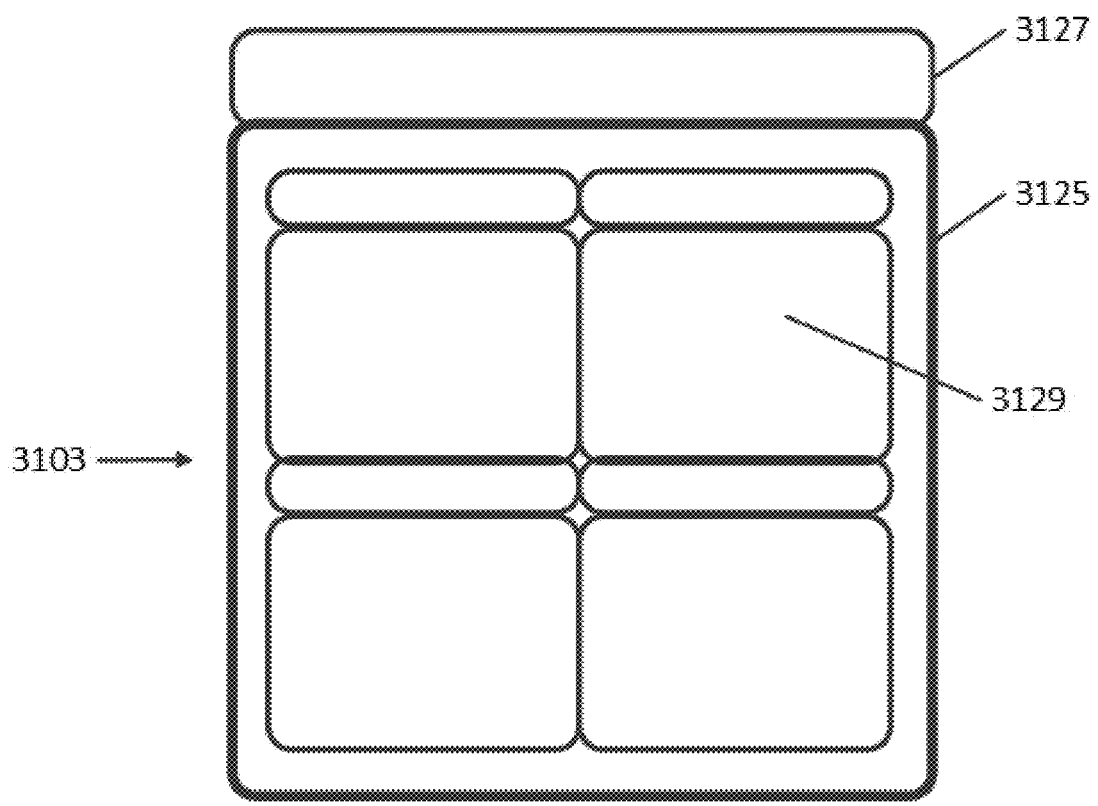
FIG. 23 (Con't)

INTELLIGENT CONTAINER SYSTEM

RELATED APPLICATIONS

This application claims priority to U.S. patent application No. 62/521,471, filed Jun. 18, 2017, and entitled "Intelligent Container System." This application is also a continuation-in-part to U.S. patent application Ser. No. 15/958,807, filed Apr. 20, 2018, and entitled "Polymorphic Electro-Optic Displays," which is a continuation-in-part application to U.S. patent application Ser. No. 15/890,312, filed Feb. 6, 2018, and entitled "Polymorphic Electro-Optic Displays," which claims priority to U.S. provisional patent application No. 62/478,216, filed Mar. 29, 2017 and entitled "Hybrid Displays," and to U.S. provisional patent application No. 62/455,502, filed Feb. 6, 2017, and entitled "Hybrid Displays," both of which are incorporated herein by reference. This application is related to U.S. patent application Ser. No. 13/002,275, filed Dec. 30, 2010, now issued as U.S. Pat. No. 9,030,724; and to U.S. patent application Ser. No. 14/797,141, filed Jul. 12, 2015, both of are incorporated herein by reference.

FIELD OF THE INVENTION

The field of the invention is manufacture and use of electronic displays comprised of electro-optic pixels.

BACKGROUND

The internet of things (IoT) and other emerging markets for inexpensive, and often disposable, intelligent electronic devices are creating demand for smaller, thinner, often flexible, ruggedized, and fit-for-purpose electro-optic displays. Currently known display devices are constructed of multiple pixels, that when viewed together, display a message or symbol to the user. The pixels of these conventional displays, are of the same type. A mono-stable display for example will have only mono-stable pixels while a bi-stable display will have only two stable-states, electrically switchable pixels. The pixels of common (non cholesteric) LCDs are mono-stable, but each is the same as the others. The pixels of three-color electrophoretic displays are multi-stable, that is they are stable in three states, but the pixels themselves are all the same.

SUMMARY

Described herein is a polymorphic display, which is a unitary apparatus constructed such that a wide variety of electro-optic functions are enabled. The polymorphic display is used in an intelligent container system for monitoring and evaluating actions taken at the container system. In this way, relationships between displayed information and actions may be determined. The polymorphic display, even when having multiple pixels, enables sharing of selected structures among the pixels. In a multi-pixel construction, there is a set of pixels in the display that exhibit one set of operable properties, such as particular stability, sequencing, and switching properties, and another set of pixels that are different from the first set. That is, they have different stability, sequencing, or switching properties. In such a way, a highly flexible polymorphic display may be construed to satisfy a wide range of display needs, including novel applications on intelligent container systems.

The ability to create different, fit-for-purpose transition sequences is an important benefit of polymorphic displays and as described below, of polymorphic pixels. Of particular benefit of the property of transition sequencing is the ability to selectively and dynamically determine and effect a transition sequence, and therefore the operable properties of a polymorphic pixel or polymorphic display, responsive to different electrical signals. And further, where the electrical signals are generated responsive to various conditions, events and actions etc., such as those common to intelligent display devices described later herein.

BRIEF DESCRIPTION OF THE DRAWINGS

FIG. 5A is a block representative of a display in accordance with the present invention.

FIG. 7 is a diagram showing operable states and corresponding optical states for a display in accordance with the present invention.

FIG. 8 is a diagram showing operable states and corresponding optical states for a display in accordance with the present invention.

FIG. 10B is a block representative of a display in accordance with the present invention.

FIG. 11 is a legend to the stippling used in the Figures.

FIG. 12C is a block representative of a display in accordance with the present invention.

FIG. 15D is a block representative of a display in accordance with the present invention.

FIG. 15E is a block representative of a display in accordance with the present invention.

DESCRIPTION

Figure 1:
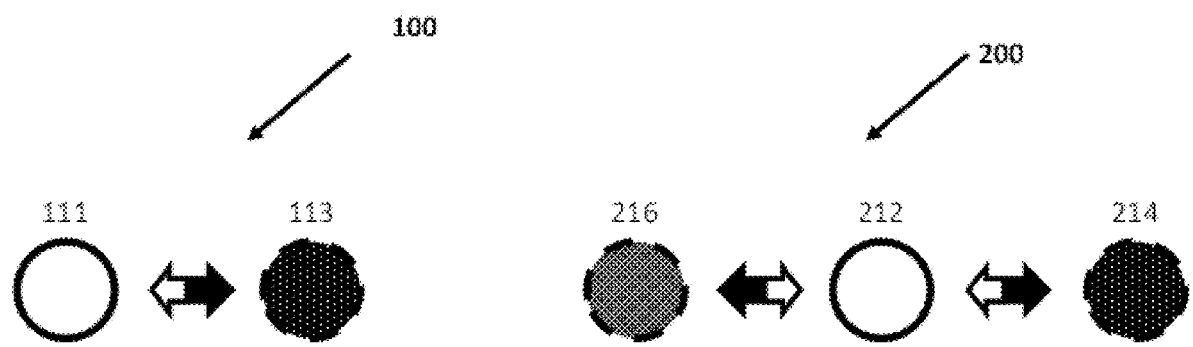
FIG. 1 is a diagram showing operable states and corresponding optical states for a display in accordance with the present invention.

Described herein are polymorphic electro-optic displays ("polymorphic displays"). Polymorphic displays are unitary apparatus having multiple operable properties. Of particular interest are the operable properties, individually and in combination, of stability, switching and transition sequencing.

Mono-stable, bi-stable, multi-stable, permanent

Electrically switchable, self-switchable, non-switchable

Reversible, irreversible, repeatable

Polymorphic displays may be constructed to have multiple types of electro-optic display pixels ("pixels"), each type having different operable properties. Polymorphic displays may also be constructed with "polymorphic pixels" described herein, that individually have multiple operable properties, and are independently operable to produce different operating states.

The operable properties of a polymorphic display's pixels determine its possible operating states, e.g. whether the pixel is stable or volatile, switchable or self-switching from one state to another or not switchable once in a previously switched to state, or the transition sequence is forward, forward-only (irreversible), reverse, or branching, or a combination thereof.

The optical state of a polymorphic display's pixel corresponds to the pixel's operating state[s] according to the pixel's optical properties. For example, one polymorphic display pixel may be white in a stable, first state, and dark blue in a volatile, second state, and red in a third, stable state.

It is important to note that the pixels of conventional electro-optic displays, are of the same type. A mono-stable display for example will have only mono-stable pixels while a bi-stable display will have only two stable, electrically switchable pixels. The pixels of common (non cholesteric) LCDs are mono-stable, but each is the same as the others. The pixels of three-color electrophoretic displays are multi-stable, that is they are stable in three states, but the pixels themselves are all the same.

Pixels have at least two optical states according to their optical properties that typically include color perceptible to the human eye. For a passive (non-emissive) display pixel the optical state of the pixel may in general be determined by the resulting optical reflectivity, transmission, or polarization, of the pixel (at a specific wavelength or wavelength range of the illuminating source), whereas for an emissive display it may be determined by the intensity, polarization and spectral composition of the emitted light. In the case of displays intended for machine reading, the optical state of the pixel may, e.g., be determined by a pseudo-color in the sense of a change in reflectivity at electromagnetic wavelengths outside the human visible range.

Pixels may be of various sizes, shapes, patterns and configured to stand alone or in groups (e.g. as segments to create alphanumeric characters, or RGB super pixels). Pixels typically comprise an electro-optic layer with electrodes either in direct contact with, or in close proximity to, the electro-optic layer. Depending on desired operable properties of the display pixels, the composition of their electro-optic layers may comprise for example, electrochromic materials, liquid crystals, electrophoretic particles, electrowetting fluids, electro-liquid powder materials, etc.

Display pixels may be categorized according to the operable properties associated with them being mono-stable, bi-stable and multi-stable, and polymorphic. Descriptions of the pixel types are described in general below, and later in detail.

Mono-Stable Pixels

Mono-stable pixels have one, stable operating state (and corresponding optical state) and a second, volatile operating state (and corresponding optical state). Mono-stable pixels also have the stability operable properties of being reversible and self-switching. That is, they automatically, or "self", switch from their volatile operating state to back their stable, first operating state when power to the pixel is terminated (or drops below a threshold necessary to maintain the state).

A mono-stable pixel's first, operating state is stable without power. When an electrical switching signal is applied to a mono-stable pixel, the pixel transitions from a stable, first operating state to a volatile, second, operating state. The volatile operating state is maintained as long as a maintenance signal is applied to the pixel. When the maintenance signal is terminated (for whatever reason) the pixel self-switches from the second operating state back to the first, stable operating state. Examples of mono-stable displays comprised of mono-stable pixels are common LCDs (liquid crystal displays), EPDs (electrophoretic and ECDs (electrochromic displays), and LEDs (light-emitting diodes) and OLEDs (organic light-emitting diodes).

The operable states and corresponding optical states of an exemplary mono-stable pixel 100 are illustrated in FIG. 1. In this example, the first operating state 111 is stable and switchable, and its corresponding optical state (color) is white. Note that FIG. 11 presents a legend for colors-to-patterns, shapes and symbols used in the other figures. The second operating state 113 is volatile, self-switchable (reversible), and its corresponding optical state is purple. When self-switched (power is terminated to the pixel) the pixel transitions back (reverses) to the stable, first operating state 111, and corresponding optical state (white).

FIG. 1 Also illustrates a mono-stable pixel 200 similar to mono-stable pixel 100. Mono-stable pixel 200 however has an optional second volatile, self-switching operating state 216, and a corresponding blue optical state. As with the first volatile, self-switching operating state of pixel 100, pixel 200 self-switches from the optional second volatile operating state 216 to the stable, first operating state 212 when power to the pixel is terminated or disrupted.

The pixel 200 has the transition sequence property (described later) of branching, that is the property whereby the transition sequence depends on the current state of the pixel and the switching signal. In this example, a first switching signal transitions the pixel from its stable, switchable first operating state 212 to a first volatile, self-switchable operable state 214, and a corresponding optical state, in this case purple. After the pixel 200 has self-switched to the stable, switchable first operating state 212, a second switching signal (different than the first) transitions the pixel to a second volatile, self-switchable operable state 216, and corresponding optical state, in this case blue.

Bi-Stable and Multi-Stable Pixels

Bi-stable pixels have two stable operating states. Switching between the two, stable operating states is accomplished with an electrical switching signal. Once switched, the operating state (and the corresponding optical state) persists when the power is terminated (without a maintenance signal).

Bi-stable pixels may be reversible (e.g. EPDs, conventional ECDs, cholesteric, ferroelectric or zenithal bistable LCDs) or irreversible (as described in U.S. Pat. No. 9,030,724 Flexible and Printable Electrooptic Devices). Conventional bi-stable pixels are electrically switched and are not self-switching (but always switchable). Some pixels characterized as bi-stable however, have limited persistence in one or the other optical states. In other words, some bi-stable pixels are self-switching over time. Such pixels, may therefore be more accurately considered mono-stable with limited persistence in the second operating state (the first being unpowered).

Figure 2:
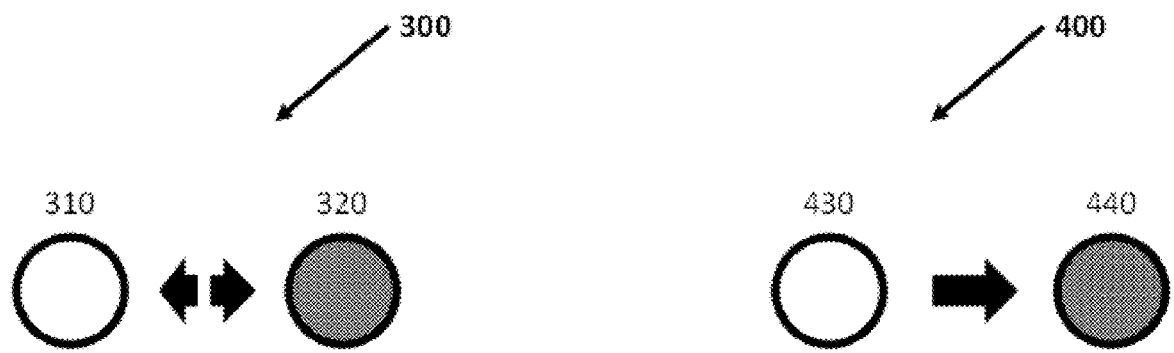
FIG. 2 is a diagram showing operable states and corresponding optical states for a display in accordance with the present invention.

The operable states and corresponding optical states of exemplary bi-stable pixels are illustrated in FIG. 2. Pixel 300 has a first operating state 310 that is stable and switchable, and a corresponding optical state (color) that is white. The second operating state 320 is also stable and switchable (and reversible), and its corresponding optical state is red. Note that a maintenance signal is not required for the pixel to remain in the second operating state once switched from the first operating state. Note further that the second operating state is not self-switching, and a switching signal is required to switch from the second, stable operating state, and corresponding optical state, back to the first stable operating state.

Pixel 400 is also bi-stable however unlike the pixel 300 in the previous example, once switched from the first stable, switchable operable state 430 to the second, stable operable state 440, pixel 400 is non-switchable (not switchable or self-switching). In the second operable state, pixel 400 is irreversible and permanent. It cannot be switched (transitioned from the second operable state to the first) and has the stability property of being non-switchable and a transition sequence property of being irreversible.

In addition to bi-stable pixels there are a few types of multi-stable pixels, typically having three, stable states. One example are the pixels in three-color, electrophoretic displays. Each pixel contains three distinct particle types (e.g., pigment or dye particle) corresponding to different colors. Note however that as with conventional mono-stable and bi-stable displays, the operable properties of the pixels are the same.

Figure 3:
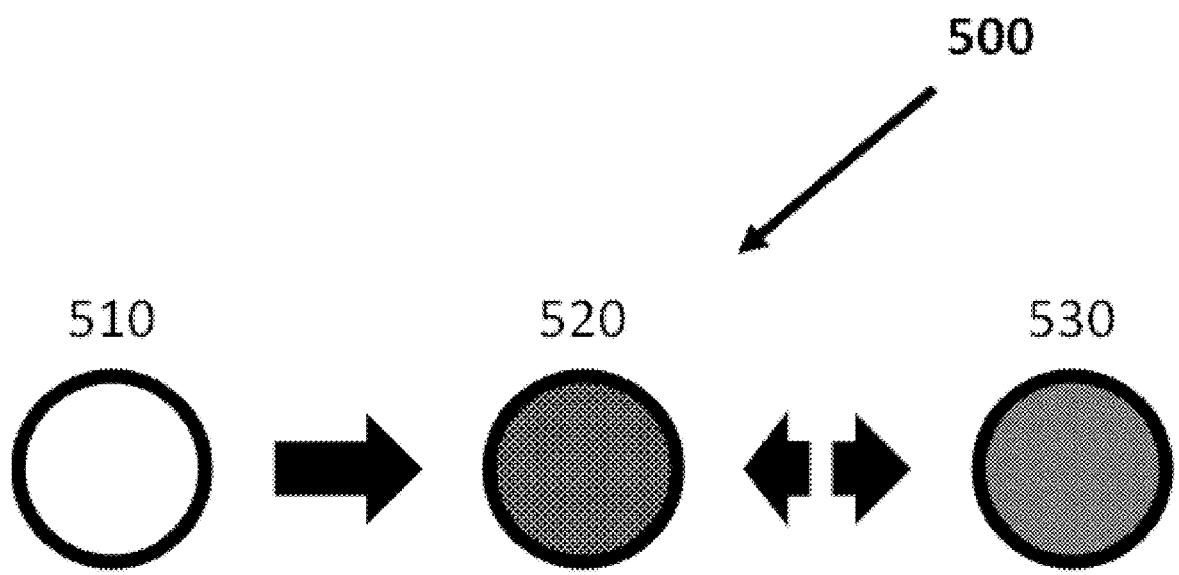
FIG. 3 is a diagram showing operable states and corresponding optical states for a display in accordance with the present invention.

The operable states of a multi-state pixel 500 are illustrated in FIG. 3. In the first operating state 510 pixel 500 is stable, switchable (forward-only, irreversibly) with a corresponding optical state (color) that is white. The second operating state 520 is also stable and switchable, with a corresponding optical state (color) that is blue. In the second operating state however, the transition sequence is forward-only to the third operating state 530. It cannot be switched to the first stable operating state from the second stable operating state. The third operating state 530 is also stable and switchable, and has a corresponding optical state (color) that is red. Unlike the pixel when in the second operating state 520, when the pixel is in the third stable operating state 530, it can be switched back to its previous operable state 520. And further, unlike the transition from the first operating state to the second, the transitions from the second operating state to the third operating state, and the reverse, are repeatable. The transition sequence therefore comprises three inter-state transitions (described later), one which is forward-only and irreversible, and two that are forward-only, reversible and repeatable.

Polymorphic Pixels

Polymorphic pixels may be constructed to have various combinations of operable properties. Polymorphic pixels have at least two stable operating states, an unpowered, first state and at least one other stable state which may for example be irreversible and permanent as previously described. They also have one or more volatile operating states.

Figure 4:
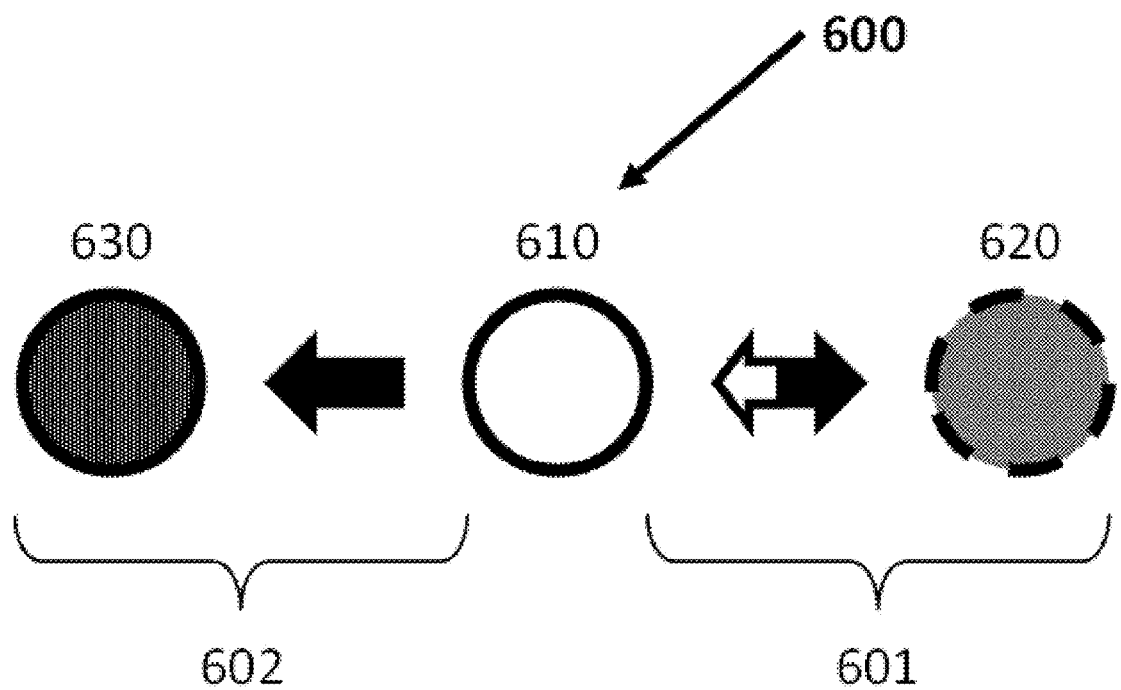
FIG. 4 is a diagram showing operable states and corresponding optical states for a display in accordance with the present invention.

FIG. 4 illustrates the operable states of a polymorphic pixel 600. The pixel has two stable operating states 610 and 630 and one volatile operating state 620. Pixel 600 also has two transition sequence branches 601 and 602. The transition sequence branch is selected with a switching signal that determines the next operating state. Branch 601 comprises a first operating state 620 that is stable, switchable with a corresponding optical state (color) that is white. Branch 601 also comprises a second operating state 620 that is volatile, self-switching with a corresponding optical state (color) that is red. Upon termination or disruption of a maintenance signal, pixel 600 will self-switch and transition from the volatile, self-switching state 620 to the previous operating state 620. Branch 601 comprises two inter-state transitions which are both reversible and repeatable, until and unless, transition sequence branch 602 is selected with a switching signal that transitions to operating state 630.

Branch 602 comprises the same first operating state 620 as branch 601, however unlike branch 601 it has a second operating state 630 that is irreversible and permanent. Because operating state 630 is irreversible and permanent, branch 602 comprises only one inter-state transition, a forward, irreversible transition from operating state 620 to operating state 630. Once switched (transitioned) along branch 602 to operating state 630 by an appropriate switching signal, the pixel is no longer switchable (non-switchable). In total the transition sequence property for pixel 600 includes three inter-state transitions (two repeatable, and one irreversible).

FIG. 7 illustrates the operable states of another exemplary polymorphic pixel 900. The pixel in this case has two stable operating states 905 and 908 (and two corresponding optical states, white and black respectively). Pixel 900 also has two volatile operating states 906 and 910 (and two corresponding optical states, red and purple respectively). In total, polymorphic pixel 900 has four possible operating states and corresponding optical states (red, white, black and purple). Unlike polymorphic pixel 600 polymorphic pixel 900 has a transition sequence comprising two branches 902 and 903. The branch selected depends on the switching signals and the prior operating states of the pixel. In the first operating state 905 pixel 900 is stable, switchable with a corresponding optical state (color) that is white. The transition sequence along branch 902 consists of a stable, switchable first operating state and a volatile, self-switching second operating state. Branch 902 is reversible and repeatable until the pixel is operably switched to branch 903.

The transition sequence along branch 903 consists of the same first operating state 905, stable, switchable with a corresponding optical state (color) that is white. Branch 903 also comprises a stable, switchable second operating state 908 with a corresponding optical state (color) that is black. Once switched from the first operating state 905 to the second operating state 908, the pixel cannot transition back to operating state 905. The transition sequence from 905 to 908 is not reversible (irreversible) and is therefore not repeatable. From operating state 908 the transition sequence is only forward to operating state 910. The third operating state 910 along branch 903 is volatile, self-switching with a corresponding optical state (color) of purple. The inter-state transitions between operating states 908 and 910 are therefore reversible and repeatable.

The transition sequence along the entire branch 903 from operating state 905 to operating state 910 includes both forward, irreversible transitions and forward, reversible transitions. Note that the once the polymorphic pixel 900 is switched and transitions to branch 903 (from operating state 905 to operating 908) it cannot be switched, transition to branch 902 and operating state 908. The polymorphic pixel 900 can however effect different operating states along branch 902 and then switch be switched, transition to branch 903.

Transition Sequencing

An operable property of pixels is transition sequencing, that is, the property of being able to transition between multiple, different operating states in sequences that include forward, forward-only (irreversible), reverse (reversible), repeatable and non-repeatable and combinations thereof. A transition sequence is comprised of inter-state transitions, that is transitions between two consecutive operable states of a pixel. Exemplary transition sequences are described below and illustrated in embodiments 100, 200, 300, 400, 500, 600, 900, and 1000. Transition sequencing also includes branching. Branching is the property of being able generate different sequences of inter-state transitions from a particular operable state of the pixel. A branch is created by effecting one of a plurality of transitions according to different electrical signals. Embodiment 200 illustrates simple transition sequence including branching for a mono-stable pixel. Of particular interest are complex transitional sequences for polymorphic pixels including branching properties such as those illustrated in embodiments 900 and 1000.

Note that the conventional terms reversible and irreversible imply the ability, or lack of ability, of a pixel to reverse or switch back to a previous operating state. Polymorphic displays introduce the ability to electrically switch (with a switching signal) or self-switch (by terminating a maintenance signal) the operating state from one to another operating state that is other than the previous one. Note as well, that the transition sequencing property of polymorphic pixels can be produced using a variety of different polymers and combinations of them, e.g. with mixtures combining more than one type, or depositing more than one layer of them within the polymorphic pixel.

The ability to create different, fit-for-purpose transition sequences is an important benefit of polymorphic displays and as described below, of polymorphic pixels. Of particular benefit of the property of transition sequencing is the ability to selectively and dynamically determine and effect a transition sequence, and therefore the operable properties of a polymorphic pixel or polymorphic display, responsive to different electrical signals. And further, where the electrical signals are generated responsive to various conditions, events and actions etc., such as those common to intelligent display devices described later herein.

Polymorphic Displays

In its simplest embodiment, a polymorphic display is an electro-optic display comprising a single polymorphic pixel. More typically however, a polymorphic display is a unitary apparatus constructed having at least two pixels, the pixels having at least some of the following elements in common: structure, materials, circuitry, and optionally a display driver IC. As previously described, the display pixels may be of different types according to their operable properties.

The structure of a polymorphic display determines its physical form. The structure comprises for example, substrates, spacers, matrices, separators, spacers, barriers, sealants, transparent/viewing surfaces (e.g. 'windows') etc. typically, but not always, organized in layers that preferably lend themselves to high volume manufacturing processes (e.g., printing, spray casting, roll-to-roll manufacturing etc.). A polymorphic display's structure complements that of the electro-optic materials, other materials (e.g. adhesives) and electrical circuitry (including electrodes). For example, the electro-optic layers of different pixel types (e.g. electrochromics, LCDs, EPDs etc.) are often constructed with materials that are fluid or semi-solid and therefore that depend on various structures to hold them. And importantly, to reliably couple to the electrical circuitry.

A polymorphic display's electro-optic layer, and the pixels of which they are made, may share common materials. Such materials may for example be constructed as a single, continuous layer across multiple pixels, such as the electrolyte illustrated in FIGS. 5A and 10A. Alternatively, a material (e.g. the electro-optic material 710 of FIGS. 5A and 1310 and 1320 of FIG. 10A) may be common to some but not all the pixels, and may be constructed as discrete, spatially separated elements within same physical layer (or the same manufacturing process). Such patterning advantageously allowing for other common materials to be interspersed among them.

As noted previously, a pixel comprises an electro-optic layer with electrodes either in direct contact with, or in close proximity to, the electro-optic layer. The electrodes are configured for applying electrical signals to the pixels individually or in groups and are typically formed on common structure (e.g. flexible substrates or layers). The electrodes may be configured in various ways including vertical (e.g. on the top and bottom surfaces of an electro-optic layer, interdigitated (both electrodes are on the same layer), or combinations of both. Typically, but not always, the electrodes on the side or sides of the electro-optic layer facing the viewing surface or surfaces, are transparent e.g. ITO or transparent, conductive silver-inks patterned on PET.

The pixel electrodes may be exposed for connection to circuitry of another device such as an intelligent display device describe herein. The electrodes may also be coupled to additional circuitry and components (e.g. display driver IC, backplane etc.) constructed as part of the polymorphic display apparatus (e.g. using common structure), for pixel addressing, signal management/noise reduction, visible verification (such as that described in U.S. patent application Ser. No. 14/927,098 Symbol Verification for an Intelligent Label Device, and Ser. No. 15/368,622 Optically Determining Messages on a Display) etc.

Figure 5B:
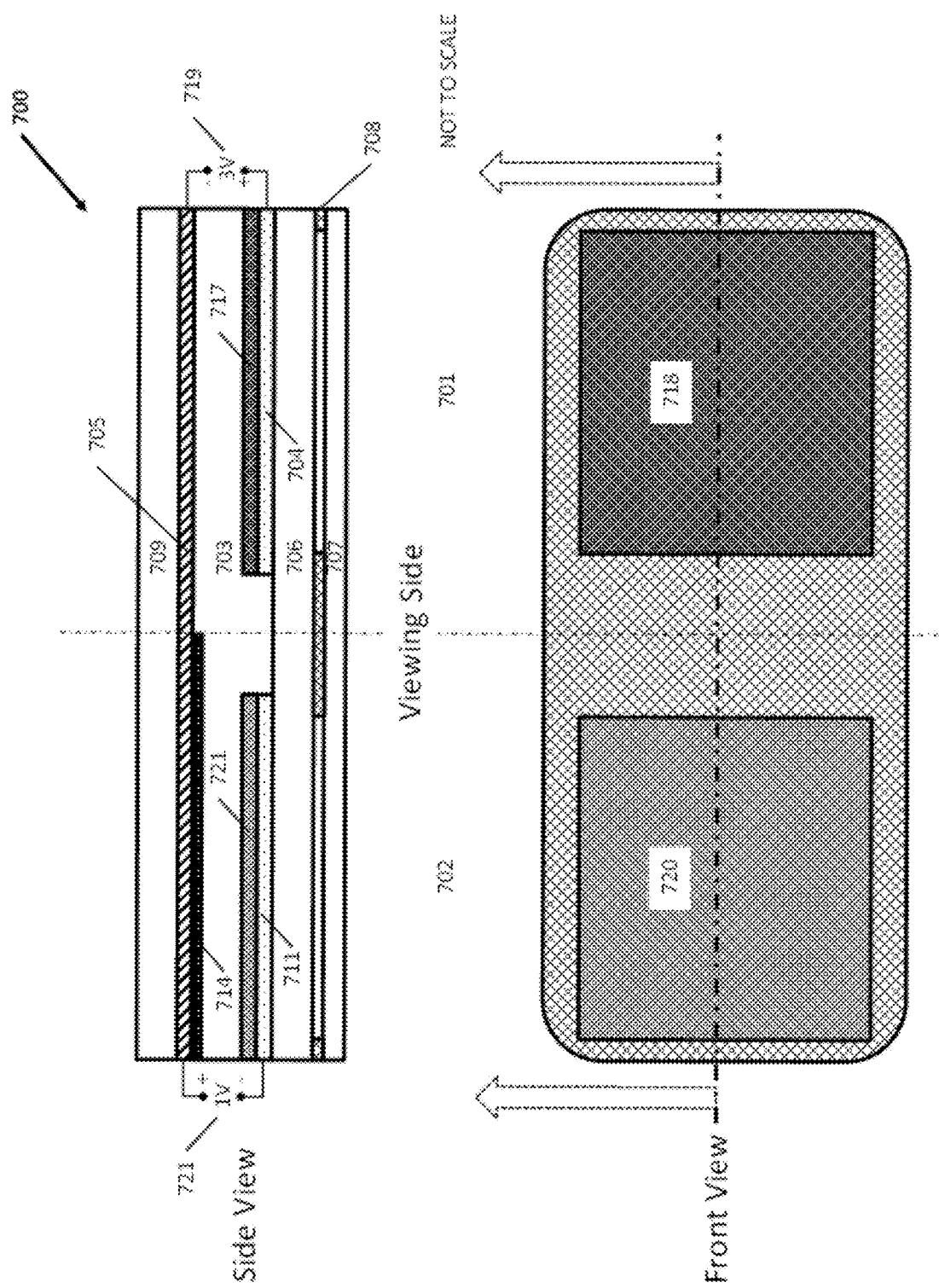
FIG. 5B is a block representative of a display in accordance with the present invention.
Figure 6A:
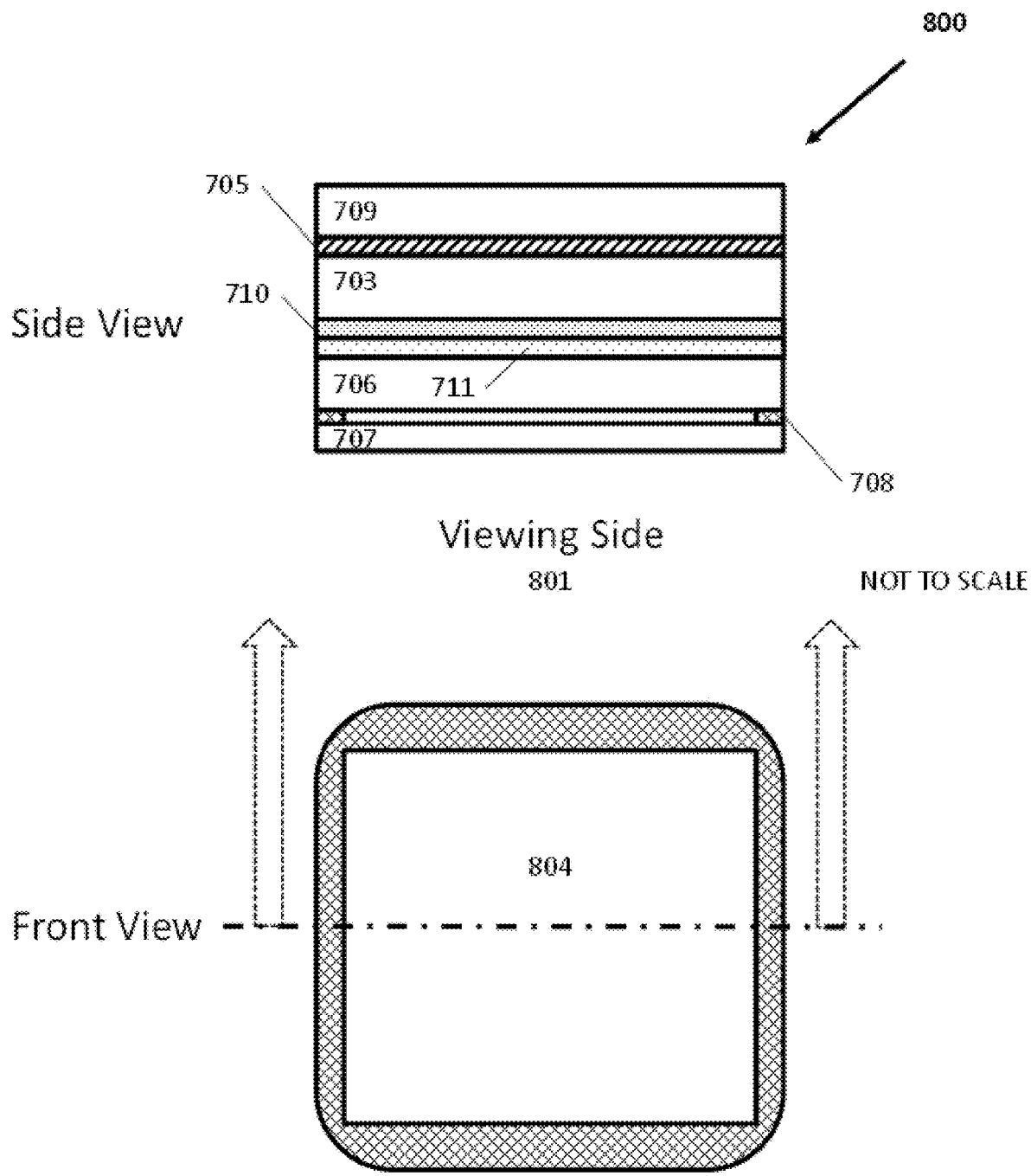
FIG. 6A is a block representative of a display in accordance with the present invention.
Figure 6B:
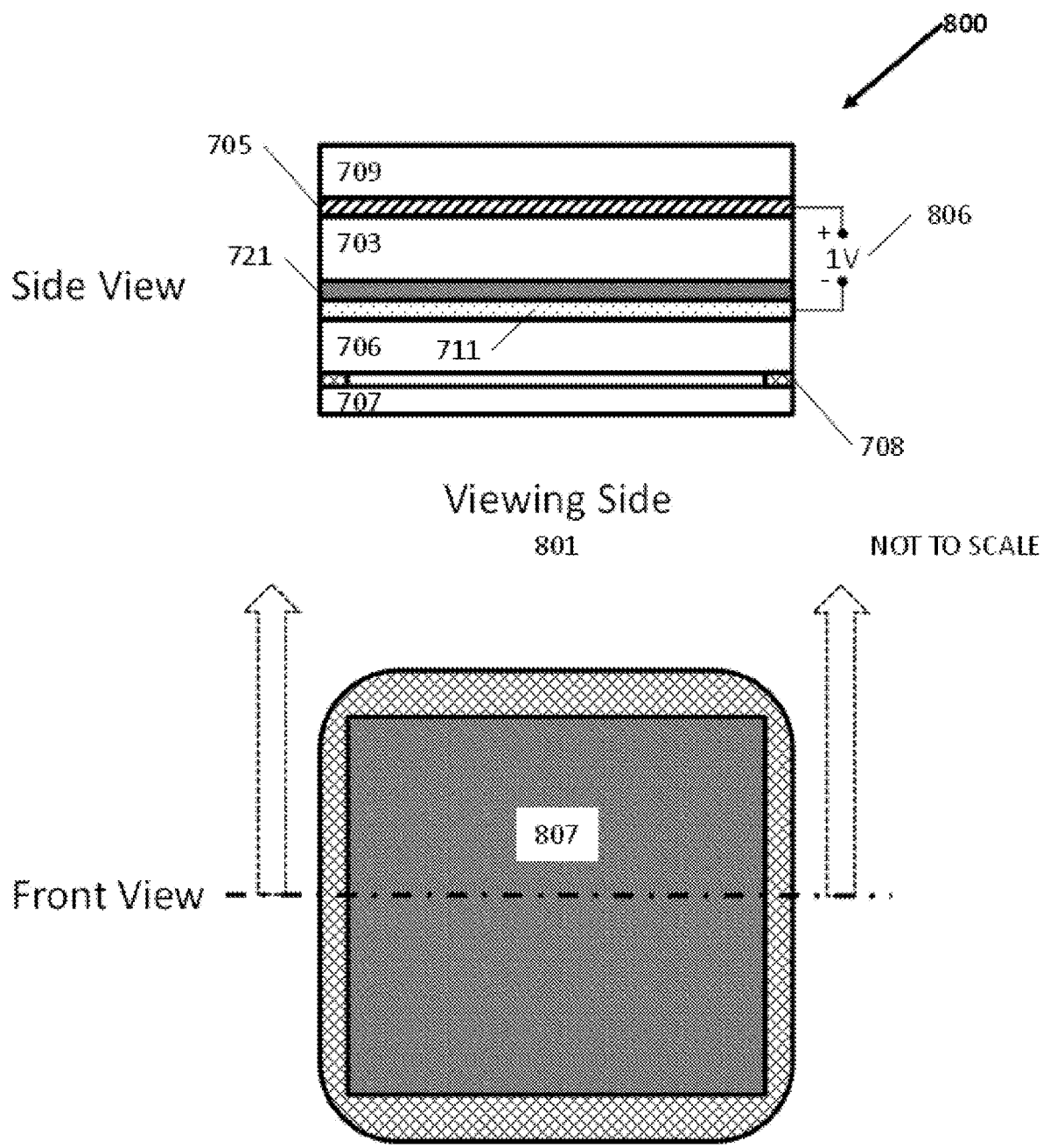
FIG. 6B is a block representative of a display in accordance with the present invention.
Figure 6C:
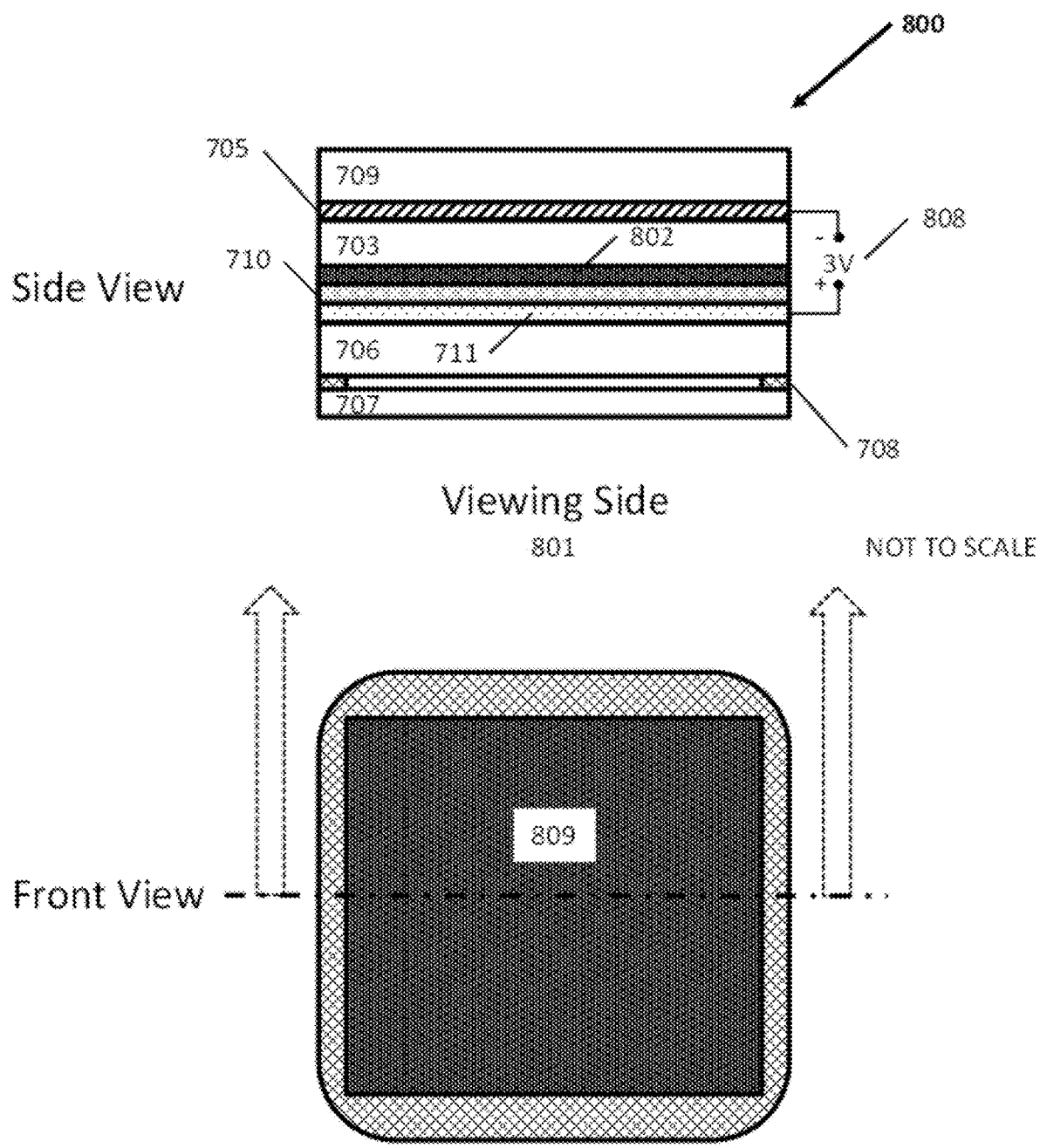
FIG. 6C is a block representative of a display in accordance with the present invention.
Figure 6D:
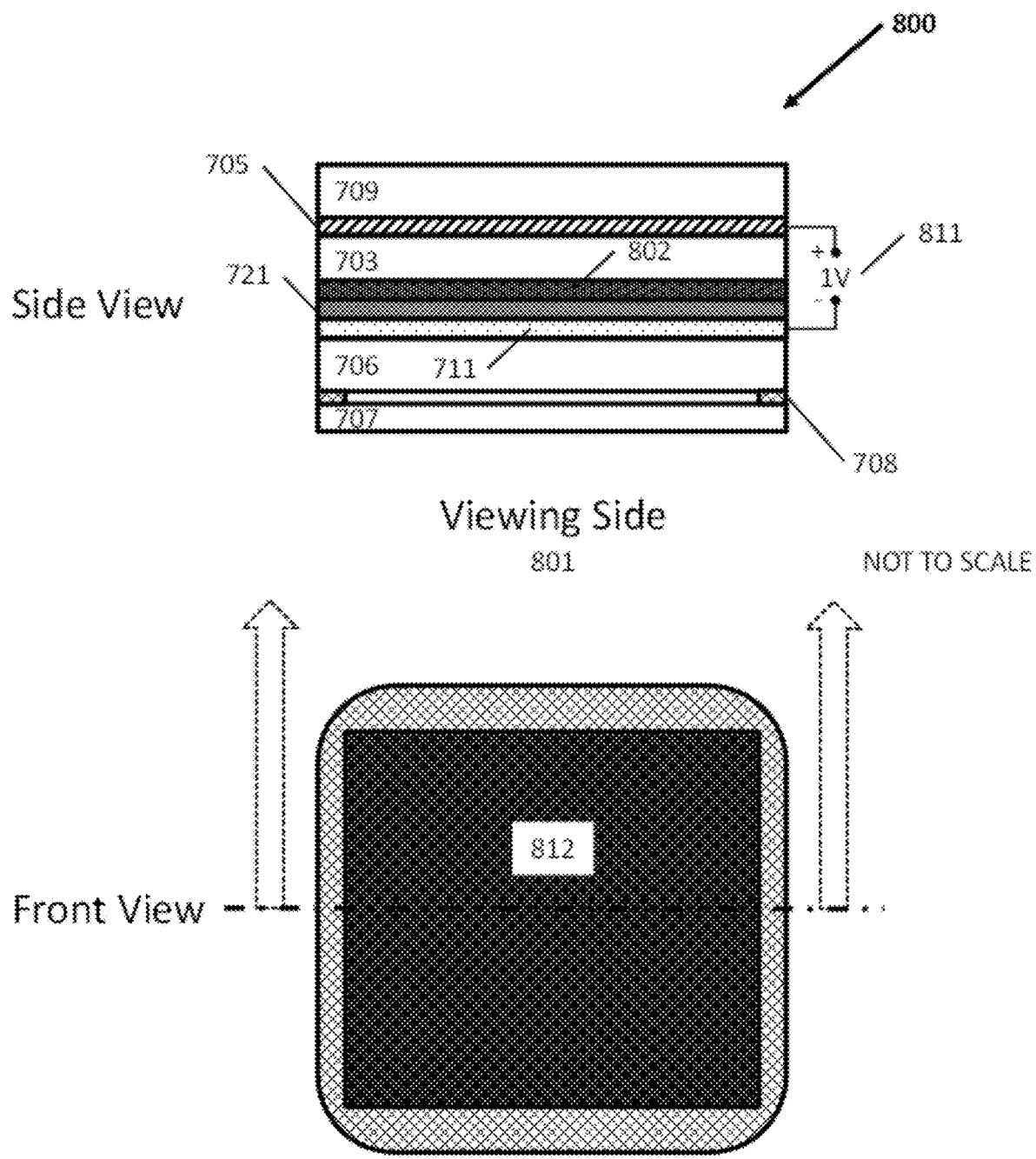
FIG. 6D is a block representative of a display in accordance with the present invention.
Figure 6E:
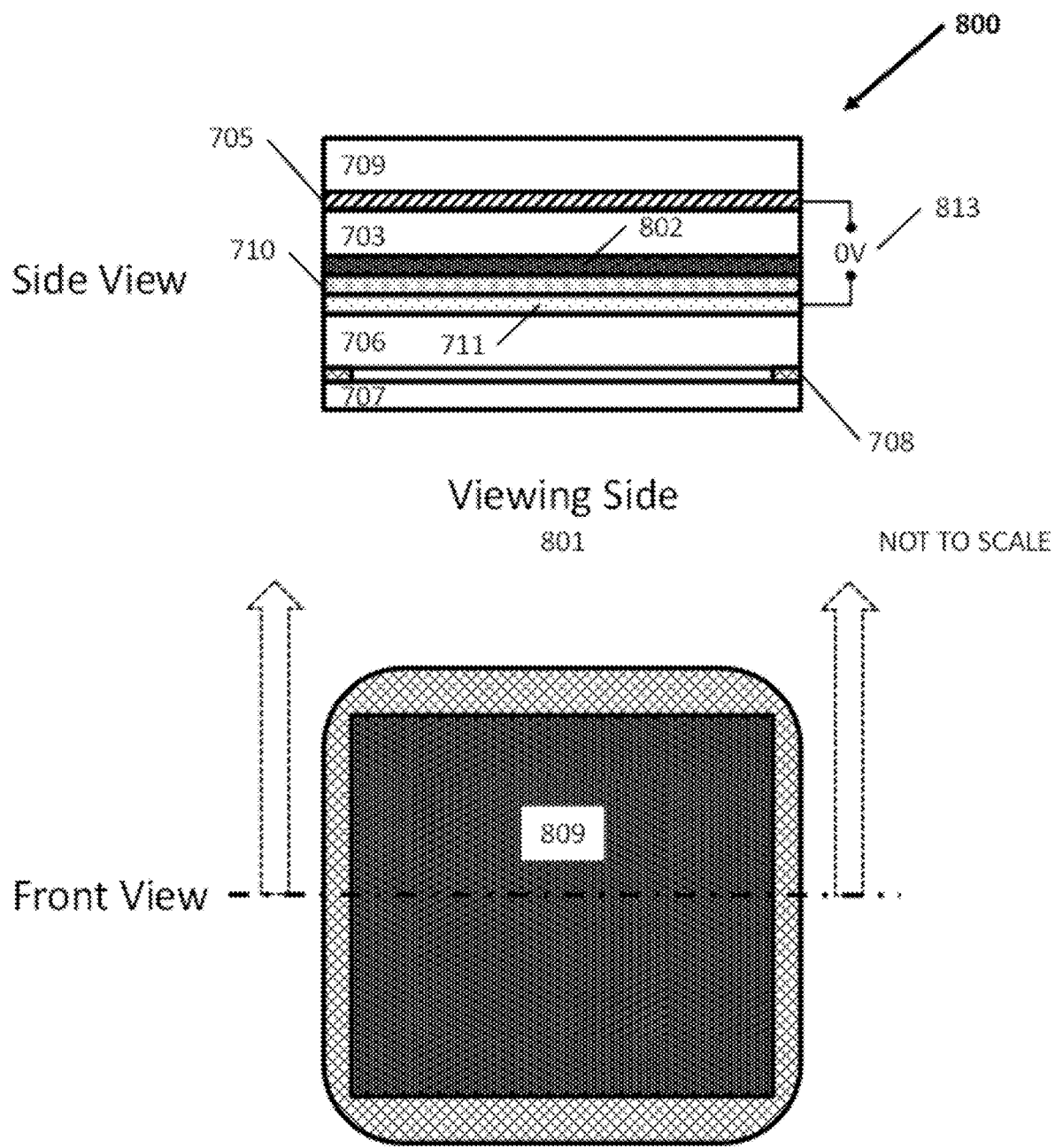
FIG. 6E is a block representative of a display in accordance with the present invention.
Figure 9A:
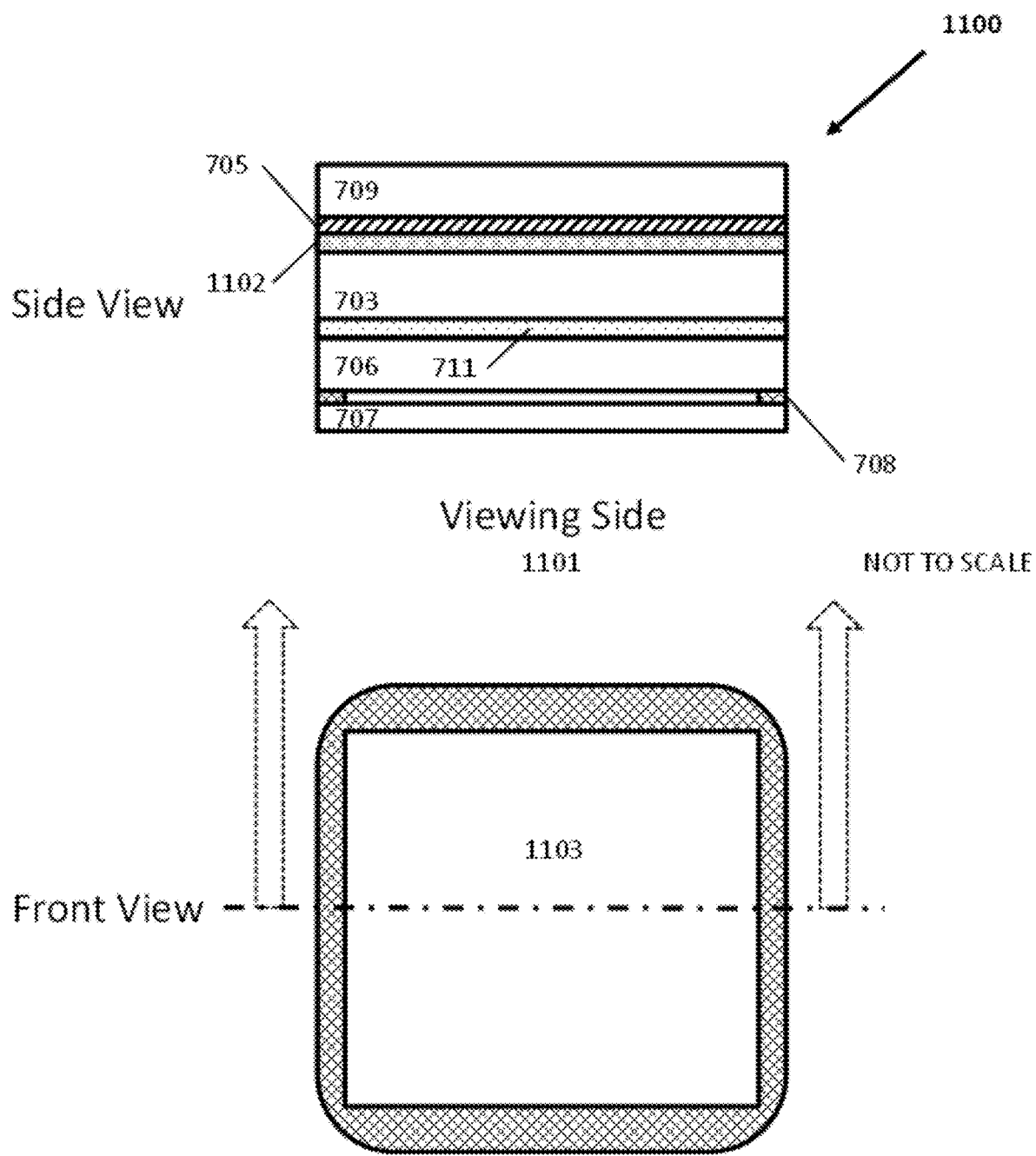
FIG. 9A is a block representative of a display in accordance with the present invention.
Figure 9B:
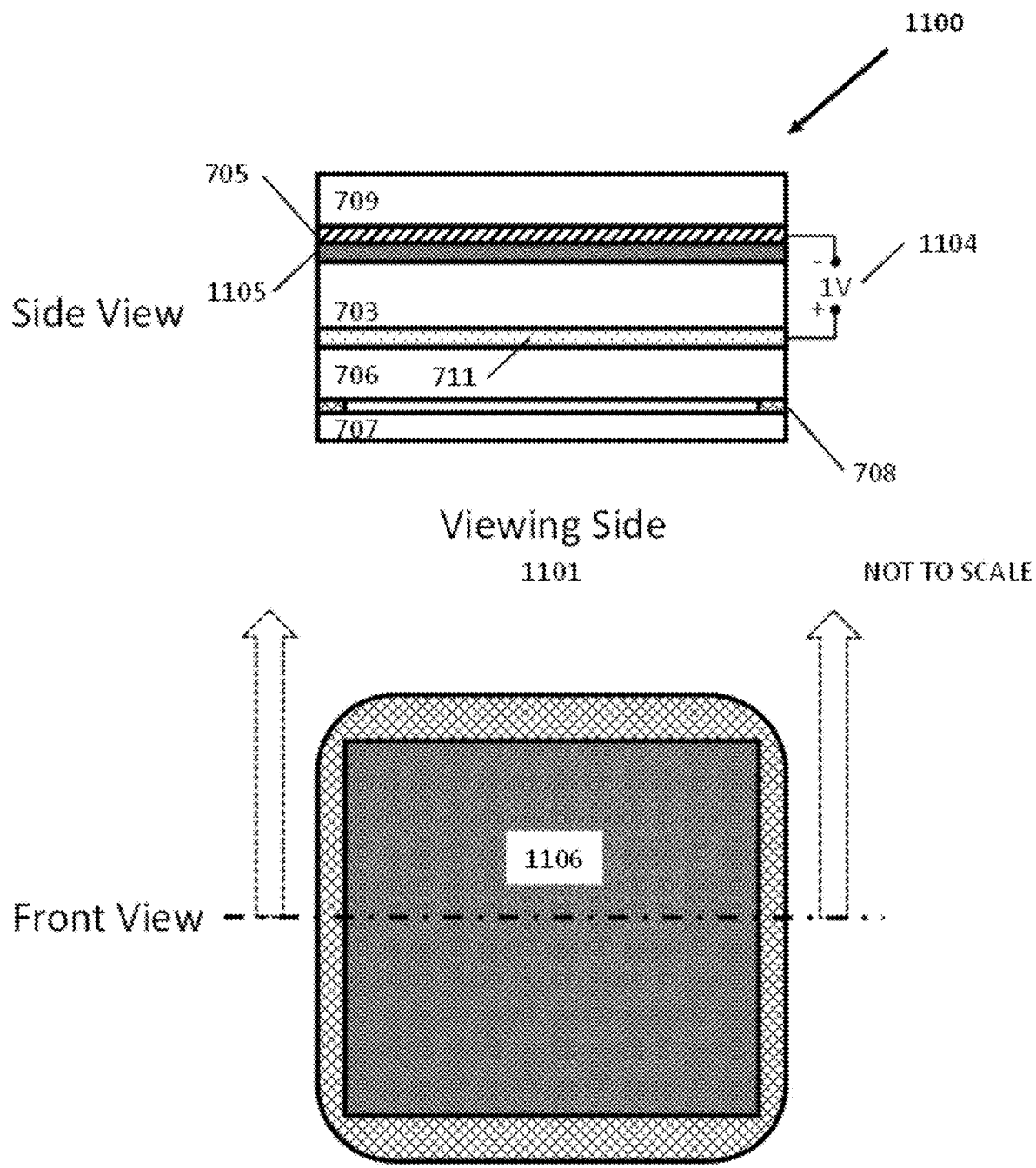
FIG. 9B and FIG. 9C are block diagrams representative of a display in accordance with the present invention.
Figure 9C:
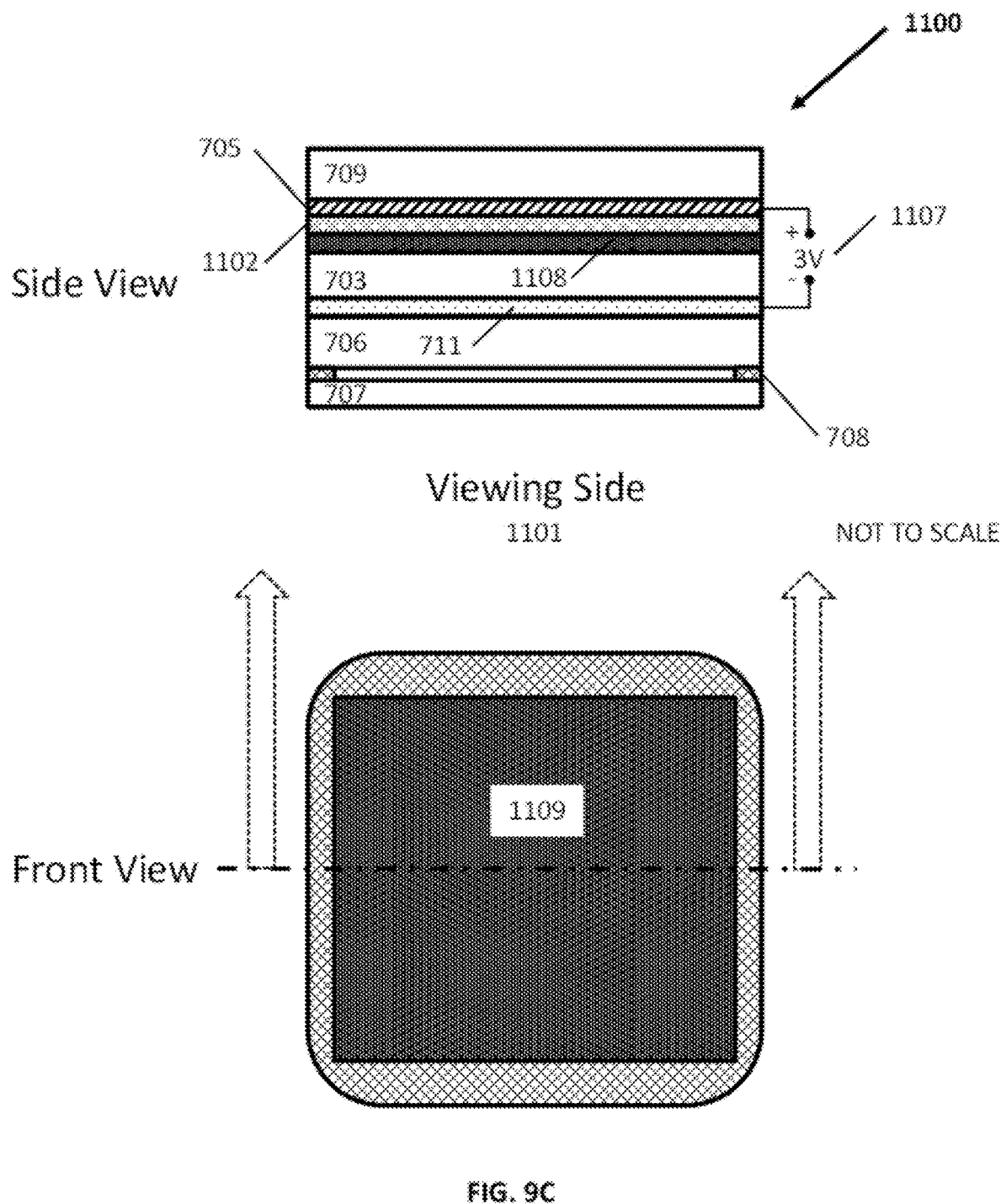
Figure 10A:
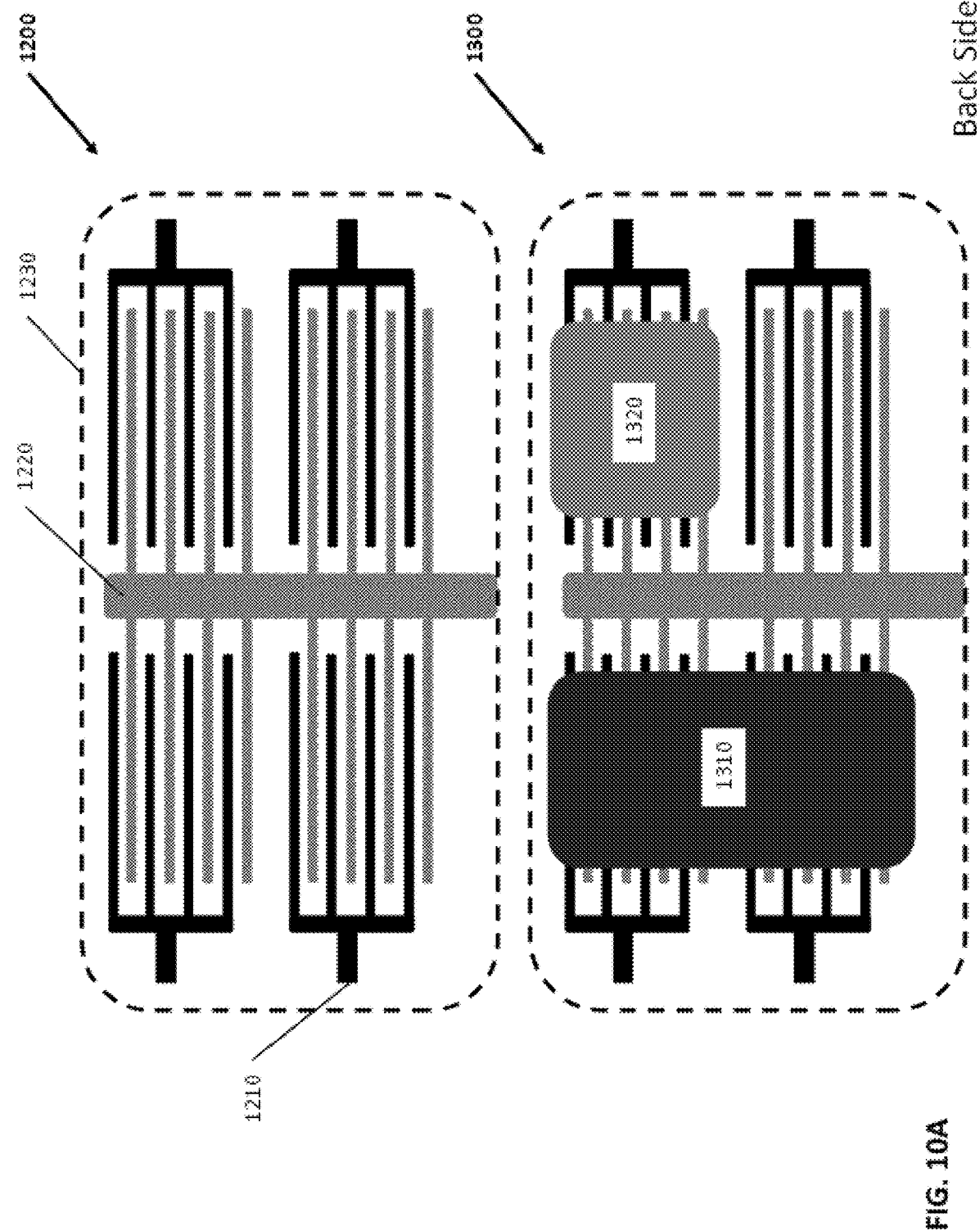
FIG. 10A is a block representative of a display in accordance with the present invention.

As illustrated in FIGS. 5A, 6A and 9A, exemplary display pixels 700, 800 and 1100 are configured with electrodes on the surfaces of the electro-optic layer (e.g. front and back). The electrodes however may be configured as interdigitated pairs located on a single surface. This may allow for simpler, lower cost manufacture, thinner devices, and in some cases may advantageously enable different operable and optical properties. And in some designs, interdigitated electrodes may work cooperatively with conventional surface electrodes. FIGS. 10A and 10B is an exemplary four-pixel structure employing interdigitated electrodes and different, patterned material layers to create pixels having different operable (and associated optical) properties. The viewing perspective is from the back of the structure. Note that the illustrations are intended only to focus on certain elements of a polymorphic display and not completed devices. Note further, the common material layers of which some are patterned and some continuous across the pixels.

The first layer 1200 of the four-pixel structure (viewed from the back) is a transparent substrate 1230 having interdigitated electrode 1220 and four companion electrodes 1210 (of which only one is numbered). Electrode 1220 is common to the four companion electrodes, all of which are collectively part of the display circuitry. Each of the interdigitated patterns are the foundation for four individual pixels. Structure 1300 shows layer 1200 with printed (or otherwise deposited) polymer 1310 and a different polymer 1320. Polymer 1310 spans two pairs of interdigitated electrodes so the corresponding pixels will have the same operable properties. Polymer 1310 covers a single electrode pair and the corresponding pixel will have operable properties different from the other three. Structure 1400 shows layer 1300 with a printed (or otherwise deposited) opaque electrolyte 1410. Electrolyte 1410 is an opaque EC mix. In this example, all three of the pixels with polymer layers will have the properties of being volatile, self-switchable. The fourth interdigitated electrode pair (the one without a polymer layer) will have the properties of being stable, switchable, irreversible and permanent. Structure 1500 is the same as structure 1400 with a transparent EC mix instead of the opaque EC mix 1410. This integrated, process friendly structure comprises four separately operable pixels, three having the properties of being volatile, self-switching (two of one type, and one of another) and one having the same operable properties of being irreversible and permanent.

Signal Protocol

A signal protocol is used by the processor to manage the different switching signals and maintenance signals according to the types of pixels which comprise the polymorphic display. The signal protocol provides the timing, duration, pattern (e.g. pulse shape, sequence), frequency, voltage or current, polarity etc. required by the processor to generate the appropriate signals.

Switching Signal

A switching signal is an electrical signal applied to a pixel for setting the operating states of the pixel (e.g. for switching from one operating state to another).

Maintenance Signal

A maintenance signal is an electrical signal applied to a pixel in a volatile state (self-switching) to maintain its current operating state. The maintenance signal is often different from the switching signal that switched the pixel to the current volatile operating state that is maintained by the maintenance signal.

Intelligent Display Device

An intelligence display device is an apparatus comprising a polymorphic display, and some or all of electronics, a power apparatus and appropriate to the application, a communication apparatus, sensors, and actuators. An intelligent display device is typically a unitary apparatus configured to be coupled or combined with a good or its packaging. Often, but not always, the intelligent display device is low cost, often disposable, low power and small in size. In some applications, though the intelligent display device is significantly larger and designed to present high-content messages or messages to be read by humans or machines at a distance. Exemplary configurations include labels, patches, tags, smart-cards, loyalty cards, packaging, containers, seals, caps, documents, test/sensing/monitoring devices, terminals, electronic-shelf labels, free-standing displays, electronics devices etc.

Electronics

In addition to a polymorphic display, intelligent display device includes electronic functions, for example, processor, memory, clock/timer, security, verification, communications and sensors, etc. that may be integrated into a single electronic device or implemented with discrete components.

The electronics will also typically include display driver circuitry configured to store and process appropriate data and algorithms (e.g. a signal protocol), temperature compensation etc. to generate the electricals to the polymorphic display and pixels it comprises. The display driver circuitry may be advantageously configured with the processor and memory or one or more separate components. And further, the display driver circuitry may be configured as part of the polymorphic display or as part of the electronic functions of the intelligent display device, or, distributed between the two.

Power Apparatus

The intelligent display device includes one or more power apparatus for powering the electrical functions in the intelligent label including a polymorphic display. Exemplary power apparatus include internal energy storage such as batteries or charged capacitors, wired interfaces capable of receiving electrical energy, wireless energy harvesters, or a combination thereof. The energy harvester for example, may produce electric energy from light (e.g. solar cell), RF energy (e.g., antenna/rectifier), thermal energy (e.g., thermopile), or shock and vibration (e.g. strain gauges, nanogenerators, MEMS devices) that the intelligent label device is subject to.

Communication Apparatus

Typically, the intelligent display device also has electronics that enable wireless or wired communication to or from the intelligent label. Exemplary wireless communication apparatus includes those that support Wi-Fi, Bluetooth, BLE, RFID (e.g. RAIN or NFC), ZigBee and other local area wireless networks, low power wide area (LPWN) and cellular and other wide area networks. Intelligent display devices may include support for portable memory chips, cards, sticks and other portable memory storage devices.

Sensors

An intelligent display device may have one or more sensors sensing the inside or outside environment (outside or inside the intelligent display device), the polymorphic display or other components or systems of the intelligent display device. Exemplary sensors include a temperature sensor, a humidity sensor, and altitude sensor, a pressure sensor, an optical sensor, a vibration sensor (including a shock sensor), a humidity sensor, biological or a chemical sensor (including a gas sensor, a pH sensor), a magnetic sensor, a smoke sensor, a radiation sensor etc. It will be appreciated that a wide variety of sensors could be used depending upon the particular application.

Actuators

Depending on the application, an intelligent display device, may have one or more actuators. Actuators activate, deactivate or otherwise effect control over electrical functions in the intelligent display device in response to external or internal stimulus, e.g. mechanical action, sensor input, electrical or wireless signals etc. Actuators may be used to activate different electrical functions at different times, e.g. when an item is shipped (the package is sealed) or when an item is received (the package is opened).

Actuators may also minimize power consumption, and thereby maximizing the shelf-life/operating life of intelligent display devices having internal power apparatus, by activating electronics only when appropriate to the application. Actuators, in cooperation with timers/clocks may also be used to establish the time/date an event occurs.

Exemplary actuators include mechanical switches (e.g. the open or close an electrical circuit), electro-optic, electrochemical, electro-mechanical and electro-acoustic devices, wired connectors (for receiving electrical signals), wireless receivers (for harvesting RF energy, receiving RF signals) etc., and are described in U.S. Pat. No. 9,471,862 An Intelligent Label Device and Method.

Example 1 (Polymorphic Display)

FIG. 5A shows an exemplary configuration of a polymorphic display 700 comprising two pixels, each having different operable properties, in side view and front view. For illustration purposes, only two pixels are shown although it is to be understood that a polymorphic display may comprise many such pixels. The right pixel 701 is bi-stable, having a bi-stable, permanent and irreversible second operating state (such as 200 in FIG. 2), whereas the left pixel 702 is mono-stable and self-switchable (such as 100 in FIG. 1).

In regard to bi-stable pixel 701, detailed embodiments of bi-stable, permanent and irreversible display devices and pixels, are disclosed in U.S. Pat. No. 9,030,724 Flexible and Printable Electrooptic Devices. For simplicity, only the key aspects pertaining to the configuration and function of such pixels within a polymorphic display are described herein and presented in 700 in FIG. 5A. Exemplary embodiment 700 consists of an electro-optic layer 703 further including an electropolymerizable monomer, an electrolyte (e.g. ionic liquid), and (optionally) highly reflective particles (e.g. $TiO_2$) collectively, here and throughout, referred to as an "EC mix" ("electrochromic mixture"). The EC mix as illustrated is of a substantially uniform composition. The electro-optic layer 703, in this example, the EC mixture, is sandwiched between a pair of electrodes; a front electrode 704 and a back electrode 705. The front electrode is at least partially transparent (e.g. ITO) and configured on a substantially transparent substrate 706 (e.g., glass, plastic, etc.) and is advantageously sealed with a barrier/protective layer. The back electrode 705 and back substrate/barrier 709 may both either be transparent (for front and back side viewing of the display) or opaque (front side only viewing).

An advantageous mono-stable pixel 702 is now described that is complementary to the exemplary bi-stable pixel 701. Mono-stable pixel 702 uses a conjugated (conductive) polymer film 710 that can switch reversibly between two distinctly different operable states when the polymer is in contact with an electrolyte (such as the one contained in the EC mix 703). The operable states correspond to a conductive (oxidized chemical) state and an insulating (neutral or reduced chemical) state according to the presence of a switching signal followed by a maintenance signal, or the termination or disruption of the maintenance signal. In the presence of an electrical switching signal, the pixel 702 transitions from a stable, first state to a volatile second state. The pixel remains in the volatile second state for the duration of the maintenance signal. When the maintenance signal is terminated (or disrupted for any reason) the pixel self-switches (transitions back) to the stable, first state.

Note that the EC mix 703 of pixel 701 comprises an electrolyte that can function as the electrolyte for pixel 702. The monomer and other materials in the EC mix do not prevent the electrolyte from use in both pixels. Furthermore, as illustrated in FIG. 5A, the two pixels can have in common electrode 705, top and bottom substrates 706, 709, and barrier/protective layer 707. Additionally, they can share a common, patterned electrode layer (and manufacturing process) comprising the pixel's respective front electrodes 704 and 711. They can also share mask layer 708 described below. Not shown is the structure that would encapsulate the entire apparatus (e.g. the side barrier/protective structure) and the appropriate display driver circuitry with connections to the pixel electrodes.

In summary, polymorphic display 700 is a unitary apparatus comprising two pixels, each a different type according to their respective operable properties (bi-stable, permanent and irreversible, and mono-stable), and further that have in common, structure, materials and circuitry.

As noted above, the two pixels 701 and 702 share a single, common electrolyte layer. Furthermore, the switching voltages for the polymer films in the mono-stable pixel 702 are typically significantly lower (near 1V) than that typically required for electropolymerization (near 3V) in the bi-stable pixel 701. This provides an upper threshold means to keep the monomer in the EC mix from electropolymerizing yet allowing the self-switching polymer 710 to switch between operating states by applying a switching signal followed by applying and then terminating maintenance signal across the common back electrode layer 705 and the front electrode 711. Although, the front electrodes, 704 and 711, for the two operable pixel types of the polymorphic display 700 can be made of different (transparent conductor) materials, it is preferably made of the same material by patterning a single front electrode layer deposited onto the single substrate 706. Depending on the locations of the address lines/circuitry to the pixel electrodes of the display (not shown in FIG. 5A), while providing a high display contrast (dark background of the pixel openings), it may be advantageous to mask certain areas by an opaque, light absorbing material 708.

Of particular interest are self-switching mono-stable electrochromic polymers having one stable and one volatile operating state, and two corresponding optical states. These self-switching polymers may be divided into two groups according to their chemical properties corresponding to their operable properties.

One group of electrochromic polymers are switchable from a stable, un-powered operating state corresponding to an oxidized chemical state, and a corresponding clear optical state, to a volatile, self-switching operating state corresponding to a neutral chemical state, and a corresponding colored optical state, and self-switching back to the stable, un-powered operating state and corresponding oxidized chemical state, and corresponding clear optical state. Exemplary polymers of this type include dioxythiophenes (e.g. certain XDOT, such as PProDOT, PEDOT).

Another group of electrochromic polymers are switchable from a stable, un-powered operating state corresponding to a neutral chemical state, and a corresponding first, colored optical state, to a volatile, self-switching operating state corresponding to an oxidized chemical state, and corresponding second, colored or predominately clear optical state, and self-switching back to the stable, un-powered operating state and corresponding neutral chemical state, and corresponding first, colored optical state. Exemplary polymers of this type include thiophene based polymers (e.g. poly(methylthiophene)).

It should be noted that it is possible to achieve various color combinations by blending of two or more of such polymers within the same group and further switching them according to their specific threshold voltages. Additionally, and apart from electrochromic polymers, certain other materials including those based on transition metal oxides or derivatives of bipyridinium, such as, viologen, are self-switching. For instance, viologen can be adsorbed by a porous material, such as nanoparticle-based $TiO_2$, to form an active layer (e.g. in place of the polymer layer 710), or added to the EC mix 703, and may additionally function or co-function as the electrolyte.

It may further be advantageous to include an optional layer (also known as a charge storage layer) consisting of a complementary conducting polymer material 714 on the counter (back) electrode 705, to facilitate the self-switching process and/or to add additional material layers to protect the counter (back) electrode 705 from the electrolyte 703. Examples of such polymers include anodically coloring polymers, such as XDOPs (dioxypyrroles) or alternating copolymers of XDOT and carbazoles such as PEDOT-NMe (Cbz), and cathodically coloring polymer such as XDOTs such as PEDOT or PProDOT, which self-switch to an oxidized state. Cathodic materials may also be deposited to protect a bare counter electrode including derivatives of bipyridinium, such as viologen, and anthraquinone and its derivatives in solution. An opaque or reflective (e.g. $TiO_2$ additive) EC mix may mask the electrochromic characteristics of the above materials, or they may be intentionally included in the resulting optical states as seen from the front side or back side (for a two-sided display).

Self-switching polymer films are typically prepared by spray casting 5 mg/mL polymer solutions in toluene. When cured, the deposited layer may become a film less than sub-micron thick. Self-switching polymers may be deposited onto the electrode using a variety of methods including: spray, spin, or drop casting neutral electrochromic polymer solutions; printing technology such as inkjet printing; dip casting from solution; and oxidative chemical vapor deposition of conducting polymer films or electrochemical deposition. The properties of self-switching polymer films may further be manipulated through a chemical defunctionalization step rendering the film less soluble, allowing for deposition of additional layers such as the layer of EC mix 703.

Referring again to FIG. 5A, an individual pixel of the polymorphic display 700 is switched by an electrical signal applied to its corresponding electrode pair (704 and 705 or 711 and 705). Initially, both the states of the bi-stable pixel 701 and the mono-stable pixel 702 are stable and each having a first, white optical state, 712 and 713, as determined by the reflective $TiO_2$ of the EC mix and the transmissive property of the electrochromic polymer layer 710. Further, initially the corresponding voltages across each respective electrode pair is 0 V (715 and 716).

FIG. 5B illustrates the respective optical states 718, 720 of the polymorphic display 700 after application of respective independent switching signals. The switching signal for irreversibly transitioning the bi-stable pixel 701 into an irreversible and permanent operating state (e.g. dark blue optical state) can be accomplished through a variety of switching protocols such as those disclosed in U.S. Pat. No. 9,030,724 Flexible and Printable Electrooptic Devices and U.S. provisional patent application Ser. No. 14/797,141 Device and Method to Fix a Message on a Display, including e.g. applying a voltage above a certain threshold (as indicated by 719 of e.g. 3V) for a defined time duration (e.g., 2 s). Note that the anode typically is the (front) electrode 704 such that the polymerized monomer 717 is (anodically) formed on or at the electrode, displacing the (white) EC mix and further providing a substantial change of color (e.g. from white to dark blue) as observed from the viewing side. After the switching is complete, the operable (and optical) state will remain as it is permanent and irreversible.

The switching signal for reversibly transitioning the mono-stable pixel 702 into a volatile operating state (corresponding, e.g., to a red color of the polymer layer 721 resulting in a red optical state 720 of the pixel) can be accomplished by, for example, applying a voltage above a certain threshold (as indicated by 721 of e.g. 1V) for a defined time duration (e.g., 1 s). Note that the cathode is the front electrode 711 in case of electrochromic polymers providing chemically neutral (reduced) volatile states (as shown in FIG. 5B) and oxidized stable states (as shown in FIG. 5A) whereas the anode is the (front) electrode in case of electrochromic polymers providing chemically oxidized volatile states and neutral stable states. After the switching is complete, a maintenance signal is applied with the same effective polarity as the switching signal, in order for pixel to maintain its current state. Upon termination or disruption of the maintenance signal the volatile state will self-switch back to its original white state (713 in FIG. 5A). It should be noted, that depending on the deposition method employed of the electrochromic polymer layer in manufacture of the polymorphic display, some cycling ("break-in") between the reversible states of the self-switching polymer may be advantageous to achieve faster switching times and/or higher color saturation. This is in particular applicable to deposition processes not providing for intercalated electrolyte within the polymer layer.

Example 2 (Polymorphic Pixel)

In this exemplary embodiment polymorphic functionality is achieved in a single pixel, called a polymorphic pixel. Note that multiple (two or more) polymorphic pixels with the same operable properties can also form a polymorphic display, as discussed above.

FIG. 6A illustrates an exemplary embodiment 800 of a polymorphic pixel 801, in side view and front view. The pixel 801 follows the same vertical structure configuration as that of pixel 702 shown in FIG. 5A, and will thus not be described in detail except wherein there are differences that pertain to the polymorphic functionality. To this end, and for simplicity, the (optional) complementary conducting polymer material 714 is not shown and the EC mix 703, which together with the conducting polymer layer 710 form the electro-optic layer, initially will be assumed to contain highly reflective particles (e.g. $TiO_2$) as an additive to the otherwise natively transmissive (clear) EC mix. Further, the polymer layer 710 is assumed be self-switchable, comprising an initial stable, clear optical state and a corresponding oxidized chemical state, switchable to a volatile red optical state with a corresponding reduced chemical state. A polymer which such characteristics includes, e.g., poly{3,4-di(2-ethylhexyloxy)thiophene-co-3,4-di(methoxy)thiophene}.

The functionality of the polymorphic pixel 801 will now be described with reference to the corresponding structure FIGS. 6A-E, and FIG. 7 illustrating the operable states 900 through its applicable switching sequences along branches 902 and 903.

Analogously to pixel 702, the initial (i.e., before any application of an electrical signal to its front 711 and back 705 electrodes) operable state 905 of pixel 801 is stable with a corresponding white optical state 804 (FIG. 6A), as determined by reflected light from the $TiO_2$ particles of the EC mix 703 transmitted through the clear polymer layer 710. After providing a switching signal (along branch 902) as indicated by 806 in FIG. 6B, the operable state of the pixel switches to a volatile state 906 with a corresponding red optical state 807. As previously discussed, this optical state will remain for the duration of the maintenance signal, after which it will self-switch back to its operable state 905.

The pixel 801 will remain in a self-switchable state along branch 902 as long as the switching signal level does not exceed the threshold (e.g. 3V) for electrochemical polymerization of the monomer in the EC mix 703. If, however, the applied voltage reaches the threshold voltage, with the front electrode 711 being the anode, the monomer polymerizes 802 (FIG. 6C) onto (or near) the self-switchable polymer layer 710. Note that during the switching the polymer layer 710 is in an oxidized chemical state, clear optical state, and electrically conductive state, which facilitates the polymerization process. After applying a switching signal (along branch 903) as indicated by 808, the operable state of the pixel switches irreversibly to a stable state 908 with a corresponding, e.g., dark blue optical state 809. This optical state is determined by the color of the polymerized layer 802. Note that after the switching is complete, the self-switchable polymer layer will remain in a clear state.

It is important to further note that even though operable state 908 sequenced irreversibly from state 905, the pixel is now in a mono-stable and self-switchable operable state, as further applying a switching signal 811 (FIG. 6D) with a continued maintenance signal results in a volatile state 910 with red color of the self-switchable polymer layer 721. Accordingly, the resulting optical state 812 will generally be a combination of 721 (here, red) and 802 (here, dark blue). For instance, and in this particular case, if layer 721 is relatively thick, the optical state will be a predominantly red color; if layer 721 is relatively thin (i.e. largely transmissive), the optical state will closely match the dark blue color of layer 802; or, if 721 has a thickness somewhere in the middle, the color may be a compound purple. Again, after removal of the maintenance signal, indicated by 813 in FIG. 6E the pixel will self-switch back to operable state 908 (and corresponding optical state 809).

In an alternative embodiment of pixel 800, the reflective $TiO_2$ particles are not included in the EC mix 703 resulting in a transmissive (clear) optical property. This alters the optical state of the initial operable state 904, depending on the reflective properties of the back electrode 705. In this alternative embodiment the back electrode 705 is presumed light absorbing (e.g. carbon black) resulting in an initial optical state of black as illustrated by 1001 of the operable states of this embodiment 1000 in FIG. 8. However, the operable and optical states of the other states along branches 1002 and 1003 are the same as those illustrated and discussed in FIGS. 7, 902 and 903, respectively (here assuming, for simplicity, that layers 721 and 802 are largely reflective, and the yellow tint of the EC mix 703 does not contribute).

However, this particular embodiment enables additional operable states by analogously polymerizing the monomer of the EC mix onto (or near) the back electrode by applying an opposite polarity of the switching signal onto the pair of electrodes. These additional operable states are shown along an extended branch indicated by 1005, as well as, an additional third branch 1004, with operable states as indicated. Note that the volatile optical states 1006 and 1008 are the same as 906, and that the stable optical states of 1010 and 1011 are virtually the same as 908 (ignoring any effect of viewing through the transmissive EC mix).

In a further alternative embodiment of pixel 800, the reflective $TiO_2$ particles are again not included in the EC mix 703, but an inert dye (here assumed yellow) is added resulting in a corresponding yellow tint of the EC mix. In this further alternative embodiment the back electrode 705 is presumed light reflective. Advantageously, the concentration of the dye is such that light will be reflected through a double pass of the pixel stack yielding, in this case, an initial yellow optical state 1001. Note that for this embodiment all other optical states remain the same as above except for states 1010 and 1011, which will have a new optical state of green, resulting from the dark blue polymerized layer on the back electrode viewed through the yellow tinted EC mix. Thus this configuration can exhibit five different optical states, three stable states and two volatile states, with a variety of operable properties including irreversible and mono-stable states.

Example 3 (Polymorphic Pixel with Non-Switchable Operable State)

FIG. 9A illustrates another exemplary embodiment 1100 of a polymorphic pixel 1101 with a non-switchable operating state, in side view and front view. The pixel 1101 follows the same vertical structure configuration as that of pixel 801 shown in FIG. 6A, and will thus not be described in detail except wherein there are differences that pertain to the polymorphic functionality. To this end, the reflective $TiO_2$ particles are not included in the EC mix 703 resulting in a transmissive (clear) optical property. Further, the polymer layer 1102 is again assumed be self-switchable, comprising an initial stable, clear optical state and a corresponding oxidized chemical state, switchable to a volatile red optical state with a corresponding reduced chemical state. However, the self-switching polymer layer 1102 is present on the back electrode 705 (as opposed to the front electrode 711 as in FIG. 6A). Additionally, the back electrode 705 is reflective or transparent with an additional diffuse reflective layer behind it (not shown in FIG. 9A).

The functionality of the polymorphic pixel 1101 will now be described with reference to the corresponding structure FIGS. 9A-C, and FIG. 4 illustrating the operable states 600 through its applicable switching sequences along branches 601 and 602.

Analogously to pixel 801, the initial (i.e., before any application of an electrical signal to its front 711 and back 705 electrodes) operable state 610 of pixel 1101 is stable with a corresponding white optical state 1103, as determined by reflected light from back electrode 705. After providing a switching signal (along branch 601) as indicated by 1104 in FIG. 9B, the operable state of the pixel switches to a volatile state 620 with a corresponding red optical state 1106. As previously discussed, this optical state will remain for the duration of the maintenance signal, after which it will self-switch back to its initial operable state 610.

The pixel 1101 will remain in a self-switchable state along branch 601 as long as the switching signal level does not exceed the threshold (e.g. 3V) for electrochemical polymerization of the monomer in the EC mix 703. If, however, the applied voltage reaches the threshold voltage, with the back electrode 705 being the anode, the monomer polymerizes 1108 (FIG. 9C) onto (or near) the self-switchable polymer layer 1102. Note, again, that during the switching the polymer layer 1102 is in an oxidized chemical state, clear optical state, and electrically conductive state, which facilitates the polymerization process. After applying a switching signal (along branch 602) as indicated by 1107, the operable state of the pixel switches irreversibly to a stable state 630 with a corresponding, e.g., dark blue optical state 1109. This optical state 630 is determined by the color of the polymerized layer 1102 as the EC mix 703 is transmissive. Note, again, that after the switching is complete, the self-switchable polymer layer will remain in a clear state. However, in contrast to Example 1 above, this operable state does not allow for any further switching affecting the corresponding optical state 1109, thus it is in an operable state which is non-switchable.

Example 4 (Interdigitated Electrode Structure)

In the exemplary embodiments discussed above, the electrode layers for switching the electro-optic layers have been focused on non-patterned configurations with either transparent or opaque optical properties. However, in some cases it may be advantageous to use an interdigitated pair of electrodes. Such configurations enable a single patterned electrode layer instead of two separate non-patterned electrode layers simplifying the manufacturing process of polymorphic pixels and displays. Furthermore, this allows for two activation surfaces per interdigitated electrode pair in a single layer with a multitude of operable states. Note that such an interdigitated transparent electrode structure (e.g. ITO) can also be employed on both sides of the electro-optic layer, e.g., for a two-sided display.

FIG. 10A shows (in a back side view) a conceptual electrode layout 1200 consisting of four pairs of interdigitated electrodes (corresponding to four pixels of the completed polymorphic display). In this configuration one digitated electrode of each of the four pairs is (optionally) connected to a common electrode connection 1220. Thus any particular pair of electrodes can be addressed using the common electrode 1220 and a pixel specific digitated electrode (e.g. 1210).

Typically the interdigitated electrode layer is deposited (e.g. directly printed or by patterning of a uniform film using, e.g. photolithography or laser ablation) onto a substrate 1230 (outlined). This process is further followed by deposition (e.g. printing) of one or more self-switching polymers (all in the same layer), such as shown in 1300 by a first self-switching polymer 1310 and a second self-switching polymer 1320. Note that the deposition can continuously span of more than one electrode pair (such as in the case of 1310).

Advantageously, the widths and separation of the electrode digits are optimized with respect to the particular properties of the self-switching polymer (e.g. thickness) and switching protocol. However, also depending on these properties, it may be preferable (e.g. for better color contrast) to only deposit (e.g. print) the self-switchable polymer along the electrode digits (i.e. with gaps), and further only on one side of the interdigitated pair (a complementary polymer layer may optionally be deposited on the other side of the interdigitated pair).

After completion of the self-switching polymer layer, the EC mix layer can be deposited (e.g. by a further printing process), as shown by layer 1410 in FIG. 10B. In this particular case, the EC mix is opaque (white, containing $TiO_2$ particles), however, it may also be transparent (without $TiO_2$ particles) as shown in 1500 by layer 1510. Note that the EC mix can also be deposited onto select pixels using different EC mix compositions (e.g. a different monomer polymerizing to a unique color). Furthermore, depending on the operable states desired for the polymorphic display, some pixels may only have an electrolyte printed on top (i.e. no EC mix).

The above examples disclose embodiments of polymorphic displays and pixels with various operable states corresponding to optical states determined by reflective properties of the pixels. However, the method and means can advantageously be extended to transmissive and/or polarization properties. For example, the self-switching polymer or polymerized monomer layers can be designed (with appropriate activation protocols) such that the transmitted light through (the colored layers in) the pixels determine the optical state. In this case, both the back electrode and substrate are at least partially transmissive as well. Advantageously, electrochromic materials could be combined with a liquid crystal material to from an electro-optic layer capable of generating both polarization and color changes to transmitted light through the layer (with corresponding operable states). Optionally, polarizers in front and behind the electro-optic layer (e.g. on the outer surface of front (and back, if transmissive) substrate or cover layer, could, e.g., convert the polarization changes to light intensity changes.

Additionally, the above exemplary embodiments primarily working in the visible wavelength range. However, as discussed above, the embodiments of the current invention also include wavelength outside of the human visible range (e.g. machine reading). Advantageously, as electrochromic polymers typically exhibit significant reflectivity changes in the IR wavelengths between the oxidized (conductive) and reduced (non-conductive) states, these materials can thus also be utilized for generating operable state changes outside of the visible range for polymorphic pixels and displays.

Example 5 (Polymorphic Display—Fixed-Image Shutter Mode)

FIG. 12A-D illustrates another embodiment of the current invention in side view and front view, in which the pixels of a polymorphic display 1600 operates in a shutter mode (i.e., a means for either transmitting or reflecting/absorbing light). This embodiment is similar to that illustrated in FIG. 5A, thus only differences will be highlighted. The EC Mix 703 spanning both the right pixel 1601, with a bi-stable, permanent and irreversible second operating state, and the left pixel 1602, which is monostable and self-switchable, is predominantly transparent (i.e., without any $TiO_2$ in the EC Mix). Although the (optional) complementary conducting polymer material 714 of FIG. 5A is not shown, it should be noted that the complementary conducting polymer material 714 can be patterned appropriately to all or a set of pixels of the polymorphic display. Additionally, the material may be pixel specific according to the intended properties of the corresponding pixel. As presented in FIG. 5A, embodiment 1600 additionally comprises a fixed-image layer 1603 containing fixed-images 1604 (here a "smiley face") and 1605 (here a "check mark"), which both can be revealed or obscured to the viewing side depending on the transmissive properties of the respective pixels 1601 and 1602. Note that here the polymorphic display is illustrated functionally as an indicator with two pixels large enough to each contain a legible image. It should be understood that the image layer may contain one or more images (also referred to herein as messages) and a polymorphic display may comprise multiple fixed-image layers. Further note that fixed-image layer 1603 may include only discrete images (such as 1604 and 1605) with no (printing) layer material in-between, as shown in FIGS. 12A-D.

Figure 12A:
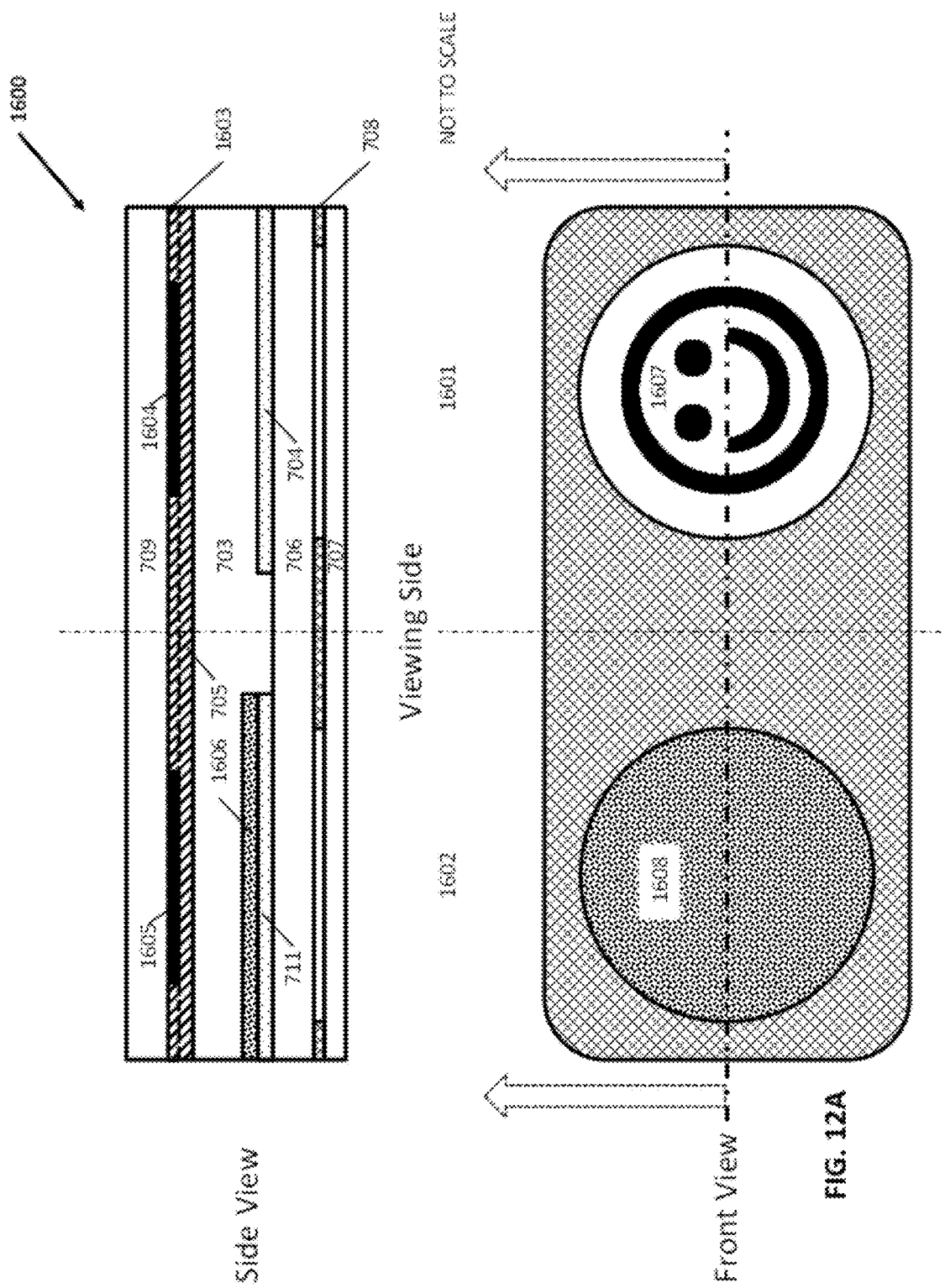
FIG. 12A is a block representative of a display in accordance with the present invention.

The fixed-images, 1604 and 1605, may e.g. be printed or otherwise constructed or placed directly onto substrate 709 or onto a separate thin substrate or film (not shown) which subsequently is adhered to substrate 709. The back electrode 705 of this embodiment shown in FIG. 12A is transparent such that a fixed-image located on the back-side of the back electrode may be seen from the viewing side. However, it will be appreciated that the fixed-image may also be printed or placed directly onto the front side (not shown) of an optionally opaque back electrode 705, for instance, with the fixed-images printed using conductive ink of a favorably different color than the opaque electrode to provide image contrast. In either case the fixed-images may also be printed in full color. Additionally, the fixed image may also be printed or placed directly on the front side of the optional complementary conductive polymer material 714 shown in FIG. 5A), advantageously with an image construction and material which provide for sufficient image contrast and ion conductivity (e.g., porous, containing small holes). Note that "fixed images", as the term as used herein, may also include "dynamic" images that are generated after manufacture of the polymorphic display (at a preferable point during the switching cycle). For instance, with a patterned back electrode 705 (e.g., interdigitated pair per Example 4 or segmented) a desired image could be generated by polymerization of EC mix 703 onto the corresponding electrode pattern (by respective application of an activation signal across the interdigitated pair of electrodes or back segmented and front electrodes).

In the particular embodiment 1600 illustrated in FIG. 12A-D, the self-switching polymer 1606 is different than those previously discussed in Example 1, in that its stable (non-powered) state is colored (e.g. black or blue), whereas its volatile state is transparent or clear (here, for example, in the human visible wavelength range). Exemplary polymers with such characteristic include anodically coloring conductive polymers with low oxidation potentials, such as, PBEDOT-NMeCbz and PProDOP-NPrS.

FIG. 12A illustrates the initial state of the polymorphic display 1600 prior to any application of switching signals across electrodes 704 and 705 of pixel 1601 and 711 and 705 of pixel 1602. In this stable pre-switched state, the vertical structure of pixel 1601 is transparent allowing fixed-image 1604 ("smiley face") to be seen 1607 from the viewing side (indicated by 1607 in the front view of FIG. 5A). The self-switchable polymer of pixel 1602 however is colored (and favorably also opaque) in its unpowered stable state, thus the fixed-image 1605 of pixel 1602 is obscured or hidden from the viewing side (indicated by 1608 in the front view of FIG. 5A). After subsequent application of a switching signal to pixel 1602 (e.g. −1V onto front electrode 711 relative to common electrode 705) a resulting transparent state of the self-switching polymer layer 1607 reveals fixed-image 1605 ("check mark"), as shown by 1610 in FIG. 12B. The fixed-mage 1605 will remain visible for the duration of the maintenance signal (e.g. indicating that device is operating). Analogous to pixel 701 in Example 1 and as illustrated in FIG. 12C, pixel 1601 is switched by applying a voltage above a certain threshold (e.g. +3V), such that the polymerized monomer layer 1611 is formed at the front electrode 704 of pixel 1601. This switching signal can for instance be in response to an event, e.g., the temperature of the display itself or the good the polymorphic display is attached to, exceeded a set threshold. As the polymerized monomer layer 1611 is colored (e.g. dark blue), and advantageously opaque, fixed-image 1604 is now hidden in a permanently and irreversibly hidden or obscured, as indicated by 1612 in FIG. 12C. Subsequently, and as illustrated in FIG. 12D, upon termination of the applied maintenance signal to the electrodes of pixel 1602 (e.g., in this case indicating a power failure), the self-switchable polymer reverts back to its stable colored state 1606, resulting in both fixed-images being hidden, as indicated by 1608 and 1612 in FIG. 12D.

Figure 12B:
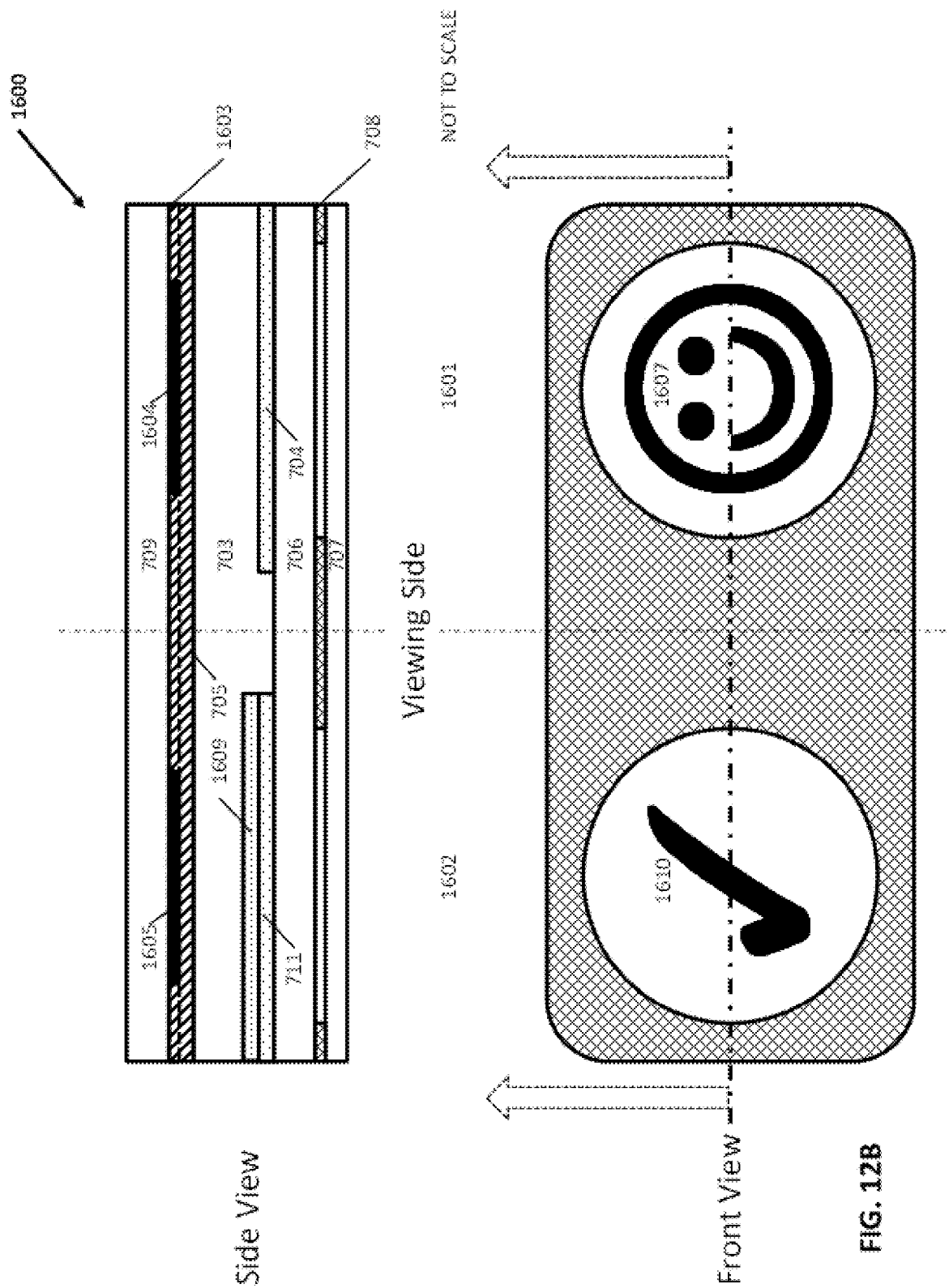
FIG. 12B is a block representative of a display in accordance with the present invention.
Figure 12D:
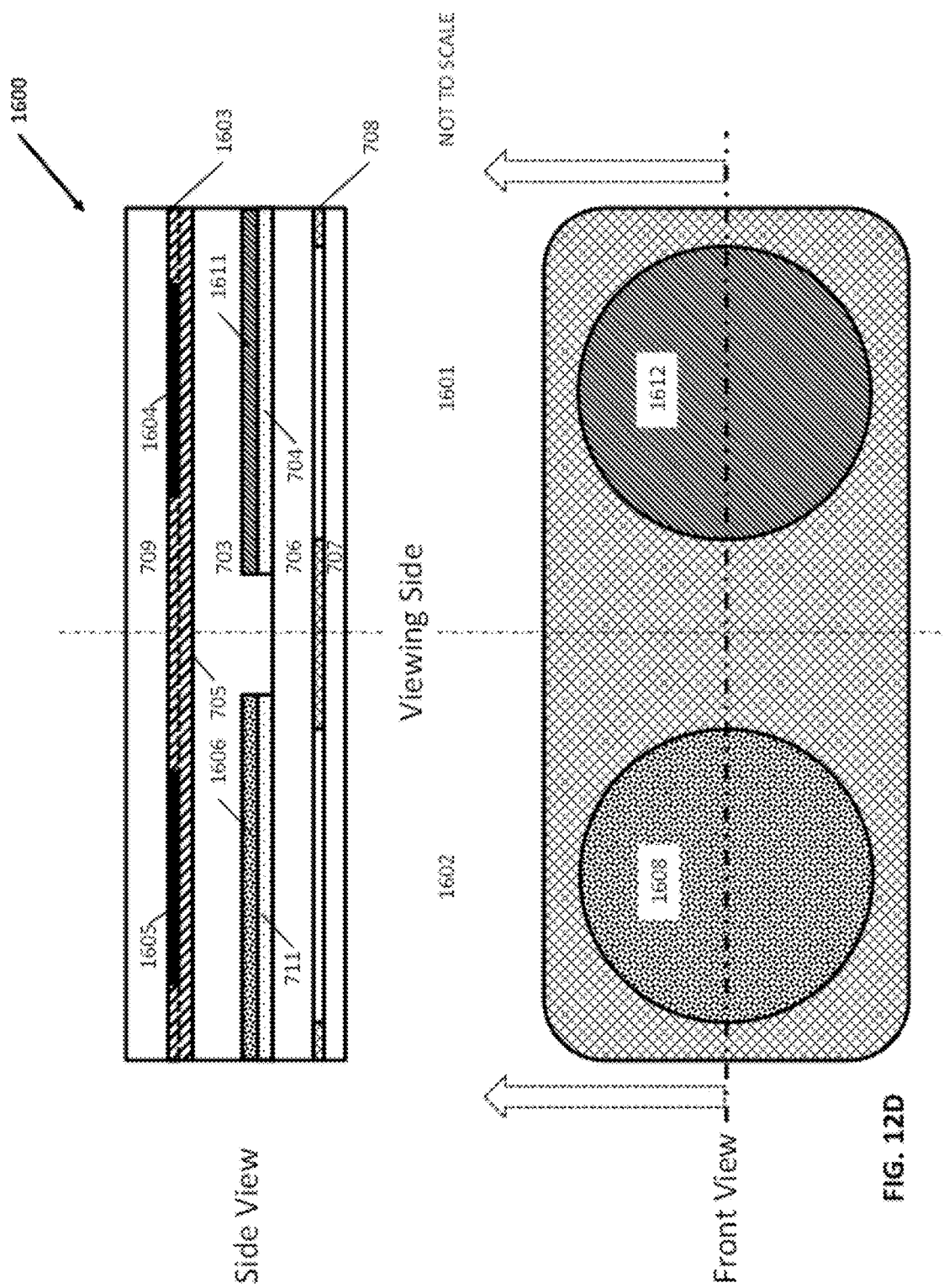
FIG. 12D is a block representative of a display in accordance with the present invention.
Figure 13:
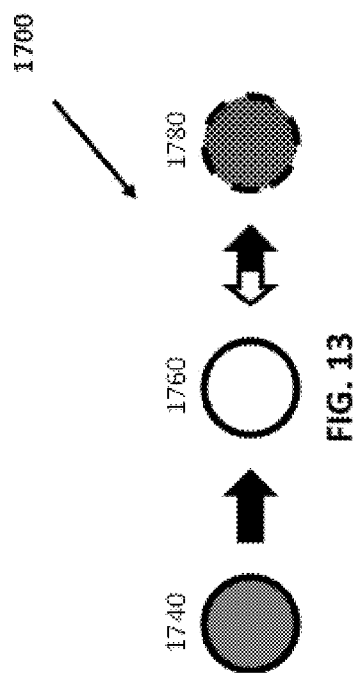
FIG. 13 is a diagram showing operable states and corresponding optical states for a display in accordance with the present invention.

As discussed above, there are many electrochromic conductive polymers which are mono-stable and self-switchable and could be used as layer with either a transparent (clear) state in the stable state (e.g., 710 in FIG. 5A) or self-erasing state (as indicated by 1609 in FIG. 12B). However, there are also some that are bi-stable with both self-switchable and irreversibly switchable operable properties. Such polymers provide for expanded shutter mode functionality. Specifically, the operable states of such a pixel 1700 as shown in FIG. 13, exhibit a first colored stable state 1740 as deposited (e.g. spray casted), and are irreversibly switchable to a second colored or transmissive stable state 1760 after applying a first switching signal, and further switchable to a third colored volatile state 1780 after applying a second switching signal. Analogous to above, it will remain in the volatile third state 1780 for the duration of the maintenance signal. When the maintenance signal is terminated (or disrupted for any reason) it self-switches (transitions back) to the stable, second state 1760.

For example, the first stable state for a spray cast film of a disubstituted poly(propylenedioxythiophene) PProDOT $(CH_2OEtHx)_2$ [*Macromolecules*, 2004, 37 (20), pp 7559-7569] (prior to power being applied for the first time) is red 1740, the second stable state corresponding to an oxidized chemical state (after a first switching signal is applied) is transparent (or clear) 1760, and the third volatile state corresponding to a neutral (reduced) chemical state (after a second switching signal followed by a maintenance signal is applied) is blue 1780. The third state is achievable through a phenomenon called "doping induced order" where the expulsion of the electrolyte allows a reorganization of the polymer backbone to a lower energy state. Such an exemplary three-state polymer could advantageously be applied as layer 1606 of pixel 1602 of the polymorphic display shutter structure 1600 in FIG. 12A. For example, with such a three-state polymer, pixel 1602 could provide augmented indication (or message), that the display (and associated good) has never been powered up or activated by indication of a stable red state, which is irreversibly switchable to a second clear and stable state (revealing image 1605), followed immediately by a second switching signal transitioning to the third volatile blue state (indicating the power is on). If the maintenance signal in this state is subsequently terminated (for instance, when power is no longer available), it self-switches back to the second clear state revealing image 1605 (which, in this case, may indicate a "no power" symbol).

Note that polymers with such characteristics can, for example, also be utilized as material layer 710 of pixel 702 in FIG. 5A or of pixel 801 in FIG. 6A, to provide for bistable, irreversibly switchable, and self-switchable operable properties in conjunction with appropriately selected switching signals and signal protocol.

Example 6 (Compartmentalized Structure)

Figure 14:
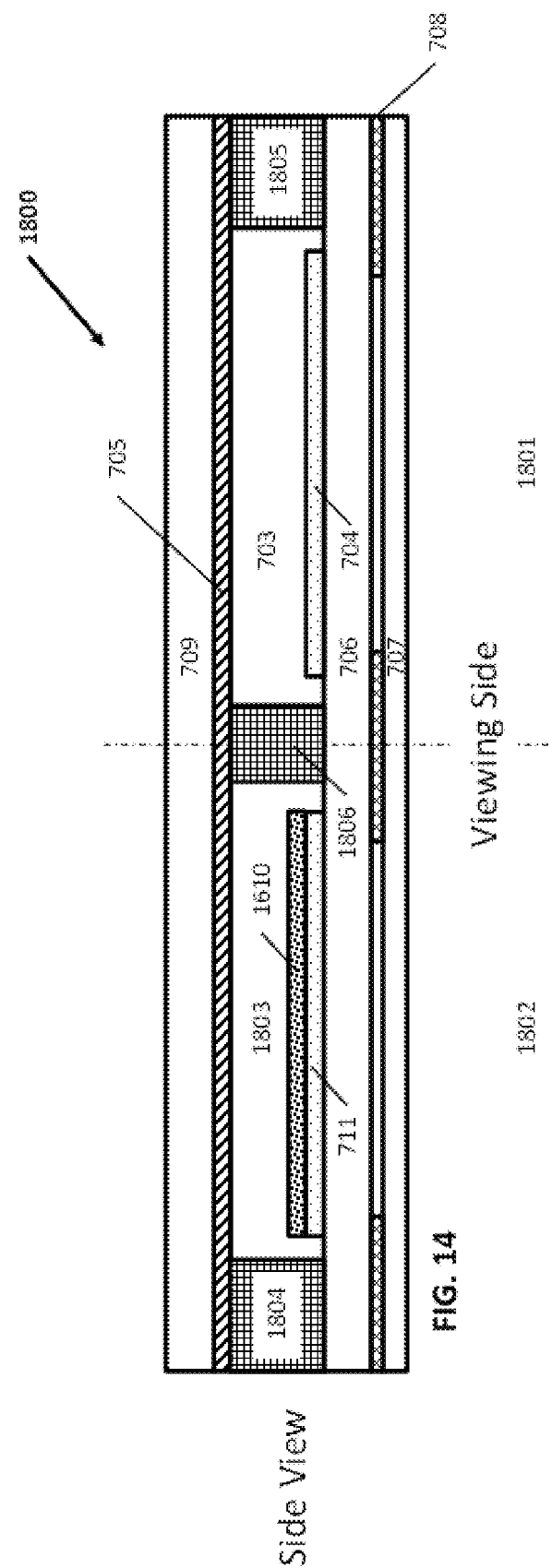
FIG. 14 is a block representative of a display in accordance with the present invention.

In some polymorphic display configurations it may be desirable to contain the EC mix or electrolyte material by means of compartments within a common structure as illustrated by polymorphic display embodiment 1800 in FIG. 14. This is, in particular, applicable for cases in which the EC mix or electrolyte is characterized by a relatively high viscosity (e.g., after deposition or printing). However, it is also advantageously utilized for polymorphic displays for which individual pixels require different types of electrolytes (for optimized electrochromic functionality) or comprise distinct electro-optic materials. Such electro-optic materials may comprise any material that can affect reflected, transmitted, or emitted electro-magnetic radiation (e.g., amplitude, intensity, polarization, and/or wavelength) based on an electric input (e.g. switching) signal. Examples of such electro-optic materials include liquid crystals (e.g., cholesteric and ferroelectric), electrophoretic (particle systems), electrochromic materials, electrowetting fluids, electro-liquid powder materials, plasmonic nanostructures, optical interference stacks (including those switched by microelectromechanical systems), photonic crystals, and phosphorescent materials, as well as, emissive materials such as LED materials, OLED (and other electroluminescent) materials, quantum dot materials (photo-emissive or electro-emissive), or any combination thereof. Note that such compartmentalized structures may also be utilized for hybrid displays for which the achievable operable states of each pixel are the same but, for instance, the achievable optical states are different.

Embodiment 1800 is similar to embodiment 1600 in FIG. 12A without the fixed-image layer 1603, and will not be explained in detail expect where there are differences. The key difference of embodiment 1800 as compared to embodiment 1600 is the integration of a compartmentalized structure (vertically) spanning the front transparent substrate 706 and the back (here common) electrode 705, thus providing containment of the EC mix 703 of pixel 1801 and electrolyte 1803 (e.g. ionic liquid) of pixel 1802. The thickness of the containment wall 1806 in-between pixels (here 1801 and 1802) may be different (e.g. thinner as shown) as compared to those containing edge pixels of the polymorphic display (here 1804 and 1805). The thicknesses and aspect ratios of the walls are favorably optimized taking into account the compartmentalized structure material (e.g., flexible polymer), rigidity (or viscosity) of the EC mic 703 and electrolyte 1803, flexibility of the display, as well as, functionality and lateral fill factor of the pixels. For high resolution displays, it may further be preferable that the compartmentalized structure material be made opaque (e.g. by adding a light absorbing dye or ink particles) to enhance the image quality of the completed polymorphic display.

The compartmentalized structure may, for instance, be fabricated from a solid uniform film by accordingly removing material (e.g. by laser ablation), before it is applied (with e.g. an adhesive) to the front substrate 706 or back substrate 709 (with transparent of opaque conductive layer 705), or generated in place by a photolithographic process.

In an alternative variation of embodiment 1800 (commonly used for pixelated electrophoretic displays), the compartmentalized structure may be generated through an embossing process, e.g., by embossing a thermoplastic or photopolymer layer onto conductor layer 705 supported by back substrate 709, with subsequent filling/sealing of the electro-optic material, and attachment to the front substrate 706 (with pixelated transparent conductors). Such a structure would enable switching of polymorphic display pixels based on, for example, electro-optic materials that respond to an electric field including, e.g., electrophoretic and liquid crystal materials. However, in this alternate embodiment without direct exposure to back electrode 705 (e.g. through removal of any residual embossing material), electro-optic materials requiring low resistive interface to its corresponding electrodes (such as electrochromics) would not switch. Advantageously, however, such electrochromic functionality can be achieved by substituting the front pixel electrode (e.g. 704 or 711) with a pair of interdigitated electrodes (as illustrated in Example 4).

Example 7 (Alternate Compartmentalized Structure)

Figure 15A:
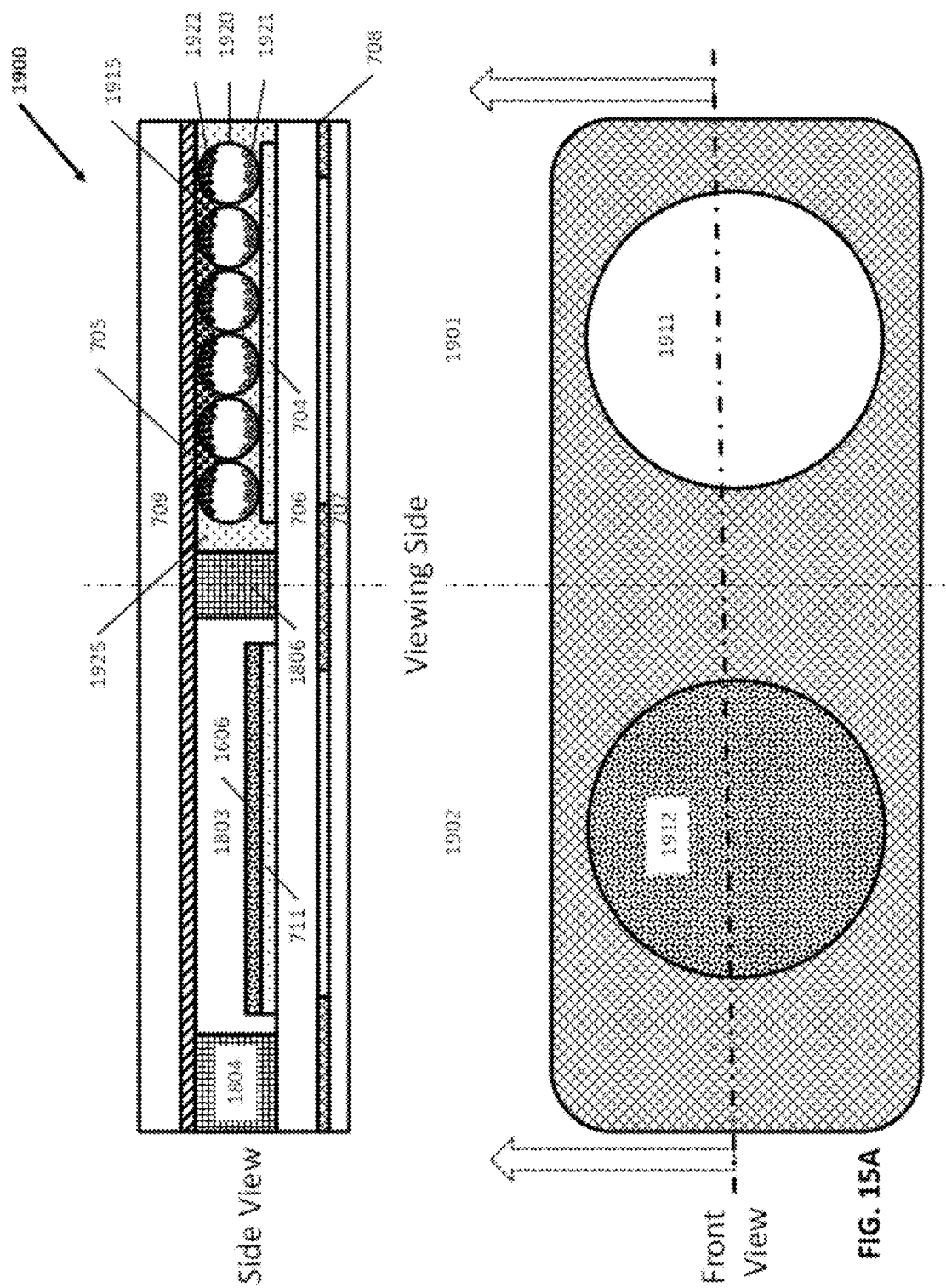
FIG. 15A is a block representative of a display in accordance with the present invention.

In some polymorphic and hybrid displays it may advantageous to provide a common compartmentalized structure for only some of the pixels in the display. For instance, electro-optical material compositions that are relatively solid or semi-solid after deposition (and potentially curing or solidifying) may not require a permanent support structure. Such electro-optic materials include those favorably formed into films, with or without a permanent (or temporary) supporting substrate, in separate processes for subsequent integration into the polymorphic or hybrid display. FIG. 15A illustrates an embodiment 1900 of such a polymorphic display in its pre-powered state, in side and front views, with two (indicator) pixels comprising a bi-stable electrophoretic right pixel 1901 and a monostable and self-switchable left pixel 1902.

The left pixel is functionally similar to pixel 702 illustrated in FIG. 5A, thus only differences will be highlighted. For simplicity, the optional complementary conductive polymer material 714 is not shown. The electrolyte 1803 (e.g., ionic liquid) may be transparent or contain a coloring additive (e.g., $TiO_2$). Structurally, pixel 1902 is similar to that of 1802 of embodiment 1800, discussed in Example 6, with containment walls 1804 and 1806. In the stable pre-powered colored (here shown as black) state of the conductive polymer layer 1606, the indicator output 1912 of pixel 1902 is black, as shown in FIG. 15A.

The right pixel 1901 comprises an electrophoretic microencapsulated electro-optic layer of spheres 1920 filled with suspension fluid containing two types of oppositely charged ink particles, white 1921 and black 1922. These particles move in response to an applied electric field between electrodes 704 and 705, such that white ink particles 1921 remain stable at the front surface after application of a switching signal applied to the electrodes (of a specific polarity), whereas the black ink particles 1922 (of opposite charge) remain stable at the back of the electro-optic layer as shown in FIG. 15A. Thus as shown in FIG. 15A, the resulting indicator output 1911 of pixel 1901 is white.

Figure 15B:
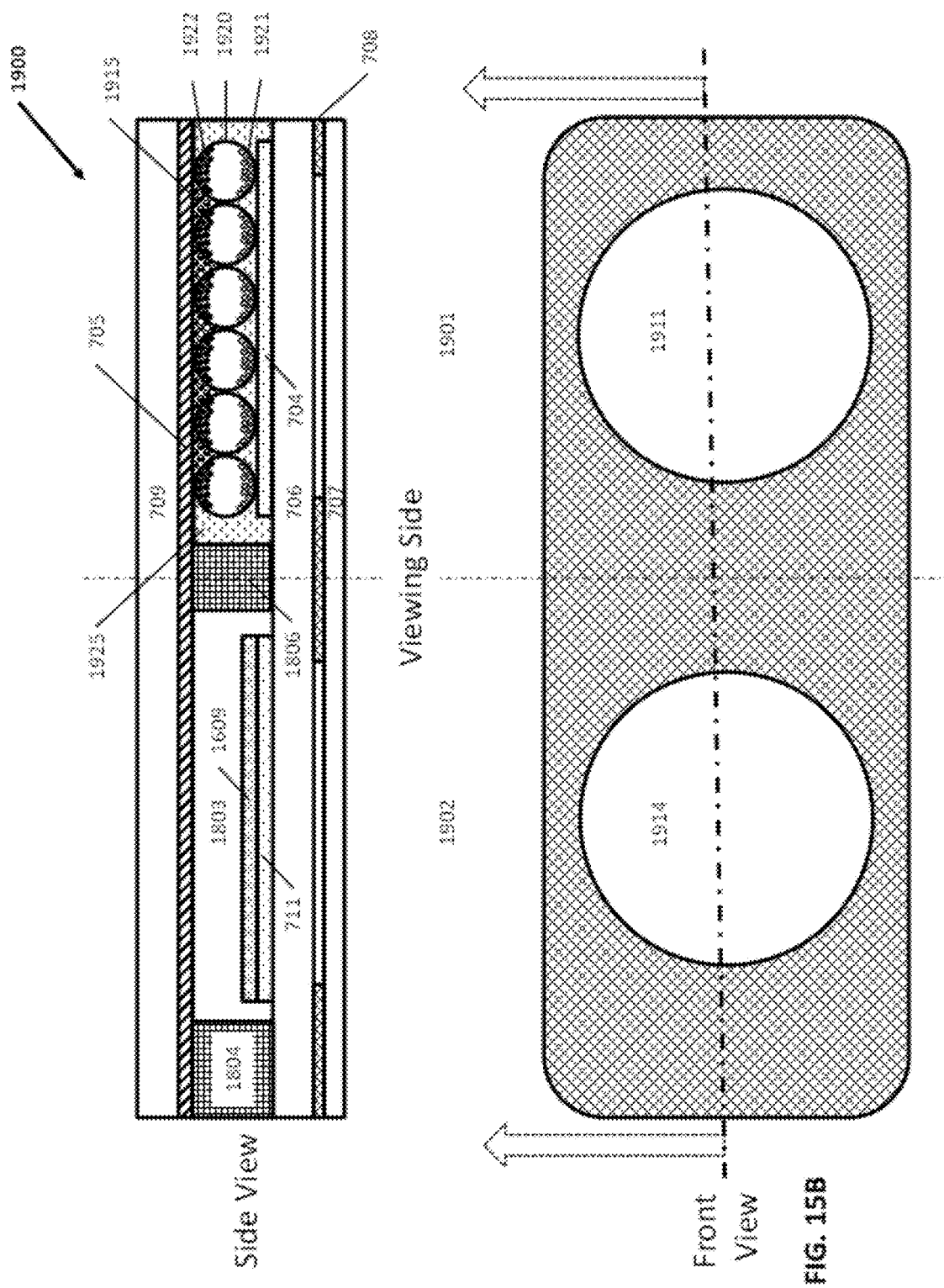
FIG. 15B is a block representative of a display in accordance with the present invention.
Figure 15C:
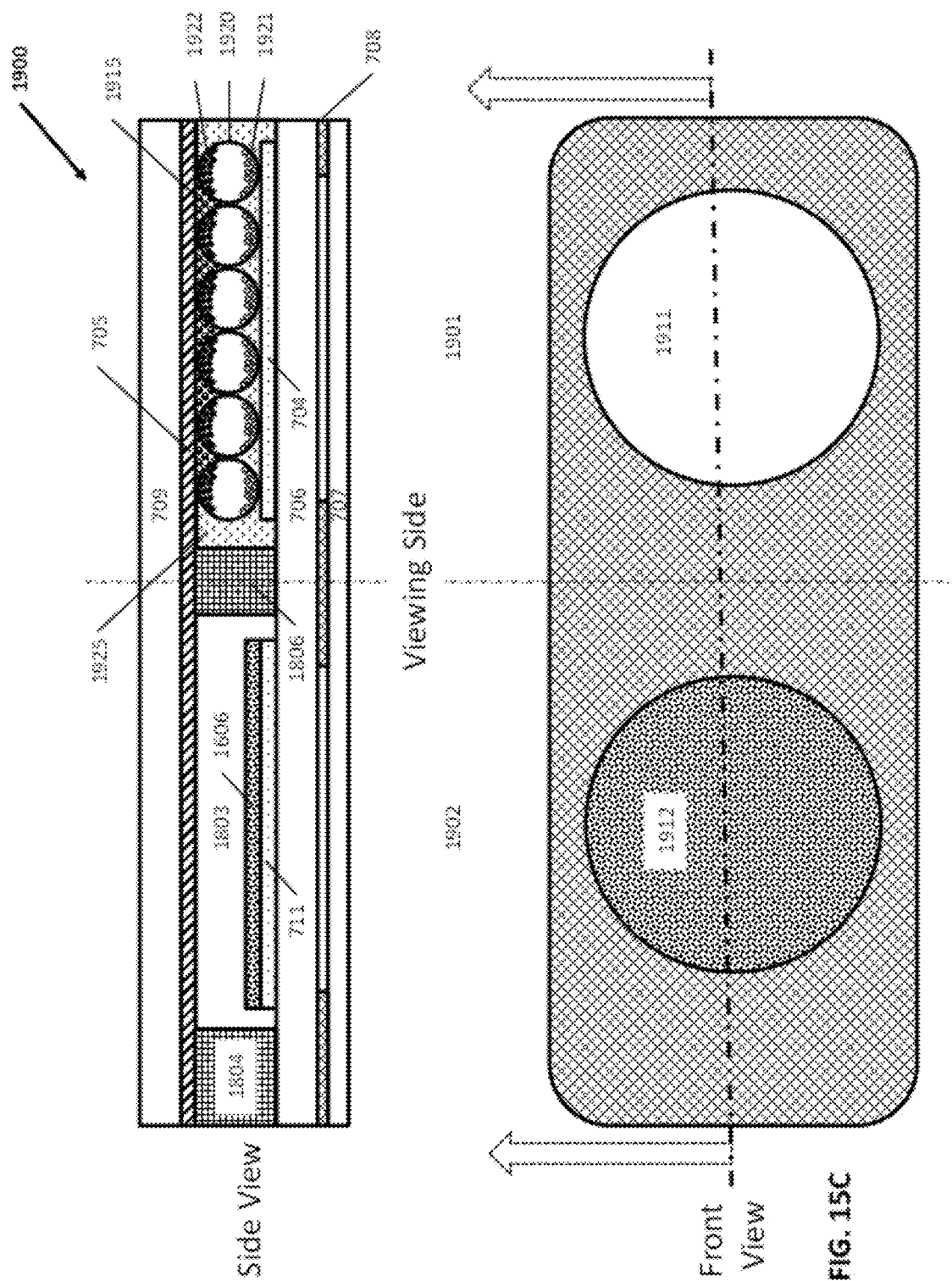
FIG. 15C is a block representative of a display in accordance with the present invention.

With the pre-powered state of embodiment 1900 in FIG. 15A discussed above and referring to FIGS. 15B-E an exemplary switching sequence of embodiment 1900 is now detailed. In FIG. 15B pixel 1902 is switched (analogously to pixel 1602 in FIG. 12B) to its volatile state (e.g. indicating the display is powered up), resulting in a clear state of polymer layer 1609 and a white state of the indicator output 1914 (here assuming, for example, that electrolyte includes a $TiO_2$ coloring additive). The state of indicator will self-switch back to output 1912, as shown in FIG. 15C, if the corresponding maintenance signal is no longer applied to the electrodes of pixel 1902, e.g., if a loss of power occurs. If, however, the maintenance signal remains with the display (indicator) in a powered state, pixel 1901 can favorably indicate the occurrence of an event (e.g., the temperature of the display or associated good exceeds a set limit) by switching the state of the electrophoretic electro-optical layer such that the black ink particles are now instead at the viewing side, corresponding to a black stable state of the indicator output 1915 as shown in FIG. 15D. Finally, if a subsequent loss of power occurs, pixel 1902 reverts back to black indicator output state 1912 with the bi-stable indicator output remaining black, as indicated by 1915 in FIG. 15E. Note that in this particular embodiment 1900 both pixels are reversible. Thus after a reset of pixel 1901 (to a white state initial state) the entire sequence can be repeated.

Commonly, electrophoretic microencapsulated electro-optic layers are formed in roll-to-roll processes onto a non-patterned electrode layer on a support substrate. This allows for prefabrication of the electrophoretic electro-optic layer of pixel 1901 of embodiment 1900 onto back substrate 709 with the non-pattered electrode layer 705 using an adhesive 1915. The area of the prefabricated substrate 709 with exposed electrode 705, commonly used for required electrical connection (e.g. using conductive adhesive), can also be used, and extended if necessary, as a means to form the compartmentalized structure (1804 and 1806) onto. Advantageously, the compartmentalized structure may also be formed onto front substrate 706 facilitating alignment to pixelated electrodes (704 and 711). In either case the electrophoretic electro-optic layer is attached electrode 704 and substrate 706 by a transparent adhesive 1925, whereas the pre-filled electrolyte material 1803 is sealed by the adhesively attached compartmentalized structure. Note that depending on the particular configuration including the separation ("dead space") between pixels 1901 and 1902 and substrate thicknesses of 706 and 709, the thickness of the compartmentalized structures 1806 and 1804 (defining the thickness of electrolyte material 1803) may be different than that of the electrophoretic electro-optic layer of pixel 1901, and the structure wall 1806 may be optional.

It will be appreciated that there are many variations of exemplary embodiment 1900 of FIG. 15A. For example, it may be advantageous to configure in an "inverted" structure such that the prefabricated electrophoretic electro-optic layer with non-patterned electrode layer faces the viewing side. Although this would require the non-patterned electrode layer to be transparent, it would allow the back patterned electrode layer, as well as, the (optionally conductive) adhesive 1925 to be opaque. Further, the self-switching conducting polymer layer could be either printed on the front prefabricated electrode layer or on the back patterned electrode layer. The latter case would preferably include a transparent electrode material 1803, as the polymer layer is viewed through the electrolyte.

Additionally, it should be noted that although exemplary embodiment 1900 in FIG. 15A illustrates an electrophoretic display pixel 1901 with two distinct states, electrophoretic electro-optic materials may also comprise a multitude of stable states (e.g., a number of stable distinguishable grey levels); or contain three or more types of ink particles and/or a colored suspension fluid with corresponding stable color states.

Intelligent Container Systems Using Polymorphic Displays

Described now are intelligent container systems. Intelligent container systems may use pre-loaded "rules" and polymorphic displays to produce visible messages according to the intended and actual use (and other actions and events, monitor or sensed conditions, and permissions) of the intelligent container systems. Polymorphic displays, and more generally displays having visible alerts and messages with different operable modalities, are key to application and system integrity. In this way, the intelligent container system enables enhanced overall confidence and trust in the system, which drives local user actions to produce desired outcomes. Accordingly, the intelligent container system enables an entire new class of intelligent devices that can encourage desired human actions, and monitor that those actions were taken.

Intelligent container systems comprise (1) a container, (2) an enclosure, and (3) an electronic assembly that may couple to an actuator. It should be noted that although the intelligence (e.g. electronic assembly) may be described as being integrated with the enclosure, it alternatively may be located with the container, or the intelligence functions and components may be distributed between the container and the enclosure. Similarly, the functions and components of the actuator may be located in either the container or the intelligent enclosure or distributed between the two.

Container

The container is any item constructed to be joined with, or mated to, its associated enclosure. Joining the container to the associated enclosure typically involves a physical (mechanical) action or event such as opening or closing, inserting or ejecting or withdrawing, latching or unlatching, locking or unlocking, screwing or unscrewing, adhering or releasing, attracting or repelling (or pulling apart) as with a magnet, etc.

It however is sufficient for the enclosure, once joined to, or separated from, the container for the corresponding enclosure assembly (enclosure+electronic assembly) to be able to detect the action (or resulting state) by direct or indirect means. For example, by opening or closing an electrical contact or switch, optical or pressure sensing etc. Exemplary containers include, but are not limited to, pill bottles, bottles, cans, canisters, boxes, crates, cartons, sockets, receptacles, sleeves, vessels, bags etc., and may be rigid or flexible, hard or soft.

Enclosure

The enclosure is any item with mechanical, electromechanical, magnetic, adhesive, vacuum, friction, pressure or other means for joining to an associated container. The duration of the join is typically temporary (single or multi/repeat use) but may also be permanent (one-time).

The enclosure may be wholly transparent or semitransparent, has one or more transparent or semitransparent 'windows', or openings and is constructed such that the indicators or the polymorphic display of the electronic assembly (described below) are visible through the enclosure. Alternatively, or in addition to enclosure, the container to which the enclosure is designed to be joined is constructed so that the indicators are visible through the container itself. Another alternative is for the electronic assembly to be configured such that the display, properly protected, is on the outside of the enclosure or container and electrically coupled to, using vias for example, the balance of the electronic assembly on the inside of the enclosure or container or combination thereof.

The enclosure may be further constructed to receive and hold in-place the electronic assembly, or formed, molded or otherwise constructed to enclose or be integral with, the electronic assembly (e.g. a unitary or integrated construction). The enclosure is also constructed to enclose, seal, close, or couple to, be attached to, or otherwise joined with a container. Exemplary enclosures include, but are not limited to, caps, lids, covers, tops, seals, stopper, probes or inserts, corks etc. Note that the enclosure may be a structure designed to be wholly or partially inserted into, or otherwise joined to, and contained by the container.

Electronic Assembly

The electronic assembly comprises one or more substrates (layers) that are rigid, semi-rigid or flexible and comprised of one or more of plastic, paper, cardboard, cellulose, metal, glass etc. The electronic assembly further comprises a power source (e.g. a battery or capacitor or means for harvesting RF or other EM radiated energy) and one or more status or state indicators or displays. The indicators are preferably in the form of polymorphic displays as previously described. Appropriate to its intended use, the electronic assembly further comprises logic (processor), memory, a clock/timer, one or more sensors, a communication apparatus (e.g. IC and antenna) to support local communications (RFID—RAIN or NFC, Bluetooth, WIFI, Zigbee etc.) and/or wide area communications, (e.g. cellular), actuators (described below) and appropriate circuitry (including switches, antennas etc.).

According to the intended use, the electronic assembly is configured to store and execute embedded, pre-programmed or dynamically programmed rules and values. The rules may further operate according to stored permissions and registry of stakeholders. The rules, values, permissions and registry may be advantageously formed, transmitted to, and received by, the electronics assembly using methods and systems described as Secure Data Objects in U.S. patent application Ser. No. 15/602,885 Agents and Systems for Rights Management, which is incorporated herein in its entirety. They may be further updated, for example wirelessly or via electrical connection, at various times during the life cycle of the intelligent enclosure or intelligent container system.

The electronic assembly may also comprise and support security devices and apparatus, and systems to protect data and communications and in general the integrity of the system, such as encryption, authorization security, visible (and audible if also equipped with an acoustic interface) verification as described in U.S. patent application Ser. No. 14/927,098 Symbol Verification for an Intelligent Label Device, Ser. No. 15/368,622 Optically Determining Messages on a Display and Ser. No. 15/668,482 Verifying Messages Projected From an Intelligent Audible Device), intrusion detection and means for protecting against ("hardening"), and hardware agents (see U.S. patent application Ser. No. 15/228,270); each of which is incorporated herein in its entirety.

The elements of the electronic assembly may be configured between one or more subsystems, and further, between the container and the enclosure. Advantageously, some of the functions of the electronic assembly may be distributed to a gateway or external controller (e.g. processing, storage, rules, data actionable intel etc.) and interoperable wirelessly for example.

In a preferred embodiment, the electronically assembly is a module, advantageously partially or wholly encapsulated (to prevent contamination of the container contents or to prevent damage to the electronic assembly itself), constructed for placement inside, attached or otherwise coupled to the enclosure in such a way that the indicators (described previously and below) are visible through the enclosure (or through the container to which it will be joined). E.g., so that the electronic assembly can be 'snapped' into, adhered within, or otherwise coupled to, the enclosure. In another embodiment, the electronic assembly could be snapped into an appropriate constructed recess on the viewing side of the enclosure so that the indicators are visible directly. In yet another embodiment, an appropriately configured electronic assembly (e.g. as a flexible label or semi-rigid thin/flat structure) could be adhered to the surface of the enclosure.

In one exemplary embodiment, the electrical components, circuitry, and battery are mounted on one side of flexible, semi-rigid or rigid substrate, and a polymorphic display is mounted on the other. An antenna may be advantageously constructed on either side as optimal for performance and space. Vias connect the circuitry on both sides. The electronic assembly is mounted in an at least partially transparent enclosure such that the indicators of the polymorphic display are visible directly through the enclosure. If sufficient space exists, e.g. for large intelligent container systems, the components of the electronic assembly may be mounted on the same surface of the substrate and encapsulated with a transparent sealing film, then placed on either the inward or outward facing of the surface of the enclosure. In the former configuration the enclosure has a transparent window or opening, and in the latter, it may be opaque or transparent.

In another exemplary embodiment, the components of the electronic assembly (ICs, battery and indicators) are on the same surface of the sole/primary substrate. The substrate, or at least a portion of it, is transparent (e.g. made of plastic or plastic with a thin glass surface layer) and the indicators are constructed/configured so that they are viewable through the substrate. The electronically assembly is encapsulated thus creating a modular, sealed 'disc'. The modular electronic assembly can be subsequently set in a transparent enclosure so that the side with the components and indicators faces inwards towards the contents. The message-side of the indicators however are facing the substrate and thus visible from the top of the assembled intelligent enclosure (through the transparent enclosure and substrate).

In the examples above, the intelligent enclosure is preferably configured for coupling to, integrating with, an actuator as described below.

Actuator

Actuators have been previously described. As they pertain to intelligent container systems, an actuator is device or system for triggering an electrical signal corresponding to the action of users applied to the intelligent container system or its components: e.g. joining the enclosure to, or separating it from, the container; pressing a dispenser, opening or closing a port or latch load or fill or empty a container. An actuator signal also may be generated in response to the detection of a 'state' that corresponds to a user action (or lack thereof) e.g., via a sensing or monitoring a condition (or changes in the condition) of the intelligent enclosure or container.

Exemplary actuators comprise components such as a contact switches or electro-mechanical devices that switch when the enclosure assembly is joined or separated from a container. Others include capacitance switches and proximity sensors (e.g. inductive or optical sensing systems or pressure sensors (e.g. air/gas or mechanical)) etc. The functions/components of an actuator are often distributed between the container and enclosure assembly. An intelligent container system may have more than one actuator, including in some cases receipt of a wireless communication.

A simple exemplary actuator comprises an exposed conductive element ("conductor") on the container that electrically closes or completes an open circuit in the electronic assembly when the enclosure in which the electronic assembly is housed, is joined with the container. And subsequently, automatically opens or breaks the circuit when the enclosure is separated from the container. By way of illustration, a pill bottle (container) has a metal film (conductor) on the surface of the opening of the bottle. The bottle cap (enclosure+electronic assembly) has an open circuit that is closed/completed by the action of screwing the pill bottle cap onto the container and making contact with the metal film. The action of unscrewing the pill bottle cap from the container separates the metal conductor on the container from the electronic assembly thus breaking or opening the circuit in the electronic assembly.

Actuators (methods of generating actuator signals) may be of a variety of types (and constructed and configures in a multitude of ways) including: electro-mechanical, electro-acoustic, electro-magnetic, electro-optic etc.

Intelligent Enclosure

An intelligent enclosure comprises an electronics assembly, an enclosure and at least one actuator (or elements thereof as appropriate to its intended use). In this particular construction, the intelligence for the container system is concentrated in the enclosure part. By doing so, the container may be made inexpensively and in alternative form factors, and the intelligent enclosure associated with a "dumb" container at a later time.

State/Status Indicators—Polymorphic Displays

Because of their small surface area and ease of understanding, intelligent container systems (and intelligent enclosures) typically benefit from using state and status indicators (individual or groups of pixels or segments) to display visible messages. The combination of state and status indicators (pixels with different combinations of operable properties) is key to adoption and actual use of intelligent container systems. They provide the prescriptive and adaptive visible messages in modes consistent with the needs of the specific application and user. For example, Permanent and irreversible to verifiably and unequivocally visibly communicate an intelligent enclosure was started correctly (e.g. it was paired with a container, the electronic functions were powered and functioning etc.) and ended correctly—never to be used again. Without continuous power.

Bi-stable to minimize power consumption by switching off select indicators during inactive (stable) periods (e.g. between active windows for taking medicines).

Volatile and self-switching to reflect that the intelligent enclosure is working—and reliably providing visible messages according the detected/determined 'states' of the intelligent enclosure (e.g. open or closed, and where and when). And critically, that "fails safe". In other words, if there is a system failure—including loss of power for whatever reason visible alert/alarm is automatically provided.

Polymorphic Display

Due to their low profile, small form-factor, compact construction and fit-for-purpose operable properties, polymorphic displays are the preferred means of integrating state and status indicators into intelligent enclosures. It should be understood however that constructions of discrete components and different configurations are possible and may be used. Further, it may be advantageous to combine light emitting LEDs or OLEDs, or micro LEDs or micro OLEDs, particularly as status indicators, to create visible alerts. In some situations, and according to the composition and structure of the indicators, switchable back or front illumination may be advantageously used to create visible messages or alerts that are easier to read in dark environments. Specifically, reflective polymorphic displays may be illuminated with a front light constructed as an integrated light layer. A front light layer can for instance be comprised of an edge-lit light guide with outcoupling of light toward the display side using LED(s) as the light source(s). For transmissive or transflective polymorphic displays a backlit configuration can also incorporate edge-lit light guide or alternatively an OLED, LED array, or other light layer with similar functionality can be used. Note that the perceived optical states of the resulting emissive polymorphic display may in general be different than that of the corresponding passive (non-illuminated) display, for instance, if the artificial light source (e.g. a red LED) of the light layer is spectrally different in the region of interest (human and/or machine readable) than the ambient light (e.g. sun light). Such characteristics can be utilized to provide a different indication (e.g. state or status of a polymorphic pixel) of the display depending on its spectral reflectivity/transmission and whether the artificial light is turned on or off as perceived by a human and/or machine.

For some applications it may additionally be advantageous to pixelate/segment the light layer such that selective areas/pixels corresponding to one or more pixel/segments of the polymorphic display are illuminated (and therefore viewable in the dark) or illuminated with light of different spectral characteristics (e.g. green light), to set the emitted optical state(s). Furthermore, separately or in addition, the frequency of the illumination can be changed (e.g. fast or slow blinking or fading patterns) to convey additional states of the display or display pixel/segment. For instance, a permanent and irreversible indicator state in the passive (non-emissive) polymorphic display can switch to a volatile state of the emissive polymorphic display by illuminating the indicator (i.e. an emissive self-switchable indicator).

Indicators (polymorphic displays) are typically constructed as part of, or integrated into, the electronics assembly. Alternatively, they may be constructed as part of, or integrated into the enclosure, to which the electronics assembly is coupled. Other combinations are possible. Associated with indicators may be user-visible (e.g. on a viewable surface of the enclosure) fixed or variable messages that provide meaning, context or supplemental content to that of the indicators. For example, on a viewable surface of the intelligent enclosure. As noted previously, the indicators may have optical states both inside and outside the perceptible wavelength range of humans. In other words, the optical states may be human and machine, or machine-only readable.

Figure 16A:
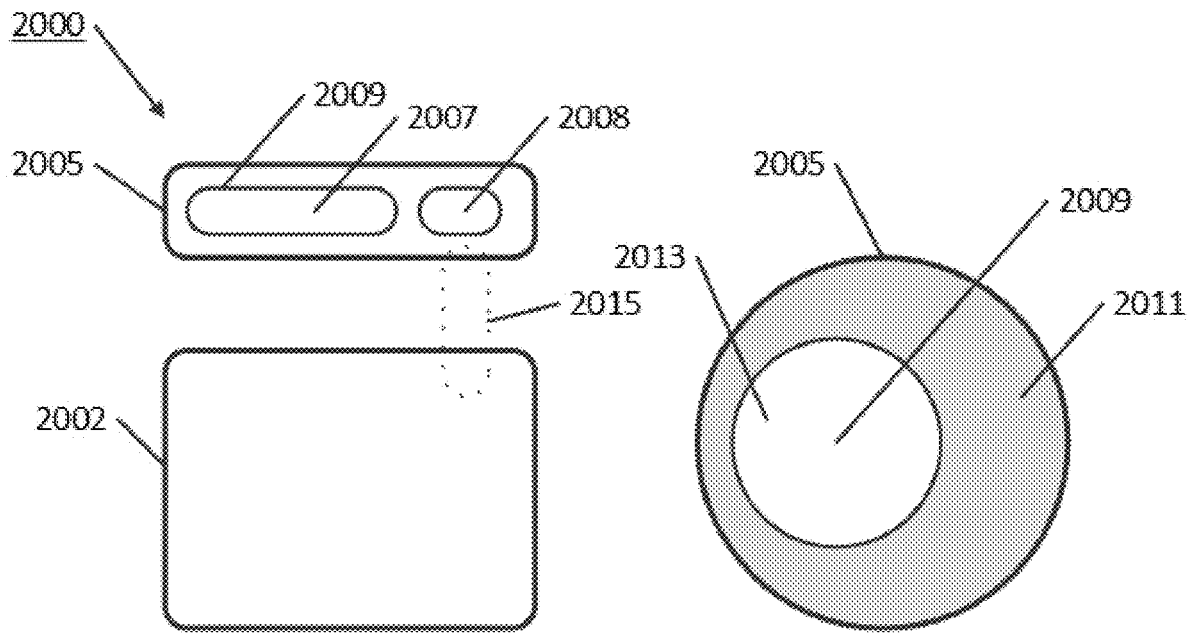
FIG. 16A shows a block diagram of an intelligent container with intelligent electronics in the enclosure in accordance with the present invention.

Referring now to FIG. 16A, a cross-section of an intelligent container system 2000 is illustrated. Intelligent container system 2000 is shown as an intelligent pill bottle, however it will be understood that many other applications and structures are enabled within this disclosure. Generally, the intelligent container system 2000 has a container 2002 for holding a good or product, such as pills, medicine, food, or other such product. Container 2002 has an associated enclosure portion 2005. The enclosure portion 2005 is constructed to mate with and seal against the container 2002.

It will be understood that the level of security and sealing between the container 2002 and the enclosure 2005 may be set according to application-specific needs.

For the intelligent container system 2000, the enclosure 2005 holds an electronic assembly 2007. In some cases, electronic assembly 2007 may be integrated into the structure of the enclosure 2005, and in other cases the electronic assembly 2007 may be removably attached to the enclosure 2005. For example, the electronic assembly 2007 may be in the form of an insertable module, that may be attached it to a receiving enclosure 2005 having a cooperating attachment mechanism. The electronic assembly 2005 typically has a substrate that may be flexible, rigid, or semi-rigid. For example, as illustrated with the pill bottle 2000, it may be possible to use a rigid substrate. However, to support applications that have more rounded or curved applications, or that require printing of the electronics, a more flexible substrate may be used. The electronic assembly 2007 also has a processor and memory for operating rules and conditions, as well as driving a display. Accordingly, the electronic assembly 2007 also requires a power source. The power source may be a battery, a photovoltaic cell, or other power harvester as previously described.

The electronic assembly 2007 also communicates with an actuator 2008 for detecting when the enclosure 2005 is attached or detached from the container 2002. In this way, a sensing mechanism 2015 is used to determine when the enclosure 2005 is securely positioned against the container 2002, and when the enclosure is spaced apart. For example, the sensing mechanism 2015 may detect that the container 2002 is locked and sealed against the pill bottle enclosure 2005. When a user opens the bottle, the sensing mechanism 2015 will notify the actuator 2008 that the cap has been separated from the body of the pill bottle. Then, the actuator 2008 will notify the electronic assembly 2007 that the status of connection has been changed. It will be understood that the sensing mechanism may be a physical connection, a wireless radio connection, or optical detection system. It will be understood that other sensing mechanisms may be used.

Enclosure 2005 is also illustrated in top view showing that the top of the enclosure 2005 has a portion that is opaque 2011, as well as a translucent or semi translucent portion 2013. In one example, the electronic assembly 2007 has a polymorphic display 2009 on its top surface, that when the electronic assembly is installed in the enclosure 2005, the polymorphic display 2009 can be viewed by looking down at the top of the enclosure 2005. In the specific example of the pill bottle, this would allow a user to see information regarding their medication and prescription simply by looking at the top of the enclosure 2005. In a particularly useful construction, the polymorphic display 2009 is formed comprising a plurality of pixels with different operable properties as described elsewhere in this application.

Figure 16B:
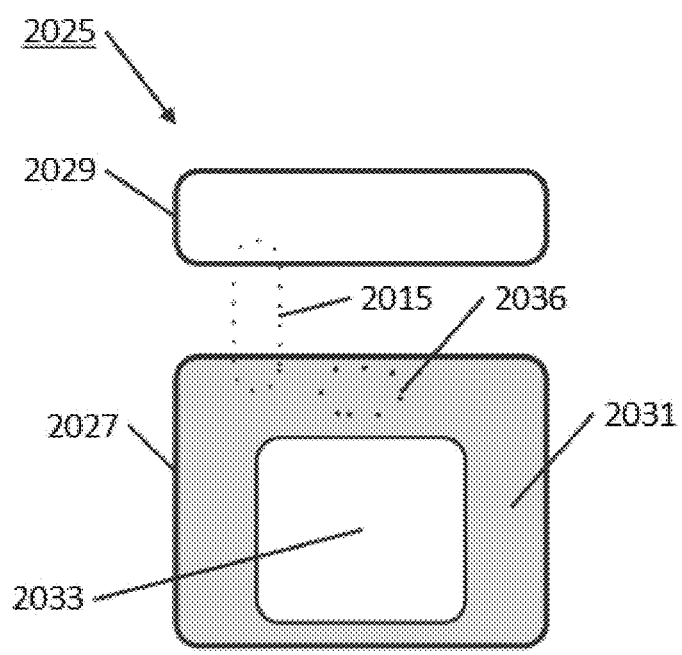
FIG. 16B shows a block diagram of an intelligent container with intelligent electronics in the container in accordance with the present invention.

Referring now to FIG. 16B, another example of the intelligent container system 2025 is illustrated. Intelligent container system 2025 is similar to intelligent container system 2000 described in detail above, so only the differences will be described here. For intelligent container system 2025, the electronic assembly 2033 is positioned in the container 2027, and in a similar way, the actuator electronics 2036 is also positioned in the container 2027. It will be understood, that container 2027 often will be formed as a curved container, such that the electronic assembly 2033 will need to be constructed on a flexible or semi rigid substrate. It will also be understood that the entire enclosure 2029 may be constructed out of an opaque material 2031, as the polymorphic display, or indicators, are now showing through a transparent section 2033 of the container 2027. In the previous embodiment the electronic assembly 2007 was illustrated to be in the enclosure 2005 of the intelligent container system 2000. In this embodiment the electronic assembly 2033 is illustrated be in the container 2027 of intelligent container system 2025. It will be understood that in yet another embodiment, that a portion of the electronic assembly may be in the enclosure part, and the rest of the electronic assembly may be in the container part. Similarly, the electronics for the actuator and display may also be split between the enclosure part and the container part.

Figure 17:
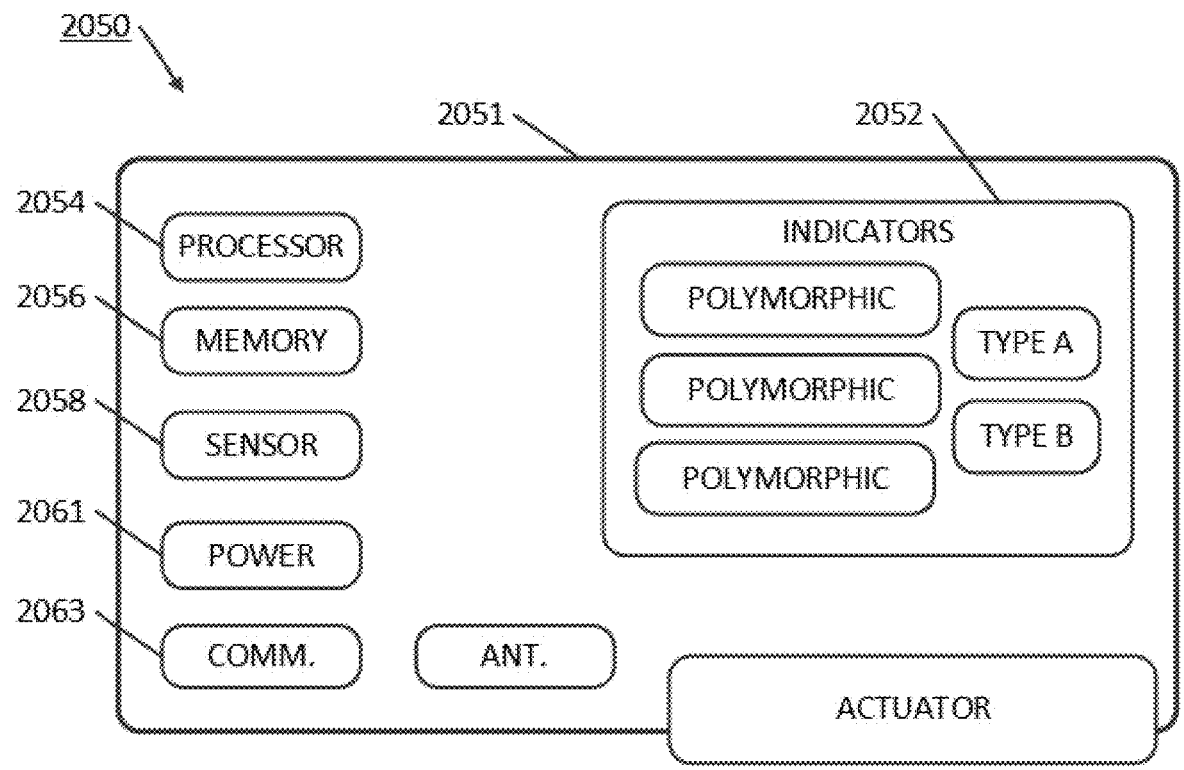
FIG. 17 shows a block diagram of intelligent electronics and polymorphic indicators in accordance with the present invention.

Referring now to FIG. 17, more detail is provided for the electronic assembly 2050, which is similar to the electronic assembly 2007 and 2033 previously described. The electronic assembly 2050 is formed on a substrate 2051, which may be flexible, semi rigid, or rigid. It will be understood that a wide variety of substrates may be used. The substrate 2015 has electronic components and circuits such as a processor 2054, memory 2056, and power source 2061. These elements cooperate to enable the electronic assembly 2052 to operate rules and evaluate conditions that can be used to set or modify the pixels of polymorphic display 2052. Polymorphic display will have multiple polymorphic portions as illustrated, and may incorporate or integrate other display types as well, as shown the "Type A" and "Type B" indicators. As described earlier, the pixels of polymorphic display 2052 often will form indicators having different operable properties. Accordingly, the different pixels of the polymorphic display 2052 enable a unique level of trust in information or messages being presented.

The electronic assembly 2050 may also have a communication port 2063 for allowing uploading and downloading of information. In some cases this communication port 2063 may be a physical connection, and other cases may be a wireless connection, such as an optical link or a wireless radio. In the case of a wireless radio, the communication port 2063 would also typically require an antenna structure. The electronic assembly 2050 also cooperates with an actuator or a detection apparatus for determining when an enclosure part is connected to or separated from its associated container part. Sometimes the actuator may be located on the electronic assembly 2050, and other times it may be spaced apart. The electronics assembly 2050 may also contain one or more sensors, such as sensor 2058. The sensor may be for humidity, temperature, shock, vibration, biochemical, proximity, motion or other internal or environmental condition. In another example, the sensor may be a clock or timer. Accordingly, the rules and values to be applied by the electronic assembly 2050 may be set to operate responsive to one or more sensed conditions.

Figure 18:
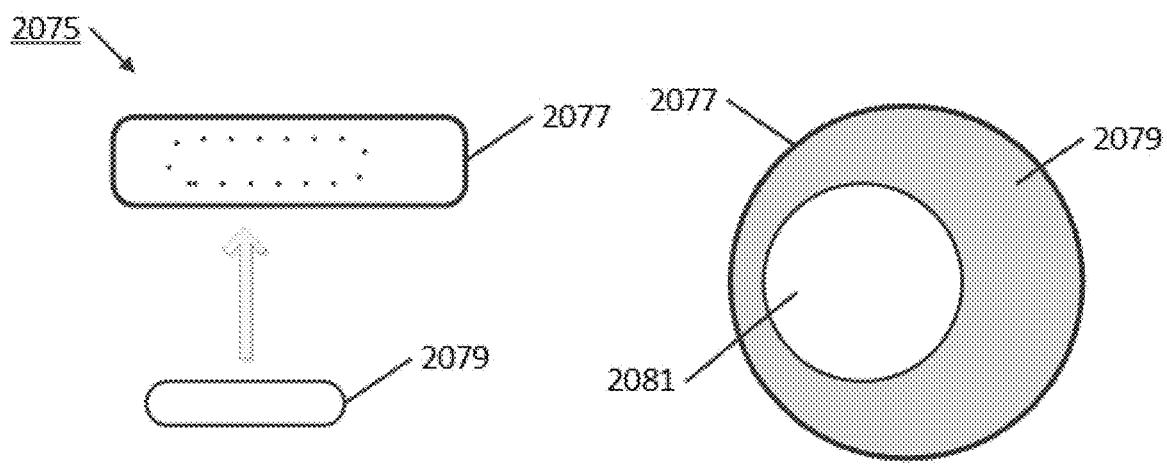
FIG. 18 shows a block diagram of a module holding the intelligent electronics for use with an intelligent container in accordance with the present invention.

FIG. 18 shows another embodiment regarding an intelligent container system 2075. Here, the intelligent container system 2075 has an enclosure portion 2077 that is constructed initially without associated electronics. Instead, the enclosure 2077 is constructed with a generally opaque top 2083 with a transparent section 2081. The transparent section 2081 is sized and positioned to allow a polymorphic display to be positioned in a way that a user can view indicators or messages by looking at the top of the enclosure. The enclosure 2077 has attachment structures that allow the electronic assembly 2079 to be inserted and positioned into the enclosure 2077. In some cases the electronic assembly 2079 may be removably attached, and at other times the removing of 2079 would destroy the enclosure 2077. In the embodiment shown in 2075, the electronic assembly 2079 is constructed as a standalone electronic module. In this way, it can be manufactured more inexpensively, in higher quantities, and may be more effectively sealed against environmental conditions.

Figure 19:
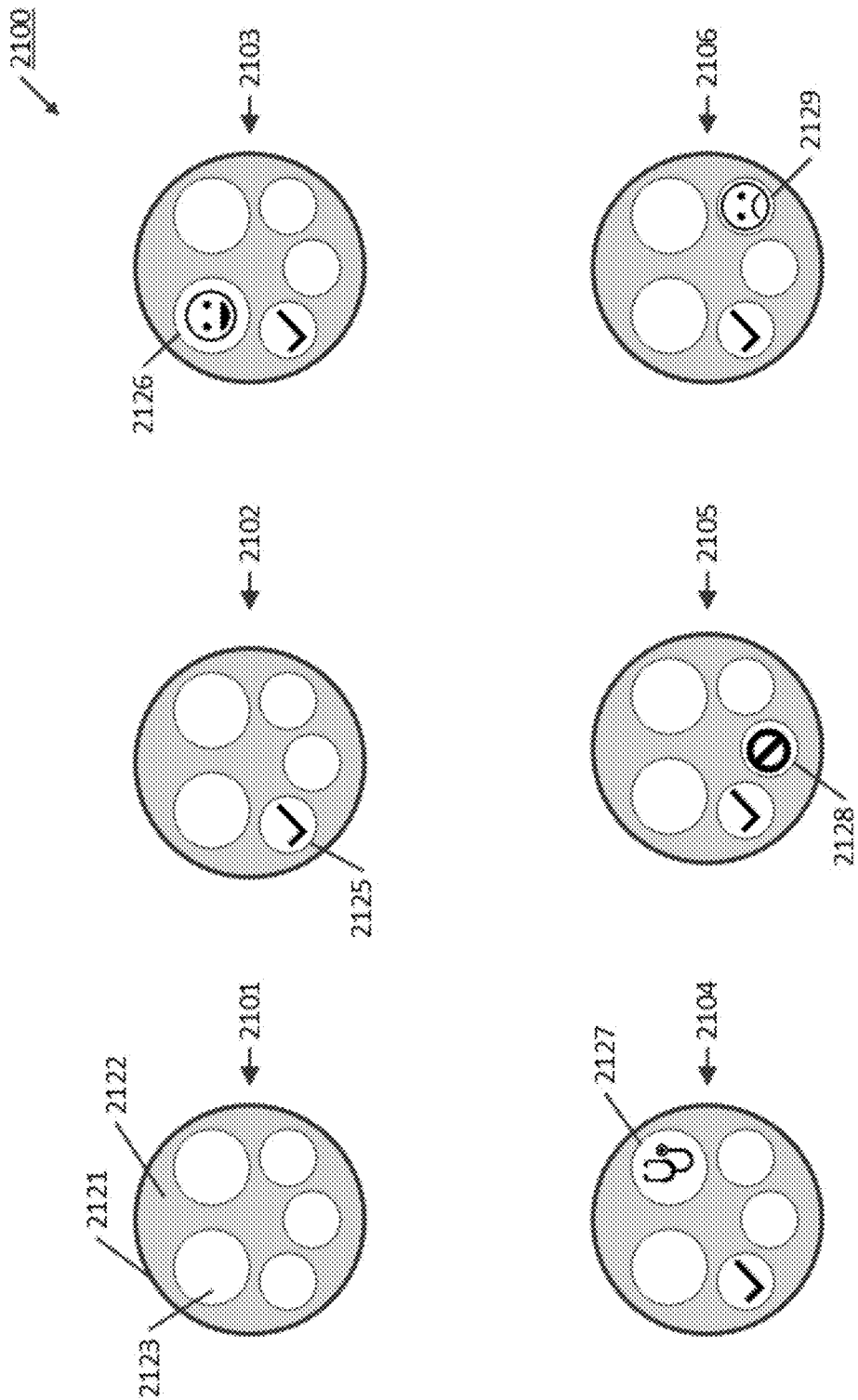
FIG. 19 shows a block diagram of a pill cap enclosure with a polymorphic display in accordance with the present invention.

Referring now to FIG. 19, a specific example of a cap enclosure 2100 with polymorphic display is illustrated. In particular, cap enclosure 2100 illustrates a cap 2121 for a pill bottle, which acts as the container for the intelligent container system. Generally, cap 2121 functions as a typical cap for a pill bottle in that it will safely store medications within its associated container. It will be appreciated that the cap may be snap-on, twist off, or child safety sealed. Cap 2121 is typically made of an opaque plastic portion 2122 and has one or more openings 2123 to allow visibility to a polymorphic display mounted inside the cap 2121. These openings 2123 may be open, or maybe covered with a transparent or semitransparent covering. In some cases the cap 2121 may be manufactured with an electronic assembly integrated into its under structure, and in other cases the electronic assembly may be manufactured as a separate insertable piece. Either way, the electronic assembly associated with the cap 2121 is loaded with information specific to the prescription for the medication contained within the container.

As previously described, an electronic assembly drives the polymorphic display to enable intelligent warnings and communications with the user. In this way, the enclosure 2100 can mimic the behavior of healthcare professionals and improve the likelihood that the patient will act in accordance with a healthcare provider's prescription or instructions. The enclosure 2100 enables the patient to visibly be reminded, alerted, or warned according to their doctor's requests. In a similar manner, the pharmacy or other healthcare professional may receive notifications of the patient's behavior and may be able to make adjustments in the prescription or patient instructions to obtain better compliance with the prescription. The enclosure 2100 is enabled to use of a light-weight, self-contained electronic assemble module that in some cases may simply be snapped into a transparent bottle cap. Item level intelligence in the form of rules or protocol can be loaded into the electronic assembly specific to this prescription. Now, with the information on the polymorphic display being visible by the patient, the patient may be actively encouraged to act in accordance with prescription, and a level of compliance with the prescription may be determined.

Enclosure 2100 is illustrated with six different configurations of the polymorphic display. Configuration 2101 shows the enclosure 2100 during manufacture. Accordingly, each of the display windows are blank. It will be appreciated that although five windows are illustrated, it may be possible to have a single large window that is set into distinct polymorphic portions, that is, each portion having its own modalities. Configuration 2102 illustrates what the enclosure 2100 may look like after medication has been placed in the container and the cap 2121 sealed to the container. The polymorphic display portion 2125 has a checkmark that shows that the enclosure is sealed, safe, and ready to use. This portion 2125 may be made permanent and irreversible, as it is desired to know that at the outset this enclosure was properly sealed and made available to the patient.

2103 shows that the medication has been dispensed to a particular patient, and the display portion 2126 shows the patient that it is now time to take the medication. This polymorphic portion 2126 would be self-switching and volatile, allowing the electronic assembly to turn the indicator on and off depending upon whether or not the prescription indicates a pill should be taken. This portion 2126 would have a failsafe mode that if anything went wrong, the display portion 2126 would remain blank. Configuration 2104 shows that the patient needs to immediately contact their doctor. This portion 2127 may have modalities similar to display portion 2126, except it's failsafe display in case of malfunction would be to display the "contact doctor" symbol. Configuration 2105 shows in display portion 2128 that the user is not to take the medication at this time. This display portion 2128 may be made switchable and bi-stable. That is, once it is set into an optical state, it will remain in that optical state without power until the electronic assembly actively switches it to the other optical state. Finally, configuration 2106 shows in display portion 2129 that there has been a malfunction and that the patient is not to use the medication until the malfunction is fixed. Display portion 2129 could have polymorphic modalities that make it self-switching and volatile, with the failsafe display being the malfunction symbol. That is, it would take active monitoring and control from the electronic assembly to maintain portion 2129 clear, and if anything goes wrong or power is lost, the display portion 2129 would automatically self-switch to its malfunction symbol.

Figure 20:
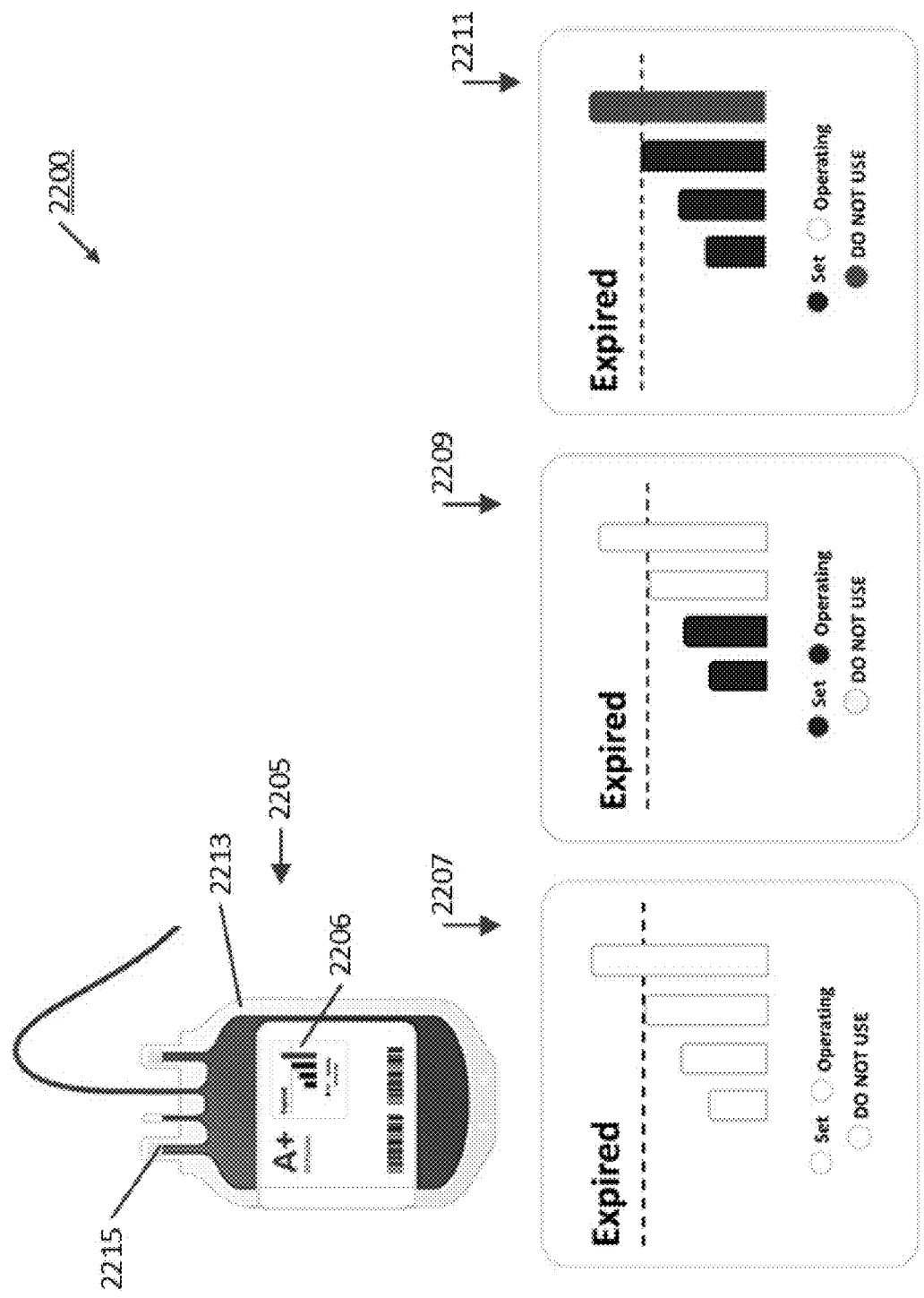
FIG. 20 shows a block diagram of a blood bag enclosure with a polymorphic display in accordance with the present invention.

Referring now to FIG. 20, an intelligent blood bag system 2200 is illustrated. The blood bag system 2205 has a container in the form of a traditional blood bag 2213, and an intelligent enclosure cap 2215. The blood bag 2213 has a special label having a polymorphic display 2206. An electronic assemble is integrated into the label 2206, and preferably is located directly behind the display area of the label. The cap enclosure 2115 communicates to the electronic assembly, either by a wired or wireless communication circuit. In this way, the electronic assembly receives a "sealed" signal when the blood bag is initially filled, and thereby can start an expiration timer. It will be appreciated that other sensors may be used, such as a sensor on the output line to generate a signal when blood is being removed from the bag. It will be appreciated other sensors and actuators may be coupled to the electronic assembly.

The polymorphic display 2206 may be portioned into several distinct display areas, with each display area having its own set of optical modalities. In this way, the provider and users of the blood bag 2205 may receive particularly useful and trustworthy information. Configuration 2207 shows the polymorphic display prior to the blood bag being filled. Once filled and provided for use, configuration 2209 shows a set of bars showing the amount of time elapsed, and cooperatively with the printed "Expired" threshold dotted line, the time remaining before the blood must be used or otherwise disposed. These display bars may be, for example, permanent and irreversible. That is, once set, they remain showing that the blood had reached a particular time in its safe, usable life. In a similar way, a "Set" indicator could be made switchable and permanent, such that when the bag is first placed into distribution, this indicator is permanently set. Another indicator, such as the "Operating" indicator may show that the blood within the bag is in a usable condition. For example, this display portion may be set responsive to timers, actual time, and temperature sensors. This display portion would be switchable depending on time and environmental conditions. For safety purposes, this portion would also be self-switching to the clear visible state in case of malfunction. Also, upon a particular sensor or timer condition, this symbol could also be cleared. Finally, configuration 2211 shows that the blood has expired (the last bar) or that some other failure condition exists (the "Do Not Use" indicator). The expired bar would be permanent and irreversible. A second symbol, "Do Not Use," may also be set responsive to the expiration of the date, but may be set according to other conditions, such as a failure of the electronic assembly, surpassing a temperature threshold, or a chemical sensor detecting a contamination. This symbol also would be self-switching with the failsafe mode being set to show the "do not use" condition.

Polymorphic Display Cards

A major benefit of polymorphic displays is their inherent ability to be manufactured fit-for-purpose and the ability of devices that use them (e.g. electronic assemblies, intelligent enclosures etc.) to be configured fit-for-purpose as well. The latter, one time or multiple times over the life of the device. Also, of importance is the ability for certain devices, e.g. an electronic assembly or intelligent enclosure to be multi-use. This is particular of importance for polymorphic displays, or any ultra-thin display having one or more portions that are single-use, e.g. that have a non-switchable state, and are preferably disposable.

There is therefore a benefit for polymorphic displays configured as swappable "display cards". Polymorphic display cards are analogous to memory cards, SIM cards or memory "sticks", or the swappable memory battery/carrier described in the Power section of this application. Of particular interest are display cards having polymorphic displays, but also, with ultra-thin displays (or combinations of displays) having portions with two or more stable states without power (e.g. irreversible, permanent and irreversible, bi-stable and multi-stable displays). Accordingly, while display cards are described herein as having polymorphic displays it is to be understood, that other types of displays, and combinations of them (e.g. electrochromic, electrophoretic, ferroelectric, zenithal, and cholesteric LCDs etc.) may also be used.

Polymorphic display cards typically have a rigid or semi-rigid substrate on which the polymorphic display is fabricated or mounted onto. They also have circuitry and connectors or contacts for electrically and mechanically mating with an appropriately configured receptacle. A polymorphic display card, for example, may have circuitry patterned such that it cooperates with the substrate to form the insert for mating to the receptacle. Advantageously, the same circuitry would also function as the electrodes for the display pixels or indicators.

The companion receptacle is part of, or coupled to, the electronic assembly. As previously described, the electronic assembly is located in or on the enclosure or container (or more generally, any host device). Exemplary receptacles are sockets, ports or various other connectors. The display card is typically inserted or mounted via a mechanical action (e.g. inserted, slid, snapped in or on, etc.). In addition to a coupling mechanism, the receptacle may have a release mechanism as well.

Rules

As previously described, the intelligent container system generally operates according to rules loaded into, stored in, and executed by, the electronics assembly (and by extension the intelligent enclosure). Of particular interest are rules that govern the switching signals that set the visible indicators within the polymorphic display (or otherwise different combinations of pixels). And further, combinations of rules that are prescriptive to promote desired actions (e.g. by presenting user information/messages visibly or audibly) and adaptive based on the actual actions (or lack thereof) taken by the user in regard to the intelligent container system (e.g. open or close). The combination of prescriptive and adaptive rules, can be thought of as a feedback mechanism. And further where the feedback is used to affect subsequent actions according to previously set rules or to modify the rules themselves.

As described in U.S. patent application Ser. No. 15/602, 885 "Agents and Systems for Rights Management" which is incorporated by reference herein, the rules may be governed by permissions which may be implemented by means such as presentation of a unique code or ID (e.g. wirelessly, keypad, fingerprint etc.) to an appropriate configured device, or automatically by geolocation. Such permissions may be dependent on a registry. The registry may also be used to adapt the rules, control access to, or store, secure and transmit various data related to the intelligent container, its use, presented messages, actions taken etc.

By way of illustration, the rules in the electronic assembly may advantageously:

Generate and present actionable intelligence by presenting visible, audible or wireless messages that correspond to prescribed practices, procedures or regimens (e.g. taking body temperatures or medications (e.g. drugs), best practices for cold storage (e.g. of blood and other biologics), safe usage etc.;

Monitor prescribed (intended) and actual activity (usage) and adapt subsequent messages according to for example, presumed and calculated quantities taken and those remaining, patterns, sequences and frequency of actions (usage);

Sensed environmental conditions, time, usage, and/or received communications;

Record "action", "event" and other data (raw and calculated), e.g. usage/consumption patterns, comparisons to prescribed rules, projected quantities used or remaining, proactive communications (e.g. alarms/alerts, displayed or transmitted messages), verifications etc.;

Manage visual, audible and wireless communications, data logging, reporting, alerts, alarms etc.; or Perform self-diagnostics and fault detection, and alert/alarm accordingly.

Pairing

To avoid accidental mismatching of intelligent enclosures with the wrong container, or to facilitate tracking, it may be advantageous to pair an intelligent enclosure with a container. The devices may be mechanically paired; however, the preferred methods are electronic or optical. In either of the latter cases, the container is typically assigned a Container ID which can be read by the intelligent enclosure (stored in either electronic or optical memory). In many applications, the container doesn't need to 'know' the ID of the intelligent enclosure. In other situations, it may be important for both devices to know the ID of each other. The Container ID may be unique or representative of a class of 'authorized' containers and stored in optical or electronic memory attached the container. An intelligent enclosure may also support multiple class-level Container IDs if appropriately configured.

The Container ID may be stored in the memory of the intelligent enclosure prior to joining with the container, for example wirelessly, or it may be acquired and stored when intelligent enclosure and container are first joined. And optionally, an indicator set to visible state accordingly. In the latter case, the intelligent enclosure would read the Container ID from the container to which it is joined and store it in memory for use in determining if the devices are paired (authorized). Alternatively, if the container is configured with electronic memory and appropriate circuitry, the intelligent enclosure could generate or recall from memory a Container ID and write it to the container's memory where it could be later accessed if or when the devices are separated and subsequently rejoined. The Container ID can also be used by other intelligent enclosures to prevent unintended usage.

When joined and appropriately paired (authorized), the intelligent enclosure can then operate as intended (e.g. initiate electronics, execute rules, set a clock/timer etc.). If however the devices are joined but not paired, the intelligent enclosure can generate a visible, audible or wireless alert or message according to rules in the electronics assembly. Other methods for pairing an intelligent enclosure to a container are possible.

Electronic Pairing

An exemplary solution is to affix a label comprising persistent electronic memory (e.g. an IC or printed memory such as produced by Xerox under license from Thin Film Electronics) and an electrical interface (e.g. circuitry and serial bus) to the container. The label configured and positioned on the container such that it electrically couples to the electronic assembly when the intelligent enclosure is joined to the container. The Container ID is written to the electronic memory, or already embodied in the printed memory. Typically the Container ID would be written to an IC on the container via connection to the intelligent enclosure as described above. In some applications however, it may be desirable to wirelessly write the Container ID to the IC. One such method would be to use a label containing an appropriate RFID IC and antenna (essentially a RAIN or NFC RFID tag) with appropriate circuitry for electrically communicating to the intelligent enclosure when joined.

Note that the components and circuitry required for electronic pairing on both the container and intelligent enclosure may be have in common those required for an actuator. And as noted previously, the functions of the electronic assembly, and further those of an RFID label, can be distributed across between the container and the enclosure.

Optical Pairing

Optical detection techniques also can be used to pair containers to intelligent enclosures. In one embodiment, an optical pattern (e.g. black and white 'bars') encoded with an ID is affixed to the container, directly by printing or other deposition technique, or indirectly via a label. The electronic assembly comprises a light source (e.g. one or more LEDs) to ensure a sufficient illumination to detect and discriminate between the elements of the pattern. The electronic assembly further comprising a light guide to distribute light from the light source in a substantially uniform pattern across and towards the optical pattern. The transparent enclosure advantageously configured for that purpose. The electronic assembly further comprising a patterned photovoltaic (PV) film positioned behind the light guide such that the PV film receives the reflected light from the optical pattern subsequently generating electrical signals. The electrical signals being deciphered to determine the encoded ID. Related methods and apparatus for optical detection and determination of optical patterns are described in the section "Verification of Visible Information."

Verification of Visible (and Audible) Information

Because user actions depend on visible information, it may be advantageous to local users, and remote stakeholders in the outcomes of those actions, to be able determine or verify the information actually visible to users at specific moments in time (e.g. when patients should take medicine, or chemist should seal a container of oxygen sensitive materials) and over time (a visible history).

One preferred system and method is optical determination and verification which is described in U.S. patent application Ser. No. 15/368,622 "Optically Determining Messages on a Display," which is incorporated herein by reference. In brief, optical determination or verification involves a thin photovoltaic (PV) layer (typically a thin film) configured to the surface of the polymorphic display (and appropriate circuitry and logic added to the electronic assembly). The PV layer is patterned according to the pixel pattern and with the electrical assembly, senses (reads) the received light according to the optical state of the pixels (e.g. black, white or gray, or color). Stored logic/rules and values are used to convert the optical state values into corresponding messages and further, verifying that the displayed messages are the intended messages.

Depending on the application, a light source (e.g. an LED) and a thin, and as appropriate to the application, flexible light guide, may be included in the display assembly to ensure adequate light independent on ambient lighting conditions. Accordingly, the PV layer is configured to detect reflected, transmissive, transflective or emissive light. And, depending on the type and construction of the display (and electronic assembly), the layer may be configured on the front or back surface of the display.

The light guide is a thin film or layer of material embossed, stamped or otherwise patterned appropriately to outcouple light towards and across the polymorphic display. The light guide may be advantageously constructed as a lens or pattern of lenses that focuses ambient light on indicator(s)/PV layer. The light guide may also be constructed as part of the enclosures itself (e.g. the inward facing surface of the top of a bottle cap). The light source, advantageously with a light guide, may further be used to illuminate the enclosure (or container) according to logic, timed events, user actions etc. For instance, in response to event such as a scheduled opening of the container (by removing the enclosure) to access the contents within (e.g. to take a pill according to a prescription). The illumination regulated (e.g. on, off, how bright, color—by controlling the light source, etc.) by internal logic/rules (e.g. stored/operable by the electronic assembly) or responsive to external communications (e.g. a wirelessly identifying one among many possible containers and illuminating the enclosure so that it is easily identified). The illumination may also be used to alert/alarm via e.g. by flashing. Indicators can also be used for the same purpose, e.g. flashing, rapidly alternating between states etc. In some applications, the PV layer may be used to harvest energy, e.g. for operating or storage.

Another preferred system and method is electrical determination and verification which is described in Chromera U.S. patent application Ser. No. 14/927,098 "Symbol Verification for an Intelligent Label Device", which is incorporated herein by reference. In brief, electrical verification typically involves enhancements to the display driver to electrically detect (or 'read') the states of the individual pixels. As with optical determination/verification, stored logic/rules and values are used to convert the electrical state values into corresponding visible information, determining the displayed messages and further, verifying that the displayed messages are the intended messages.

Power

The electronic assembly may have an integrated power source, e.g. a battery or capacitor affixed to the substrate and coupled to the circuitry. External power sources may also be used as primary or secondary sources of power. Alternatively, the enclosure and electronic assembly may be configured to use a replaceable battery. The battery may be for example a coin cell, or a AAA battery and the enclosure and electronic assembly configured to accommodate the battery holder.

Due to their size, a swappable battery comprising a thin film or solid-state (semiconductor) battery mounted on a carrier (loosely analogous to a nano sim card), may be advantageous in applications such as intelligent pill-bottle container systems. In one preferred embodiment, the electronic assembly is configured with an electrically coupled receptacle for the carrier/battery. And advantageously, the enclosure is configured to allow the carrier/battery to be snapped into the receptacle, or the exterior of the enclosure configured with an opening aligned with the receptacle to allow the carrier/battery to be inserted through the opening and directly into the receptacle. And optionally, the enclosure and electronic assembly further configured to release or eject or otherwise facilitate the release of the carrier/battery.

Such a flexible system would have multiple benefits such as extending the shelf-life of an intelligent container system (or just the intelligent enclosure) by being able to insert power immediately prior to use or extend its operating life by being able to swap the power store while in-use or deployed (with appropriate backup, refresh). Further benefits include the ability to reuse the intelligent enclosure and electronic assembly, facilitate recycling/disposal, reuse of the battery if rechargeable, and customizing power (and minimizing costs) according to the application.

Acoustic Interface

The electronic assembly of an intelligent enclosure may comprise an acoustic apparatus (e.g. speaker or buzzer and/or a microphone and associated circuitry), in addition to, or in lieu of, visible indicators. The electronic assembly and the enclosure would accordingly be constructed to provide a reliable acoustic channel or medium (e.g. a membrane) to facilitate the acoustic communications (e.g., with openings in the enclosure (or container) and appropriate placement of the acoustic apparatus). Similar to the methods that govern the switching signals that generate visible alerts and other messages, the intelligent enclosure may generate audible alerts and other messages. And further, to receive audible and inaudible sounds.

In one exemplary use, a speaker is used to generate an audible alert responsive to an attempt to join a mismatched enclosure and container (previously described). In another, a microphone is used to receive a specific voice command (or acoustic pattern—e.g. that generated by a cell phone) and compare it to a previously stored signature or pattern (in the intelligent enclosure, or wirelessly linked local or remote device). The interaction corresponding to intended actions by users (e.g. oral confirmation that a pill was taken, the container was received, opened or is empty, tampered or contaminated, etc.)

As described below, the acoustic apparatus can be configured to further support acoustic verification (and dependent actions) such as that described in U.S. provisional application 62/370,376 "Verifying Messages Projected From an Intelligent Audible Device," which is incorporated herein by reference.

Network Communications and Interoperability

Appropriately configured, multiple of intelligent container systems can interoperate. That is, visible (and audible and wireless) messages and alerts can be individually adapted, coordinated or synchronized, by clusters or groups of intelligent container systems according to the monitored and sensed conditions, and importantly, the user actions taken relative to the individual members of the cluster. Other intelligent devices can also be part of the local or distributed cluster. Exemplary applications are to identify, associate and manage multiple, often different, healthcare products (a cluster of intelligent container systems) for a patient, or doctor's office, or shipment etc. And further, to ensure that a patient's regimen involving multiple drugs, dietary intake or other actions (e.g. use of exercise machines, taking temperature) is followed correctly. E.g. drug X isn't taken unless and until drug Y.

Generally, and appropriate to the application, clusters of intelligent containers systems can:

Implement distributed (or centralized) rules and affect user actions that depend on intelligent container system level information, e.g. conditions, usage or outcomes etc. of the different associated products in the cluster;

Secure and distribute among the cluster information from each intelligent container system that can be reassembled or managed according to the rules governing the cluster; or Conduct analytics based on information received from the individual containers or enclosures comprising the cluster, and multiple clusters.

Communications between intelligent container systems and other local devices may be with wireless peer-to-peer networks (e.g., using BLE) or local area networks (e.g., using WiFi). Communications with remote devices may be with a local gateway or bridge (e.g. internet connected mobile phone, access point, router etc.) to a wired or wireless wide-area network. Responsive to internal rules and user actions taken (or not taken) according to visibly presented messages by polymorphic displays, an intelligent enclosure may initiate wireless communications and transmit/receive messages and data. A receiving device (e.g. a computer, mobile phone or another electronic assembly), individually or cooperatively with other wireless devices, may propagate the message (e.g. an alert) or generate and transmit new messages in response to the communication originating with the electronic assembly.

Applications may further benefit from wireless beacons or other geolocation means. For example, by knowing the location or movement history of a container or a set of associated containers, the location and time they were opened or closed, locked or unlocked etc., or the shared proximity to other intelligent container systems of an authorized class. Collectively, absolute or relative geolocation can be used to pair intelligent enclosures (electronic assemblies), implement authorization systems, enhance system performance and monitoring, move from item level, to location level to wide area for systems, data collection, analytics and distribution of information. Geolocation systems and services can also be also used with intelligent container systems to automatically provide access, localize information, e.g. times and schedules, visible and audible alerts etc., and reporting.

Preferred systems and methods for managing clusters of electronic assemblies (referred to as hardware agents) are described in U.S. patent application Ser. No. 15/228,270 "Transaction Agents and Systems". Related methods of forming, securing and distributing rules and rights/permissions to electronic assemblies (hardware agents) with secure data objects are described in U.S. patent application Ser. No. 15/602,885 "Agents and Systems for Rights Management". Both are incorporated herein by reference.

By way of overview, according to U.S. patent application Ser. No. 15/228,270: A hardware agent is a hardware device attached to, embedded in, or otherwise associated with a good. In particular, the hardware agent is bound to the good in such a way that information held by the agent may be confidently associated with the good. The hardware agent is constructed to securely hold information about the good, and information about stakeholders, such that the agent may autonomously make binding decisions regarding the good, including sales and financial transactions. Although the hardware agent may perform many functions autonomously, it often will have communication capabilities enabling it to share information with stakeholders, or to others as allowed.

By way of overview, according to U.S. patent application Ser. No. 15/602,885: An information system is provided that enables stakeholders to define a secure data object that sets permissions, rules, and rights for an asset. The secure data object may be communicated to entities, such as computer hosts or hardware agents, and the entities are enable to act within the permissions, rules, and rights to conduct transactions and gather information as agents of the stakeholders. The secure data object may be received into a hardware agent attached to an asset, and the agent may have sufficient permission to monitor environmental conditions, adjust pricing, consummate a transaction, or communicate a report.

Figure 21:
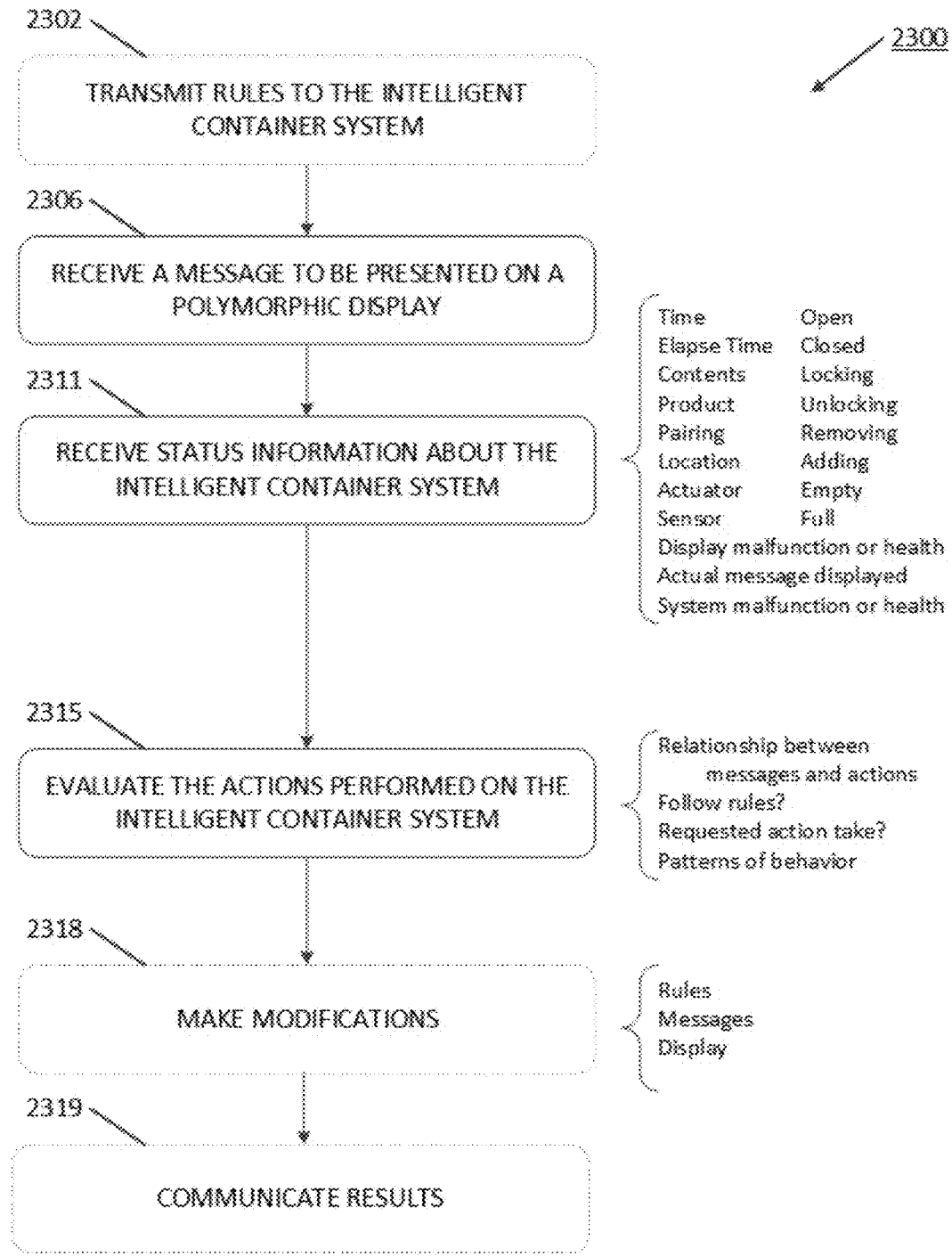
FIG. 21 shows a flowchart of a method for evaluating actions in accordance with the present invention.

Referring now to FIG. 21, a method 2300 for operating an intelligent container system is illustrated. The intelligent container system has a local electronic assembly for managing a polymorphic display on a container or enclosure. In some cases, the electronic assembly may operate completely or mostly independently, and in other cases it is desired to maintain some level of remote network communication with the intelligent container system. Accordingly, intelligent container system may include wired or wireless communications facilities for communication to a network or service. In some cases, the electronic assembly may be loaded with rules, protocols or prescriptions at the time of manufacture or dispensing. In other cases, it may be desirable to download those rules from the network to the electronic assembly as illustrated in block 2302. Further, it may be useful to allow the network to make modifications to the rules after the intelligent container system has been distributed.

From time to time, the network may receive information regarding messages that the electronic assembly sent for display on the polymorphic display of the intelligent communication system as illustrated in block 2306. For example, a message may be received that the electronic assembly has sent a message to the polymorphic display to present to the user and icon that indicates a pill should be taken. It will be appreciated that there are a wide variety of messages and indicators that could be sent. It will also be understood that not every message needs to be sent back to the network, and the electronic assembly may make the decision based upon local rules and protocols on which messages should be transmitted back to the network. It will also be understood that the sending of this information does not need to be in real time, but may be done from time to time, or may be done at a time when the electronic assembly has been presented back to a facility, such as a pharmacy.

The network also receives status information about the intelligent containers as illustrated in block 2311. It will be appreciated that there are a wide variety of status information that could be sent. For example, the status information could include time, elapsed time, content information, product information, pairing information, location information, whether or not the enclosure is open or closed, or an indication of how long the container has been opened and closed. The status information could also include information regarding locking and unlocking, whether things have been removed or added to the container, and whether the container is empty or full. The status information could also include information regarding whether or not an actuator has been activated, and data regarding any environmental sensors. The status information could also be in regard to whether or not the display is operating properly, or whether the electronic assembly has detected any malfunctions in the system. In another example, the status information could provide an indication of the actual message displayed to the user. If the local electronic assembly is provided with optical detection and verification circuitry, the electronic assembly could detect the optical state of one or more of the polymorphic display portions, and verify that the correct message was actually displayed to the user. In this way, the network would have greater confidence that the actual message was available to be seen by the user. It will also be understood that not every status needs to be sent back to the network, and the electronic assembly may make the decision based upon local rules and protocols on which status information should be transmitted back to the network. It will also be understood that the sending of this information does not need to be in real time, but may be done from time to time, or may be done at a time when the electronic assembly has been presented back to a facility, such as a pharmacy.

With the message information from block 2306, and the status information from block 2311, the network is now able to evaluate the actions performed on the intelligent container system as indicated in block 2315. Generally, the network is now enabled to identify relationships between messages displayed to a user, and actions taken at the container. These relationships may be useful to understanding compliance with the rules, but more broadly, may be used to adjust messaging strategies to facilitate and encourage appropriate behaviors. In a more specific example, the relationships would define whether or not the user complied with specific prescription or protocol rules. By understanding how the display messages relate to patterns of behavior, better compliance may be actively encouraged. In this way, the network in some cases may be able to make local modifications as indicated in block 2318. That is, based on the relationships and patterns found in block 2315, the network may transmit new rules, messages, or make changes to the display to modify the user's compliance behavior. Finally, the results from the evaluation 2315, including any recommended modifications as shown in block 2318, may be communicated as shown in block 2319. For example, a pharmacy may be actively monitoring messages displayed to a patient, and evaluating the user's actions to confirm compliance with a prescription. The pharmacy may find that the patient is performing poorly, and may actively make changes and modifications to the messages in order to encourage better compliance. The pharmacy may also send its findings regarding patient compliance and its modifications to the doctor, as indicated in block 2319. It will be understood that there are a wide variety of information that could be communicated to other parties based on the results of the evaluation 2315.

Alternative Embodiments of the Intelligent Enclosure or Container

Figure 22:
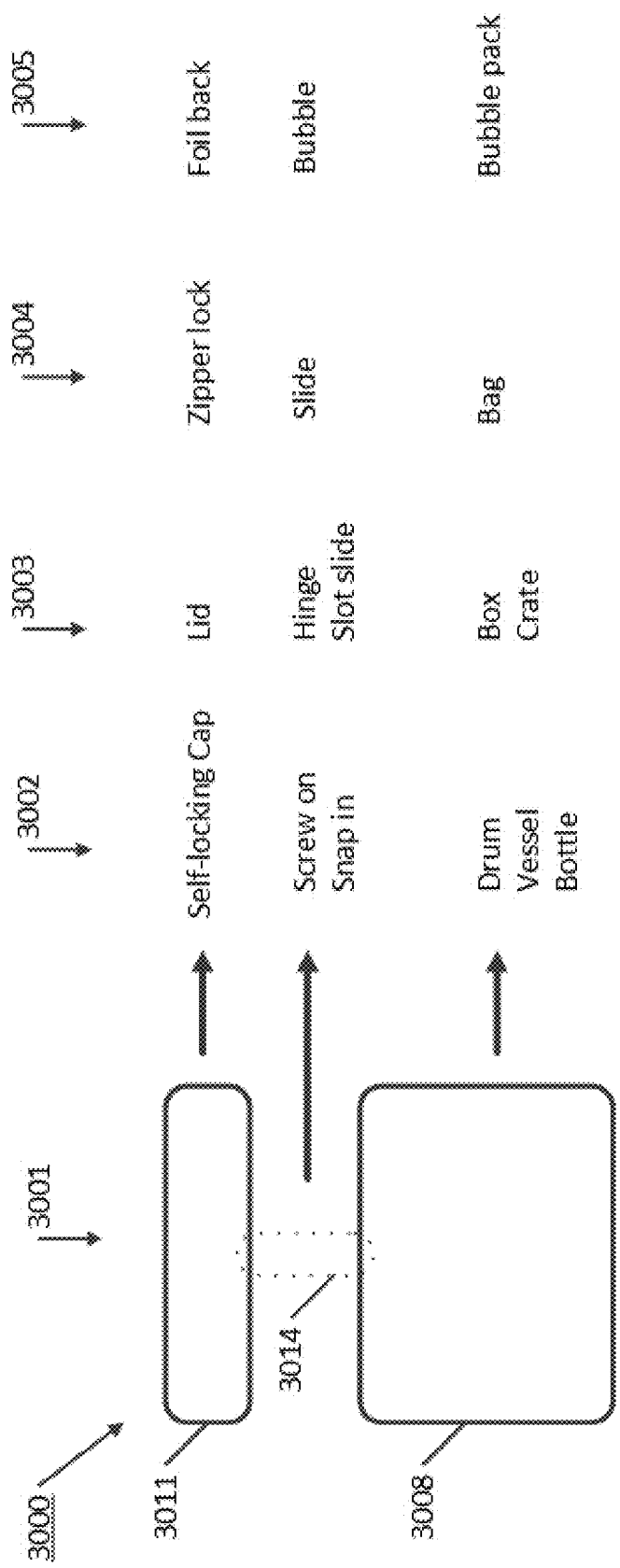
FIG. 22 shows a block diagram of alternative constructions of intelligent container systems in accordance with the present invention.

It will be understood that there are many embodiments envisioned for the electronic assembly, intelligent enclosure or intelligent container system consistent with this disclosure and part of the claimed invention. FIG. 22 describes several embodiments of the intelligent enclosure and container 3000, but these several embodiments represent but a small sampling of possible applications and variations for the system 3000. Generally, an intelligent container system 3001 is illustrated. This system 3001 has a container 3008 and an enclosure 3011 that are connected together through a hardware or other system 3014. As described earlier, an electronic assembly may be installed in the container 3008, in the enclosure 3011, or shared between the container and the enclosure. Accordingly, the polymorphic display of the electronic assembly may be on the container 3008, on the enclosure 3011, or shared between the container 3008 and the enclosure 3011. The container 3008 and the enclosure 3011 are joined through a joining mechanism 3014. This joining mechanism 3014 may be a hardware, such as a hinge or sealing mechanism, or may be in the form of a material such as an adhesive or a glue. It will be understood that the intelligent container system 3001 may be constructed in many different ways consistent with this disclosure.

In example 3002, the container 3008 is a can, bottle, drum, or other vessel for holding a liquid or gas. The enclosure 3011 would be in the form of a self-locking cap (like a self-locking gas cap for automobiles) for joining to, and sealing, the container 3008. In this way, the joining mechanism 3014 could be a threaded, friction slide, or snap-together mechanical assembly. It will be appreciated that several other joining mechanisms could be used.

In example 3003 the container 3008 is a box, crate, or other packaging typically used for holding dry goods. The enclosure 3011 would be in the form of a lid for holding the dry goods inside the container 3008. In some cases the enclosure 3011 would need to join to and seal the container 3008, and in other cases depending on the application, sealing may not be necessary. The joining mechanism of 3014 would be in the form of a hinge or slot slide that allows a lid to be positioned to cover the top of the container 3008. It will be understood that the joining mechanism 3014 may be a single use mechanism such that once the lid has been removed from the container, it may no longer be used, or the joining mechanism 3014 may be constructed to be reusable.

In example 3004 the container 3008 is a bag or envelop, that in many cases consists of plastic or polyurethane. It will be understood however that the bag or envelop may be made of different materials depending upon the application. The enclosure 3011 is a slotted zipper lock, such as is commonly seen in food storage bags. The mechanism 3014 would be the sliding zipper lock which can be moved transversely across the top of the bag to provide a sealing effect across the entire top surface.

In another example 3005, the container system 3008 is a blister pack, such as are used to distribute pills or other goods. In this example, the enclosure 3011 would be the foil backing behind the container 3008. The container typically being a pre-formed plastic comprising cavities or pockets where the goods reside. The mechanism for joining them 3014 would be a heat or pressure sensitive seal.

Figure 23:
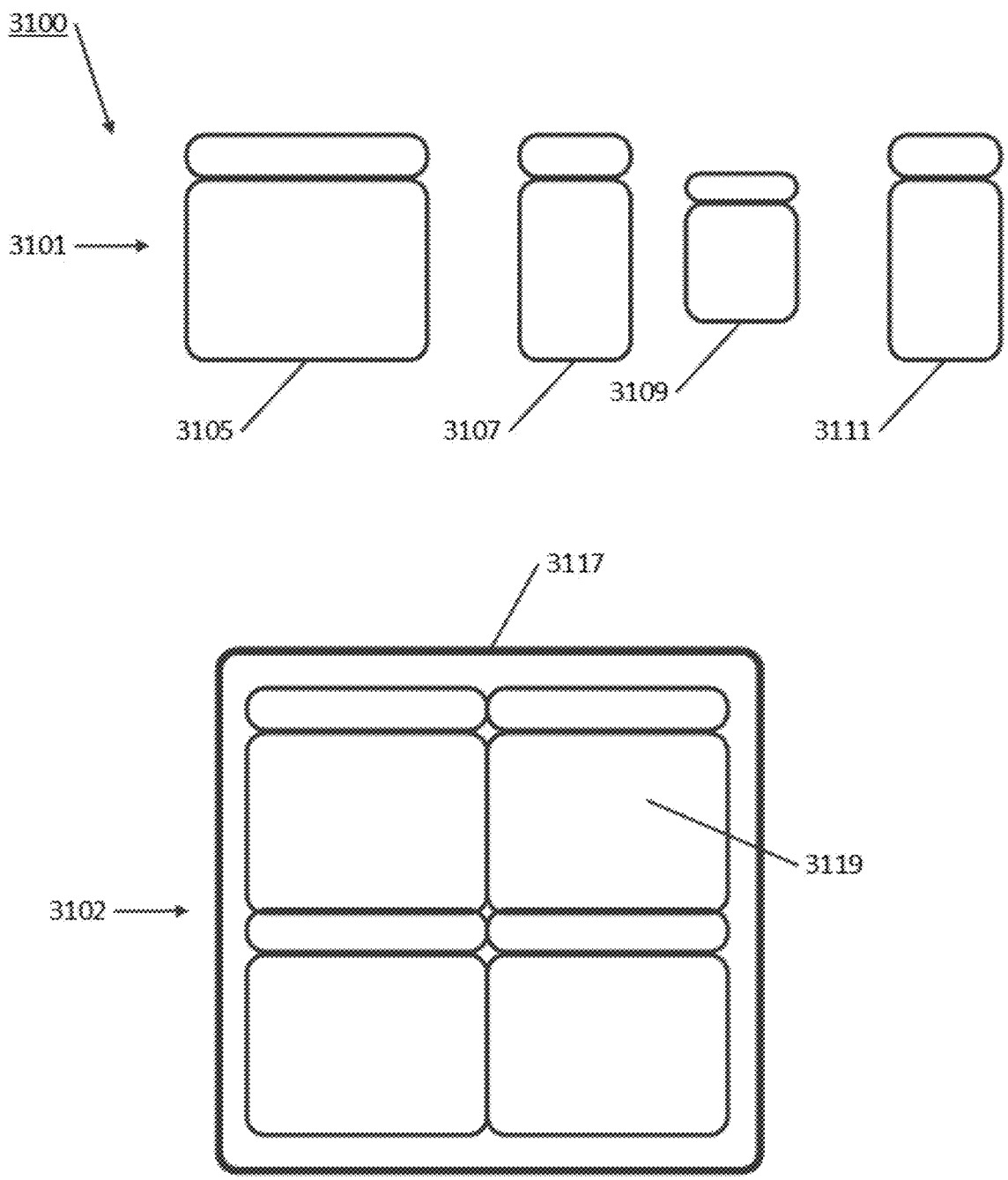
FIG. 23 shows block diagrams of alternative constructions of intelligent container systems in accordance with the present invention.

Referring now to FIG. 23, four embodiments 3100 of connected intelligent containers systems are disclosed. It will be understood that a wide variety of interconnected systems are consistent with this disclosure and claimed as part of the invention. Example 3101 shows four intelligent containers and intelligent enclosures 3105, 3107, 3109, and 3011. Each of these four containers hold different substances, such as different medicines. In the case 3101, each of the four containers has a wireless radio that is able to wirelessly communicate to one or more of the other containers. In this way, a connected container is able to have knowledge from and cooperate with the other intelligent containers in the local area. In one simple example, container 3105 may communicate with container 3109, and understand that their respective medications could cause a serious health conflict for the patient. And further that they should only be taken at certain times and in a specific order. In response, one or both of the containers could provide indications on their polymorphic displays that communicate when, and in which order, to take the medications, or visibly (and audibly or wirelessly) warn when not to take the medications and to contact their pharmacist or doctor immediately. It will be understood that a wide range of applications are enabled by having intelligent containers be able to be aware of other containers around them.

Arrangement 3102 has four intelligent containers 3119 contained in common packaging 3117. Again, the four intelligent container systems are able to communicate with each other using wireless radios. In a simple example, the intelligent containers may be intended to be shipped in the common packaging 3117 for safety, environmental, tamper or theft deterrent purposes. When one of the packages 3119 is moved away from the other three packages, all the packages would be aware, and visibly indicate that the outer packaging 3117 had been compromised. This could for example further start a clock or timer running with in the intelligent enclosures of all the intelligent containers as all the containers are no aware that they are in an unprotected, no longer secure, open environment. Arrangement 3103 is similar to arrangement 3102, except in arrangement 3103 the intelligent container systems 3129 is contained within container 3125 which is in cooperation with intelligent enclosure 3127. Now, rather than having to rely upon communication between the intelligent containers within container 3125, an additional layer of protection is added as now the individual container systems 3129 are able to communicate with the outer container 3125 and its intelligent enclosure 3127.

Exemplary Embodiments of the Intelligent Container System

In the following examples, the container is a screw type bottle having a thin metal conductor on the top surface of the opening to the bottle. The enclosure is a screw type bottle cap made of transparent plastic. The electronic assembly is constructed having a circular transparent substrate and an operably coupled polymorphic display. The polymorphic display comprises various combinations of volatile, self-switching status indicators, permanent and irreversible state indicators, and polymorphic indicators and corresponding transparent electrodes. The common electrolyte is white, thus the visible states of the indicators are white when they aren't in a colored state. Note that only an illustrative sub-set of indicators are described in the exemplary embodiments. The electronic assembly also has a battery, components and circuitry configured in part, to have an open circuit with two contacts.

All the components of the electrical assembly are configured on the same surface of the substrate, and the entire assembly encapsulated such that only the open circuit contacts are exposed. The electronic assembly is "snapped into place" inside the bottle cap so that the indicators are parallel with the bottle cap and thus visible. Alternatively, the electronic assembly may be positioned in the bottle cap and appropriately configured with a cutout instead of a transparent 'window'.

When the bottle cap is fully screwed onto the bottle electrical contact is made with the metal conductor on the lip of the bottle opening. The action of mating the bottle cap and the bottle closes the open circuit, thus generating an electrical switching signal.

Exemplary Embodiment 1 of the Intelligent Container System

In this exemplary embodiment, the self-switching indicators are visibly white once switched with an electrical switching signal and remain visibly white as long as a maintenance signal is applied. They automatically self-switch back to a visible magenta state in the absence of the maintenance electrical signal. When the bottle cap is fully screwed onto the bottle electrical contact is made with the metal conductor on the lip of the bottle opening. The action of mating the bottle cap and the bottle closes the open circuit, thus generating the electrical switching and maintenance signals.

When the bottle cap is unscrewed, the circuit is opened, the maintenance signal is terminated, and the status indicator automatically reverts (self-switches) to a stable magenta visible state. When the cap is later screwed back onto the bottle, the circuit is again closed, the switching and maintenance signals generated, and the status indicator again switches to a white visible state. From the user's perspective, a white 'message' corresponds to the cap being fully screwed onto the bottle (joined), and a magenta 'message' corresponds to the cap either partially or fully unscrewed (separated) from the bottle.

Exemplary Embodiment 2 of the Intelligent Container System

The electronic assembly of Exemplary Embodiment 2 is similar to that of Exemplary Embodiment 1, except that the electro-mechanical circuitry, or actuator, is configured not to generate switching and maintenance signals to the status indicator when the bottle cap is fully screwed onto the bottle. Instead, the actuator generates the switching and maintenance signals to the status indicator when the bottle cap is unscrewed from the bottle. When the intelligent enclosure is separated from the container, the status indicator is in a visible white state. Later, when the bottle cap is fully screwed back onto the bottle again, the actuator opens, the maintenance signal is terminated and the status indicator self-switches to a stable visible magenta state. An advantage of this embodiment is that the affirmative colored (magenta) state is maintained without an electrical signal. A maintenance signal is only required during the comparatively limited periods of time when the bottle cap is separated from the bottle. From the user's perspective, a white 'message' corresponds to the cap being unscrewed (separated) from the bottle, and a magenta 'message' corresponds to the cap fully screwed (joined) onto the bottle.

Exemplary Embodiment 3 of the Intelligent Container System

This exemplary embodiment is similar to that of Exemplary Embodiment 2, with the addition of a permanent and irreversible state indicator. The state indicator is initially white and permanently and irreversibly transitions to a visible blue-black state in response to an electrical switching signal. Once switched, the permanent and irreversible indicator retains its visible blue-black state without a maintenance signal.

In this example, when the bottle cap is fully screwed onto the bottle for the first time, the state indicator transitions permanently and irreversibly from white to black-blue. The result is a permanent, tamper evident indicator that the system functioned initially as designed and the bottle was properly sealed. As with Exemplary Embodiment 2, when the bottle cap is fully screwed onto the bottle, the first time and every time thereafter, the status indicator is in a stable, visible magenta state. When the bottle cap is unscrewed from the container, the state indicator remains black-blue while the status indicator transitions to a visible white state for as long as the maintenance signal is applied. From the user's perspective, a blue-black 'message' corresponds to the container having been sealed and the electronic assembly functioning correctly. A white 'message' corresponds to the bottle cap being unscrewed (separated) from the bottle, and a magenta 'message' corresponds to the bottle cap fully screwed (joined) onto the bottle.

Exemplary Embodiment 4 of the Intelligent Container System

This exemplary embodiment is similar to that of Exemplary Embodiment 2, where the bottle is a pill bottle that contains pills, and the electronic assembly comprises a processor, memory, and a clock/timer, and further:

Rules (a prescription) corresponding to a prescribed schedule for taking medicine (e.g. three time periods during the day when the bottle should be opened or closed and a pill taken (e.g. 7 am-10 am, 2 pm-3 pm and 9 pm-11 pm); and A second status indicator, having a first stable, switchable visible white state without the application of an electrical signal, and a second volatile, self-switching visible green state when a switching signal is applied, and that stays in the visible green state as long as a maintenance is maintained.

When the bottle cap is first fully screwed onto the pill bottle the processor in cooperation with the actuator does not generate a switching signal to the first status indicator, thus the first status indicator is in a stable, visible magenta state. Nor is a switching signal generated to the second status indicator, thus the second status indicator is in a stable, visible white state. Together the two indicators communicate the "message" that the bottle should not be opened, nor a pill removed from the bottle or taken.

According to the stored rules and clock, at the beginning of, and for the duration of, each prescribed time-period, switching and maintenance signals are applied (1) to the first status indicator transitioning it from its stable, visible magenta state to a volatile, visible white state, and (2) to the second status indicator causing it to transition to a volatile, visible green state. The absence of a visible magenta "message" (replaced by a visible white "message"), and the presence of a visible green "message" (replacing a visible white "message") visibly communicates that it is time for the pill bottle to be opened and a pill removed and taken.

When the bottle cap is unscrewed from the pill bottle and subsequently screwed back on, the electrical maintenance signals are terminated causing (1) the first status indicator to automatically self-switch back to its stable, visible magenta state, and (2) the second status indicator to automatically self-switch back to its stable, visible white state. The process repeats as prescribed; per the rules.

Exemplary Embodiment 5A of the Intelligent Container System

This exemplary embodiment is similar to that of Exemplary Embodiment 1, but in this example, the status indicator has two stable, and one volatile, visible states. Prior to the application of a first electrical switching signal, e.g. before the bottle cap is first screwed onto the container, the indicator is in a stable, first visible state. When the bottle cap is screwed onto the container for the first time, a first switching signal is generated that causes the status indicator to transition to a stable, second visible state.

When the bottle cap is unscrewed from the bottle, a second switching signal and a maintenance signal are generated that causes the indicator to switch to, and maintain, a volatile, third visible state. When the cap is screwed back onto the bottle and the maintenance signal is terminated the indicator automatically self-switches back to the second, stable visible state. When unscrewed from the bottle again, switching and maintenance signals are generated causing the indicator to switch to the volatile, third visible state. And when screwed back onto the bottle and the maintenance signal terminated the indicator automatically self-switches back to the second, stable visible state. In this exemplary embodiment, at no time, does the indicator switch back to the stable, first visible state.

From the user's perspective, the first visible 'message' corresponds to the bottle cap never having been used to seal a container. The second visible 'message' corresponds to the bottle cap being screwed onto the container, and the third visible 'message' corresponds to the bottle cap being unscrewed (separated) from the container.

Exemplary Embodiment 5B of the Intelligent Container System

This exemplary embodiment is similar to that of Exemplary Embodiment 5a, however with the actuation sequence of Exemplary Embodiment 1. Prior to the application of a first electrical switching signal, e.g. when the bottle cap is first screwed onto the container, the indicator is in a stable, first visible state. When the bottle cap is first unscrewed from the container, a switching signal is generated and applied to the indicator that causes it to transition to a second, stable visible state. When the bottle cap is later screwed back onto the bottle, switching and maintenance signals are generated causing the indicator to transition to, and maintain, a volatile, third visible state. When the bottle cap is unscrewed from the bottle a second time the maintenance signal is terminated and the indicator automatically self-switches back to the second, stable visible state. When screwed back onto the bottle again, switching and maintenance signals are generated that cause the indicator to transition again to, and maintain, the volatile, third visible state.

An advantage of this approach over that of Exemplary Embodiment 5a, is that power isn't required when the bottle cap is separated from the container. This would allow the battery to be configured as part of the container, making for a small/thinner and lighter bottle cap.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. An intelligent container system, comprising:
    a container portion;
    an enclosure portion that mates to or joins with the container portion;
    an actuator;
    an electronic assembly, further comprising:
    a substrate;
    a processor;
    a memory;
    a power source; and
    a polymorphic display operably coupled to the electronic assembly and further comprising:
        one or more pixels of a first type having a first set of operable properties;
        one or more pixels of a second type having a second set of operable properties;
        wherein the operable properties of the first type of pixels and the second type of pixels are each a stability property, a switchability property, and a transition sequencing property, and at least one of the operable properties in the second set is different than the respective operable property in the first set; and
        wherein the polymorphic display is a unitary apparatus such that the first type of pixels and the second type of pixels share (1) structure, (2) materials, or (3) circuitry among the pixels; and
    wherein, according to the application, termination or disruption of an electrical signal from the electronic assembly, the two pixel sets combine to present an intended message according to their different operable properties.

2. The intelligent container system according to claim 1, wherein the electronic assembly is in the intelligent container.

3. The intelligent container system according to claim 1, wherein the polymorphic display is visible through the enclosure or through the container.

4. The intelligent container system according to claim 1, wherein the operable properties are stability, switchability or transition sequencing.

5. The intelligent container system according to claim 4, wherein the stability properties are volatile, mono-stable, bi-stable, multi-stable, or permanent.

6. The intelligent container system according to claim 4, wherein the switchability properties are electrically switchable, self-switchable, or non-switchable.

7. The intelligent container system according to claim 4, wherein the transition sequencing properties are reversible, irreversible, or repeatable.

8. The intelligent container system according to claim 1, further including a sensor.

9. The intelligent container system according to claim 1, further including a wired or wireless communication apparatus.

10. The intelligent container system according to claim 1, further including an acoustic communication apparatus in the form of an acoustic emitter or receiver.

11. The intelligent container system according to claim 1, further including a pairing mechanism to uniquely associate the enclosure to the container.

12. The pairing mechanism of claim 11, wherein the pairing mechanism is mechanical, wireless, or optical.

13. The intelligent container system according to claim 1, wherein the electronic assembly is (1) in or on the enclosure or (2) in or on the container.

14. The intelligent container system according to claim 1, wherein a portion of the electronic assembly is in or on the container and another portion of the electronic assembly is in or on the enclosure.

15. The intelligent container system according to claim 1, further including:
    verification circuitry for determining optical states of a target visible message portion, where the target visible portion is one of the plurality of visible message portions; and
    comparison circuitry for comparing a message that the processor intended to present on the target visible portion to a message actually formed by the detected optical states.

16. The intelligent container system according to claim 15, further including determination circuitry for determining the message actually presented on the polymorphic display.

17. The intelligent container system according to claim 1, wherein the power source is a battery, capacitor, or an RF, electromagnetic or optical energy harvester.

18. The intelligent container system according to claim 1, wherein the power source is fixed or replaceable.

19. The intelligent container system according to claim 1, wherein the replaceable power source is a replaceable battery comprising a thin film or solid-state battery mounted on a carrier.

20. The intelligent container system according to claim 1, wherein the electronic assembly is partially or wholly encapsulated.

21. The intelligent container system according to claim 1, wherein the electronic assembly is configured as a module for mechanically joining to an enclosure.

22. The intelligent container system according to claim 1, the intelligent container system further comprising:
    a light source; and
    a light guide.

23. The intelligent container system according to claim 1, the intelligent container system further comprising a light source.

24. A method for evaluating actions performed on an intelligent container system having a polymorphic, the polymorphic display further comprising:
    one or more pixels of a first type having a first set of operable properties;
    one or more pixels of a second type having a second set of operable properties;
    wherein the operable properties of the first type of pixels and the second type of pixels are each a stability property, a switchability property, and a transition sequencing property, and at least one of the operable properties in the second set is different than the respective operable property in the first set; and
    wherein the polymorphic display is a unitary apparatus such that the first type of pixels and the second type of pixels share (1) structure, (2) materials, or (3) circuitry among the pixels; and
    wherein, according to the application, termination or disruption of an electrical signal from the electronic assembly, the two pixel sets combine to present an intended display message according to their different operable properties;
    receiving message information related to the intended display message, the intended display message intended to be presented by the polymorphic display;
    receiving status information regarding the status of the intelligent container system, the status information comprising information related to actions performed on the intelligent container system; and
    using the received message information and status information to evaluate the actions performed on the intelligent container system.

25. The method according to claim 24, further including the step of transmitting rules to the intelligent container system.

26. The method according to claim 25, further including the step of storing the transmitted rules.

27. The method of claim 26, wherein the stored rules are used to evaluate the actions performed on the intelligent container system.

28. The method of claim 24, wherein the evaluation determines a relationship between the actions taken and (1) the message information, (2) the status information, or (3) the rules.

29. A method for evaluating actions performed on an intelligent container system having a polymorphic display, the polymorphic display further comprising:
    one or more pixels of a first type having a first set of operable properties;
    one or more pixels of a second type having a second set of operable properties;
    wherein the operable properties of the first type of pixels and the second type of pixels are each a stability property, a switchability property, and a transition sequencing property, and at least one of the operable properties in the second set is different than the respective operable property in the first set; and
    wherein the polymorphic display is a unitary apparatus such that the first type of pixels and the second type of pixels share (1) structure, (2) materials, or (3) circuitry among the pixels; and
    wherein, according to the application, termination or disruption of an electrical signal from the electronic assembly, the two pixel sets combine to present an intended display message according to their different operable properties;
    receiving message information related to the intended display message, the intended display message intended to be presented by the polymorphic display;
    receiving status information regarding the status of the intelligent container system;
    using the status information to determine what actions, if any, were performed on the intelligent container system; and
    evaluating the message information to determine a relationship between the actions taken and the message information.

30. The method according to claim 29, wherein the evaluating step includes evaluating the message information and the actions to determine if the actions comply with rules stored in the intelligent container system.

31. The method according to claim 29, wherein the intended message was a request to take an action, and further evaluating the message information to determine if the requested action was performed.

32. The method according to claim 29, wherein the intended message was a request to not take an action, and further evaluating the message information to determine if the requested action was performed.

33. The method according to claim 29, further including a step of transmitting, responsive to the evaluating step, updated message information to the intelligent container system for setting the polymorphic display.

34. The method according to claim 29, further including a step of transmitting, responsive to the evaluating step, an updated rule to the intelligent container system.

35. The method according to claim 29, wherein the received message information includes information on whether or not the intended display message was actually displayed on the polymorphic display.

36. The method according to claim 29, further including the step of transmitting the rules to the intelligent container system.

37. The method according to claim 29, wherein the received status information includes time or elapsed time information, contents information, product information, pairing information, location information, user information, co-located intelligent container system information, or actuator or sensor data.

38. The method according to claim 29, wherein the received status information includes information about actions performed on the intelligent container system, including opening or closing, inserting or ejecting or withdrawing, latching or unlatching, locking or unlocking, screwing or unscrewing, adhering or releasing, separating or coupling, dispensing, filling or emptying.

39. The method according to claim 29, wherein the received status information includes a notification that the electronic assembly or the polymorphic display functioned correctly or malfunctioned.

40. The method according to claim 29, wherein the message is presented in human readable form, machine readable or machine-only readable form.

41. A method for evaluating actions performed on an intelligent container system having a polymorphic display, the polymorphic display further comprising:
one or more pixels of a first type having a first set of operable properties;
one or more pixels of a second type having a second set of operable properties;
wherein the operable properties of the first type of pixels and the second type of pixels are each a stability property, a switchability property, and a transition sequencing property, and at least one of the operable properties in the second set is different than the respective operable property in the first set; and
wherein the polymorphic display is a unitary apparatus such that the first type of pixels and the second type of pixels share (1) structure, (2) materials, or (3) circuitry among the pixels; and
wherein, according to the application, termination or disruption of an electrical signal from the electronic assembly, the two pixel sets combine to present an intended display message according to their different operable properties;
sending, using the electronic assembly, the intended message to the polymorphic display;
receiving, in the electronic assembly, status information regarding the status of the intelligent container system;
using the status information to determine what actions, if any, were performed on the intelligent container system; and
evaluating the actions to determine a relationship between the actions taken and (1) the intended message or (2) the status information.

42. The method according to claim 41, wherein the evaluating step includes evaluating the actions to determine if the actions comply with rules stored in the electronic assembly.

43. The method according to claim 41, wherein the intended message was a request to take an action, and further evaluating the actions to determine if the requested action was performed.

44. The method according to claim 41, wherein the intended message was a request to not take an action, and further evaluating the actions to determine if the requested action was performed.

45. The method according to claim 41, further including a step of changing, responsive to the evaluating step, a message displayed on the polymorphic display.

46. The method according to claim 41, further including a step of modifying, responsive to the evaluating step, a rule.

47. The method according to claim 41, further including the step of determining whether or not the intended message was actually displayed on the polymorphic display.

48. The method according to claim 41, further including the step of wirelessly receiving the rules at the intelligent container system.

49. The method according to claim 41, wherein the received status information includes time or elapsed time information, contents information, product information, pairing information, location information, user information, co-located intelligent container system information, or actuator or sensor data.

50. The method according to claim 41, wherein the received status information includes the time that the container was opened or closed.

51. The method according to claim 41, wherein the received status information includes a notification that the message was not properly displayed.

52. The method according to claim 41, wherein the message is presented in human readable form or machine readable form.

53. A method for evaluating actions performed on an intelligent container system having a polymorphic display, the polymorphic display further comprising:
one or more pixels of a first type having a first set of operable properties;
one or more pixels of a second type having a second set of operable properties;
wherein the operable properties of the first type of pixels and the second type of pixels are each a stability property, a switchability property, and a transition sequencing property, and at least one of the operable properties in the second set is different than the respective operable property in the first set; and
wherein the polymorphic display is a unitary apparatus such that the first type of pixels and the second type of pixels share (1) structure, (2) materials, or (3) circuitry among the pixels; and
wherein, according to the application, termination or disruption of an electrical signal from the electronic assembly, the two pixel sets combine to present an intended display message according to their different operable properties;
presenting the intended message on the polymorphic display to include a first message in a first modality responsive to a first action;
presenting the intended message on the polymorphic display to include a second message in a second modality responsive to a second action; and
wherein the first modality is different than the second modality.

54. The method according to claim 53, wherein one of the actions is (1) opening the intelligent container system or (2) closing the intelligent container system.

55. The method according to claim 53 wherein one of the actions is receiving (1) a time, (2) an elapsed time, (3) location information, (4) an actuator signal or (5) a sensor signal.

56. The method according to claim 53, further including electronically pairing the enclosure to the container.

57. The method according to claim 56, wherein one of the messages is set to indicate that the enclosure and the container are (1) paired or (2) not paired.

58. The method according to claim 56, further including the step of determining that the enclosure and the container are not properly paired, and generating a pair-fault message.

59. The method according to claim 53, further including the step of communicating one of the messages to a remote processor.

* * * * *